US012811466B2

(12) United States Patent
Iio et al.

(10) Patent No.: US 12,811,466 B2
(45) Date of Patent: Nov. 24, 2026

(54) SYSTEM COMPRISING MOTOR UNIT

(71) Applicant: MAKITA CORPORATION, Anjo (JP)

(72) Inventors: Takayoshi Iio, Anjo (JP); Tomoyuki Kutsuna, Anjo (JP); Takaaki Kato, Anjo (JP)

(73) Assignee: MAKITA CORPORATION, Anjo (JP)

( * ) Notice: Subject to any disclaimer, the term of this patent is extended or adjusted under 35 U.S.C. 154(b) by 207 days.

(21) Appl. No.: 18/738,545

(22) Filed: Jun. 10, 2024

(65) Prior Publication Data

US 2025/0030313 A1 Jan. 23, 2025

(30) Foreign Application Priority Data

Jul. 20, 2023 (JP) ................................ 2023-118354

(51) Int. Cl.

| | |
|---|---|
| ***H02K 7/14*** | (2006.01) |
| ***H02K 9/06*** | (2006.01) |
| ***H02K 11/00*** | (2016.01) |
| ***H02K 21/16*** | (2006.01) |

(52) U.S. Cl.

CPC ............... *H02K 7/145* (2013.01); *H02K 9/06* (2013.01); *H02K 11/0094* (2013.01); *H02K 21/16* (2013.01)

(58) Field of Classification Search

CPC ..... B25F 1/00; B25F 1/04; B25F 5/02; H02K 7/145; H02K 9/06; H02K 21/16; H02K 11/0094

USPC ........................................................... 310/50

See application file for complete search history.

(56) References Cited

U.S. PATENT DOCUMENTS

| | | | | |
|---|---|---|---|---|
| 4,200,164 A * | 4/1980 | Pearne | B62M 7/08 180/205.7 |
| 6,181,032 B1 * | 1/2001 | Marshall | B25F 3/00 200/321 |
| 6,374,447 B1 * | 4/2002 | Armbruster | B60S 3/048 15/97.1 |
| 10,819,185 B2 * | 10/2020 | Kviberg | H02K 1/2791 |
| 11,554,474 B2 * | 1/2023 | Zugen | B25F 1/003 |
| 2020/0384625 A1 * | 12/2020 | Zugen | B25F 3/00 |
| 2021/0384746 A1 * | 12/2021 | Zeiler | B25F 5/00 |
| 2023/0034464 A1 | 2/2023 | Matsunaga et al. | |
| 2024/0335934 A1 * | 10/2024 | Noel | B25F 5/00 |

(Continued)

FOREIGN PATENT DOCUMENTS

WO 2021/131007 A1 7/2021

*Primary Examiner* — Rashad H Johnson

(74) *Attorney, Agent, or Firm* — Oliff PLC

(57) ABSTRACT

A system may include: a motor unit comprising an output member and a fixing member; a first working unit configured to be selectively fixed to the fixing member; and a second working unit configured to be selectively fixed to the fixing member. In a case where the fixing member is fixed to the first working unit, the fixing member of the motor unit may be oriented in a first direction relative to a reference plane when the first working unit and the motor unit are in a first working posture relative to the reference plane. In a case where the fixing member is fixed to the second working unit, the fixing member of the motor unit may be oriented in a second direction relative to the reference plane when the second working unit and the motor unit are in a second working posture relative to the reference plane.

16 Claims, 56 Drawing Sheets

(56) References Cited

U.S. PATENT DOCUMENTS

| | | | | |
|---|---|---|---|---|
| 2025/0030299 | A1* | 1/2025 | Iio | H02K 5/04 |
| 2025/0030312 | A1* | 1/2025 | Iio | H02K 5/225 |
| 2025/0112519 | A1* | 4/2025 | Takeuchi | H02K 11/33 |
| 2025/0112526 | A1* | 4/2025 | Takeuchi | H02K 7/14 |
| 2026/0051787 | A1* | 2/2026 | Takeda | H02K 7/145 |

* cited by examiner

FIG. 9

| | Weight (kg) | | Length in Front-Rear Direction (mm) | | Length in Left-Right Direction (mm) | | Length in Up-Down Direction (mm) | | Volume ($cm^3$) | | Diameter (mm) | |
|---|---|---|---|---|---|---|---|---|---|---|---|---|
| | Lower Limit | Upper Limit | Lower Limit | Upper Limit | Lower Limit | Upper Limit | Lower Limit | Upper Limit | Lower Limit | Upper Limit | Lower Limit | Upper Limit |
| Motor Unit (with Battery Pack) | 3 | 7.5 | 175 | 250 | 105 | 240 | 225 | 280 | 4000 | 13000 | - | - |
| Motor Unit (without Battery Pack) | 2 | 3.5 | 175 | 210 | 105 | 240 | 180 | 190 | 3000 | 10000 | - | - |
| Body Housing | 0.8 | 1.2 | 175 | 210 | 105 | 240 | 180 | 190 | 3000 | 10000 | - | - |
| Motor | 0.7 | 1.1 | 110 | 119 | - | - | - | - | 500 | 1000 | 85 | 100 |
| Battery Pack | 0.6 | 2 | 115 | 155 | 75 | 85 | 65 | 115 | 500 | 1500 | - | - |

FIG. 14

| | Maximum Output (kW) | | Maximum Voltage (V) | | Maximum Current (A) | | Rated Capacity (Ah) | | Torque (N·m) | | Rotation Speed (rpm) | |
|---|---|---|---|---|---|---|---|---|---|---|---|---|
| | Lower Limit | Upper Limit | Lower Limit | Upper Limit | Lower Limit | Upper Limit | Lower Limit | Upper Limit | Lower Limit | Upper Limit | Lower Limit | Upper Limit |
| Motor | 0.5 | 2 | - | - | 35 | 50 | - | - | 1.5 | 3 | 4000 | 10000 |
| Battery Pack | - | - | 20 | 100 | - | - | 1.5 | 18 | - | - | - | - |

SYSTEM COMPRISING MOTOR UNIT

REFERENCE TO RELATED APPLICATIONS

This application claims priority to Japanese Patent Application No. 2023-118354, filed on Jul. 20, 2023, the entire contents of which are hereby incorporated by reference into the present application.

TECHNICAL FIELD

This disclosure herein relates to systems including a motor unit.

BACKGROUND ART

International Publication No. 2021/131007 describes a motor unit. The motor unit includes a motor, an output member configured to be driven by the motor, and a fixing member. The motor unit is attached to a working unit via the fixing member.

SUMMARY

The motor unit as above is attached to a working unit in a specific orientation only. Therefore, types of working units to which the motor unit is applicable are limited. The disclosure herein provides a technology that allows for an increase in a variety of working unit types to which a motor unit is applicable.

A system disclosed herein may comprise: a motor unit comprising a motor, an output member configured to be driven by the motor, and a fixing member; a first working unit configured to be selectively fixed to the fixing member of the motor unit and be driven by the output member; and a second working unit configured to be selectively fixed to the fixing member of the motor unit and be driven by the output member. The first working unit may differ from the second working unit. In a case where the fixing member is fixed to the first working unit, the fixing member of the motor unit may be oriented in a first direction relative to a reference plane when the first working unit and the motor unit are in a first working posture relative to the reference plane. In a case where the fixing member is fixed to the second working unit, the fixing member of the motor unit may be oriented in a second direction relative to the reference plane when the second working unit and the motor unit are in a second working posture relative to the reference plane, wherein the second direction is different from the first direction. The first working unit may comprise a first manipulation member configured to be manipulated by a user to drive the motor. The second working unit may comprise a second manipulation member configured to be manipulated by the user to drive the motor.

According to the configuration above, in the case where the motor unit is fixed to the first working unit, it is fixed with the fixing member oriented in the first direction relative to the reference plane, while in the case where the motor unit is fixed to the second working unit, it is fixed with the fixing member oriented in the second direction relative to the reference plane. Thus, the motor unit is applicable to an increased variety of working unit types.

Another system disclosed herein may comprise: a motor unit comprising a motor including a motor shaft, and a fixing member; a first working unit configured to be selectively fixed to the fixing member and be driven by the motor shaft, wherein the motor shaft extends in a left-right direction when the first working unit is operated by a user; and a second working unit configured to be selectively fixed to the fixing member and driven by the motor shaft, wherein the motor shaft extends in an up-down direction when the second working unit is operated by the user.

According to the configuration above, in the case where the motor unit is fixed to the first working unit, it is fixed with the motor shaft extending in the left-right direction, while in the case where the motor unit is fixed to the second working unit, it is fixed with the motor shaft extending in the up-down direction. Thus, the motor unit is applicable to an increased variety of working unit types.

Yet another system disclosed herein may comprise: a motor unit comprising a motor, an output member configured to driven by the motor, and a fixing member; a first working unit configured to be selectively fixed to the fixing member of the motor unit and be driven by the motor; and a second working unit configured to be selectively fixed to the fixing member of the motor unit and be driven by the motor. The output member may comprise: a first output member configured to be selectively fixed to the motor and drive the first working unit; and a second output member configured to be selectively fixed to the motor and drive the second working unit.

According to the configuration above, the motor unit drives the first working unit by the first output member, while the motor unit drives the second working unit by the second output member. Thus, the motor unit is applicable to an increased variety of working unit types.

BRIEF DESCRIPTION OF DRAWINGS

FIG. 9 shows parameters of the motor unit 4 according to the first embodiment.

FIG. 14 shows parameters of a motor 112 and the battery pack BP according to the first embodiment.

DESCRIPTION

Figure 1:
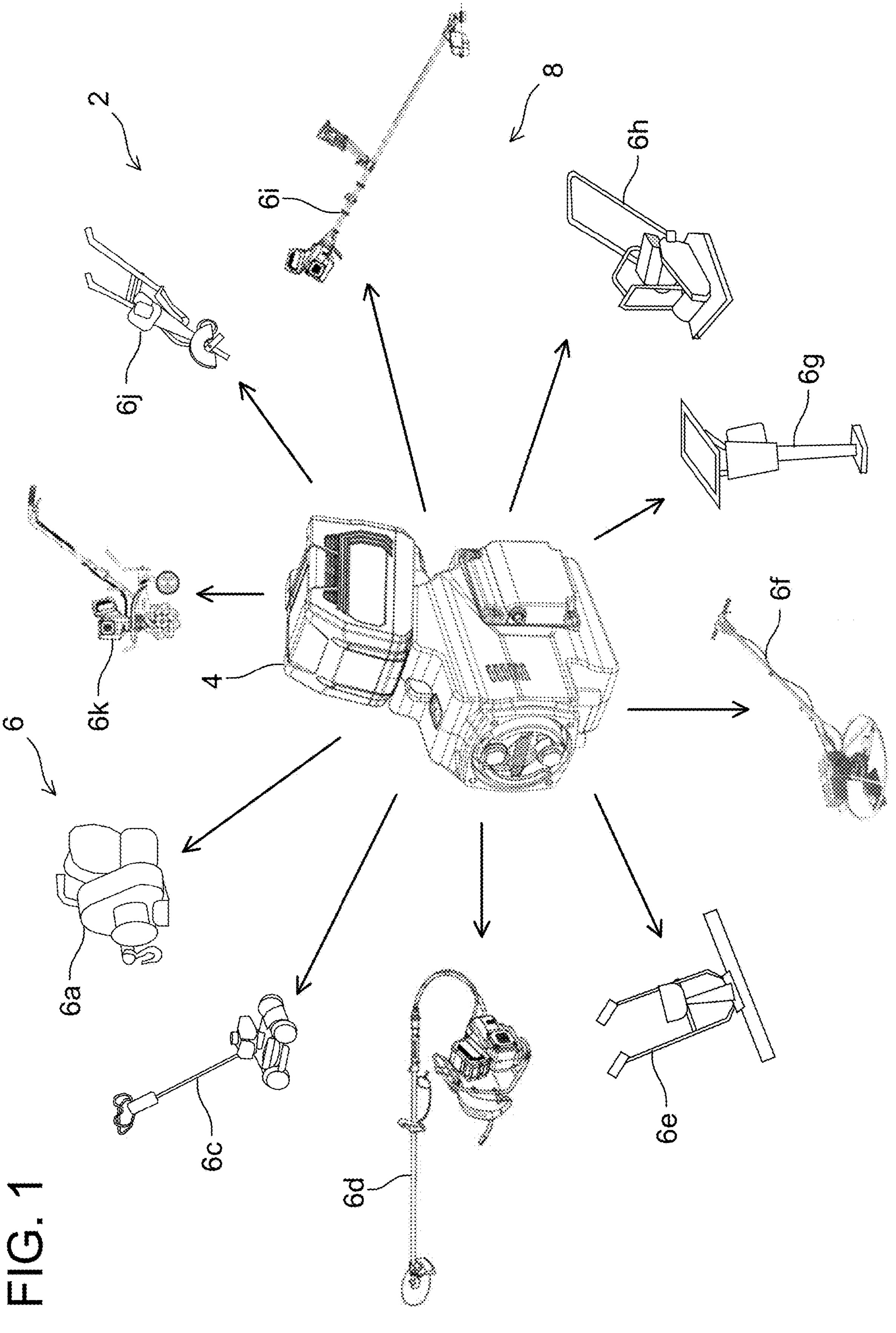
FIG. 1 shows a system 2 according to a first embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved systems, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

A system disclosed herein may comprise: a motor unit comprising a motor, an output member configured to be driven by the motor, and a fixing member; a first working unit configured to be selectively fixed to the fixing member of the motor unit and be driven by the output member; and a second working unit configured to be selectively fixed to the fixing member of the motor unit and be driven by the output member. The first working unit may differ from the second working unit. In a case where the fixing member is fixed to the first working unit, the fixing member of the motor unit may be oriented in a first direction relative to a reference plane when the first working unit and the motor unit are in a first working posture relative to the reference plane. In a case where the fixing member is fixed to the second working unit, the fixing member of the motor unit may be oriented in a second direction relative to the reference plane when the second working unit and the motor unit are in a second working posture relative to the reference plane, wherein the second direction is different from the first direction. The first working unit may comprise a first manipulation member configured to be manipulated by a user to drive the motor. The second working unit may comprise a second manipulation member configured to be manipulated by the user to drive the motor.

In one or more embodiments, the first working unit may further comprise a first handle configured to be gripped by the user.

The configuration above allows the user to grip the first handle to move the first working unit.

In one or more embodiments, a maximum output of the motor may range from 0.5 kW to 1.5 kW.

In the configuration above, the motor is a low-power motor. The low-power motor can be used for a variety of low-power working units. The motor unit can thus be used for the low-power working units. Thus, the motor unit is applicable to an increased variety of working unit types.

In one or more embodiments, a diameter of the motor may be equal to or less than 100 mm.

Generally, motor units including smaller motors have smaller sizes. Smaller motor units can be used for a wider variety of working units. The configuration above allows the motor unit to be applicable to an increased variety of working unit types.

In one or more embodiments, a weight of the motor unit may be equal to or less than 7.5 kg.

Generally, lighter motor units can be used for a wider variety of working units such as handheld working units. The configuration above allows the motor unit to be applicable to an increased variety of working unit types.

In one or more embodiments, the motor unit may further comprise a body housing accommodating the motor. A volume of the body housing may be equal to or less than 13000 $cm^3$.

Generally, smaller motor units can be used for a wider variety of working units. The configuration above allows the motor unit to be applicable to an increased variety of working unit types.

In one or more embodiments, the motor may comprise a motor shaft. In the case where the fixing member of the motor unit is fixed to the first working unit, the motor shaft may extend along the reference plane when the first working unit and the motor unit are in the first working posture relative to the reference plane. In the case where the fixing member of the motor unit is fixed to the second working unit, the motor shaft may extend perpendicular to the reference plane when the second working unit and the motor unit are in the second working posture relative to the reference plane.

The configuration above allows the motor unit to be applicable to an increased variety of working unit types by the variable orientation of the motor shaft relative to the reference plane.

In one or more embodiments, the first direction may be a direction along the reference plane. The second direction may be a direction perpendicular to the reference plane.

The configuration above allows for easy adjustment of the motor shaft orientation by adjusting the fixing member orientation.

In one or more embodiments, the motor unit may further comprise: a body housing accommodating the motor; and a battery terminal exposed to outside of the body housing and configured to be connected to a battery configured to supply power to the motor.

The configuration above allows for use of various types of batteries depending on the working unit types.

In one or more embodiments, in the case where the fixing member of the motor unit is fixed to the first working unit, the battery terminal may be positioned above the motor when the first working unit and the motor unit are in the first working posture relative to the reference plane. In the case where the fixing member of the motor unit is fixed to the second working unit, the battery terminal may be positioned lateral to the motor when the second working unit and the motor unit are in the second working posture relative to the reference plane.

In the configuration above, the battery posture relative to the reference plane is variable depending on the motor unit posture.

In one or more embodiments, the first working unit may be selected from a group consisting of: a winch unit, a screed unit, and a trowel unit.

The configuration above allows the motor unit to be used for the group consisting of the winch unit, the screed unit, and the trowel unit, and for a group of the other working units.

In one or more embodiments, the second working unit may comprise a handheld working unit configured to be held by a hand of the user.

The configuration above allows the motor unit to be used for the handheld working unit and a group of working units other than the handheld working unit.

First Embodiment

As shown in FIG. 1, a system 2 comprises a motor unit 4 and a plurality of working units 6. The motor unit 4 is configured to be selectively fixed to working units 6. Each working unit 6 is also configured to be fixed to an engine unit. The engine unit is for example EH035 engine unit from Makita Corporation or GX35 engine unit from Honda Motor Co., Ltd. That is, each working unit 6 can be applied to both the motor unit 4 and the engine unit. The plurality of working units 6 comprises for example a winch unit 6*a*, a slope mower unit 6*c*, a grass trimmer unit 6*d* for which a backpack type battery 280 (see FIG. 44) is used, a screed unit 6*e*, a trowel unit 6*f*, a rammer unit 6*g*, a plate compactor unit 6*h*, a handheld grass trimmer unit 6*i*, an edger unit 6*j*, and a multipurpose cultivator unit 6*k*. The working units 6 are not limited to those listed above and may comprise other working units other than those listed above. Each working unit 6 is a low-power working unit. Manufacturers or users select combinations of the motor unit 4 and the working units 6. Hereinafter, an assembly in which a working unit 6 is fixed to the motor unit 4 may be termed a working machine 8. A user works using the working machine 8.

Figure 2:
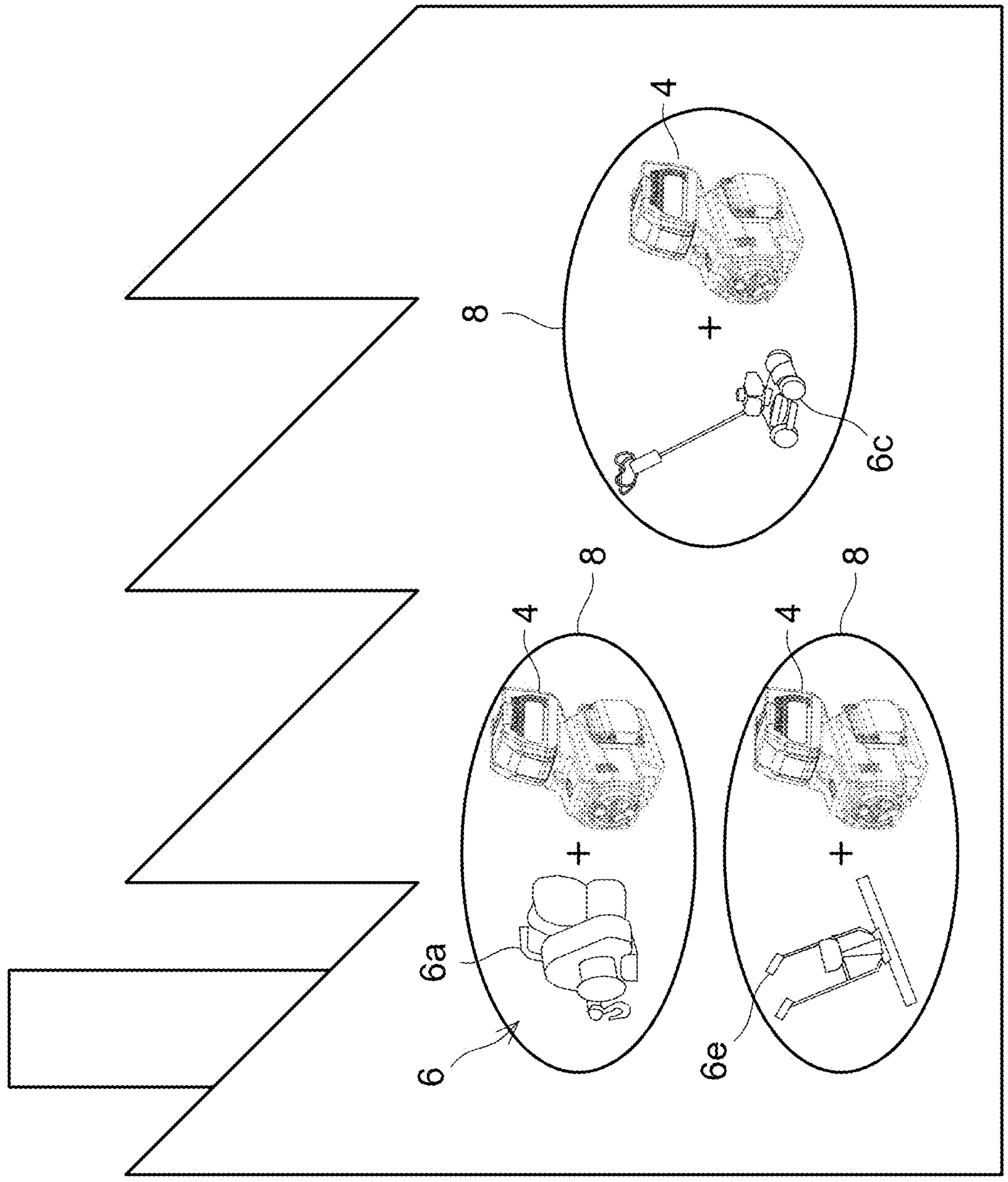
FIG. 2 shows an example of how a working machine 8 is manufactured according to the first embodiment.

Working machines 8 are manufactured in various manners. For example, as shown in FIG. 2, in case where a manufacturer selects combinations of the motor unit 4 and working units 6, the manufacturer prepares different types of working units 6 and combines each working unit 6 with the motor unit 4, thereby manufacturing working machines 8.

Figure 3:
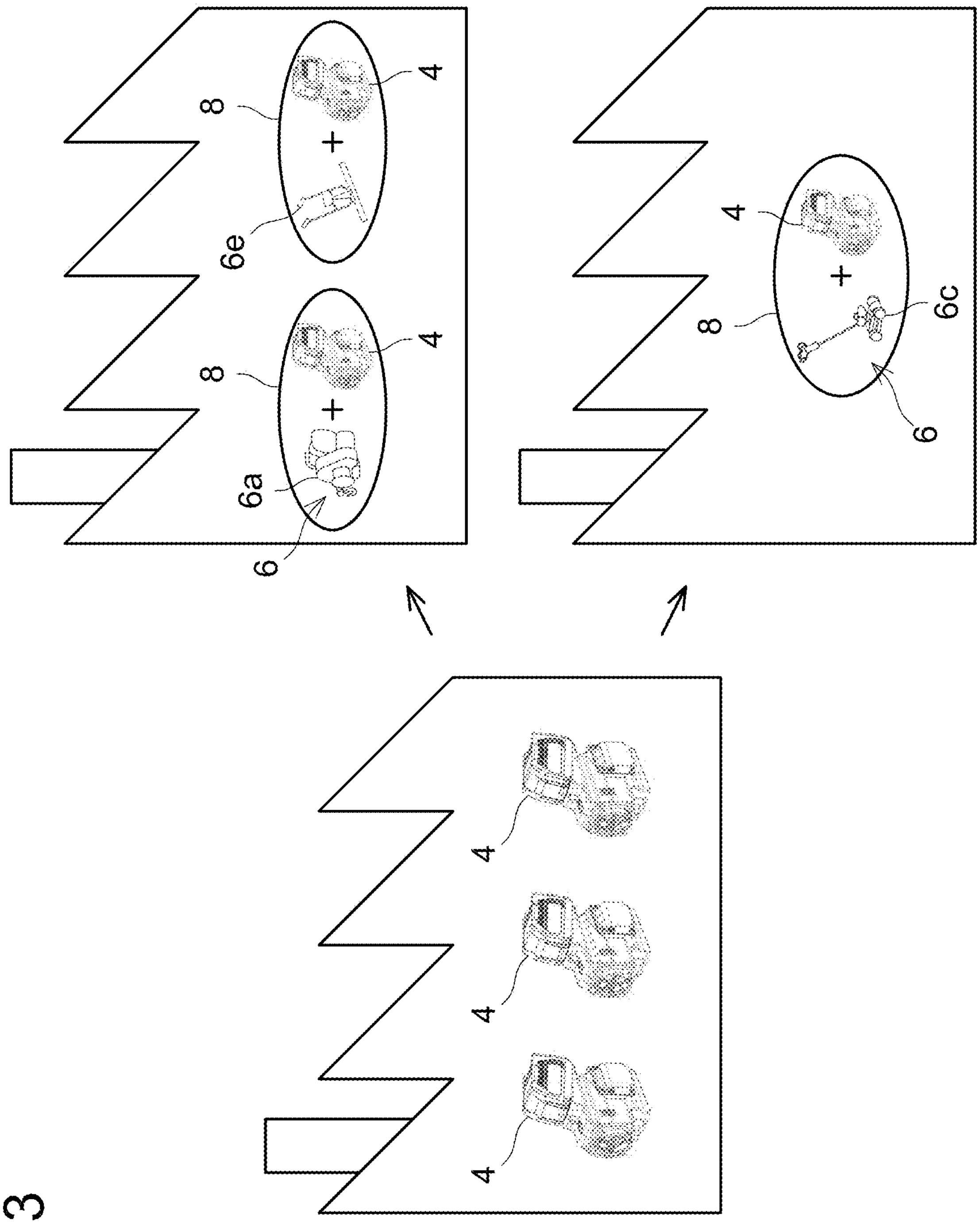
FIG. 3 shows an example of how a working machine 8 is manufactured according to the first embodiment.

In another example, as shown in FIG. 3, a first manufacturer manufactures the motor units 4, and other manufacturers (e.g., a second manufacturer and a third manufacturer) purchase the motor units 4 from the first manufacturer. The second manufacturer combines prepared working units 6 with the purchased motor units 4. The third manufacturer combines a prepared working unit 6 with the purchased motor unit 4. Thus, working machines 8 are manufactured by manufacturer by manufacturer.

Figure 4:
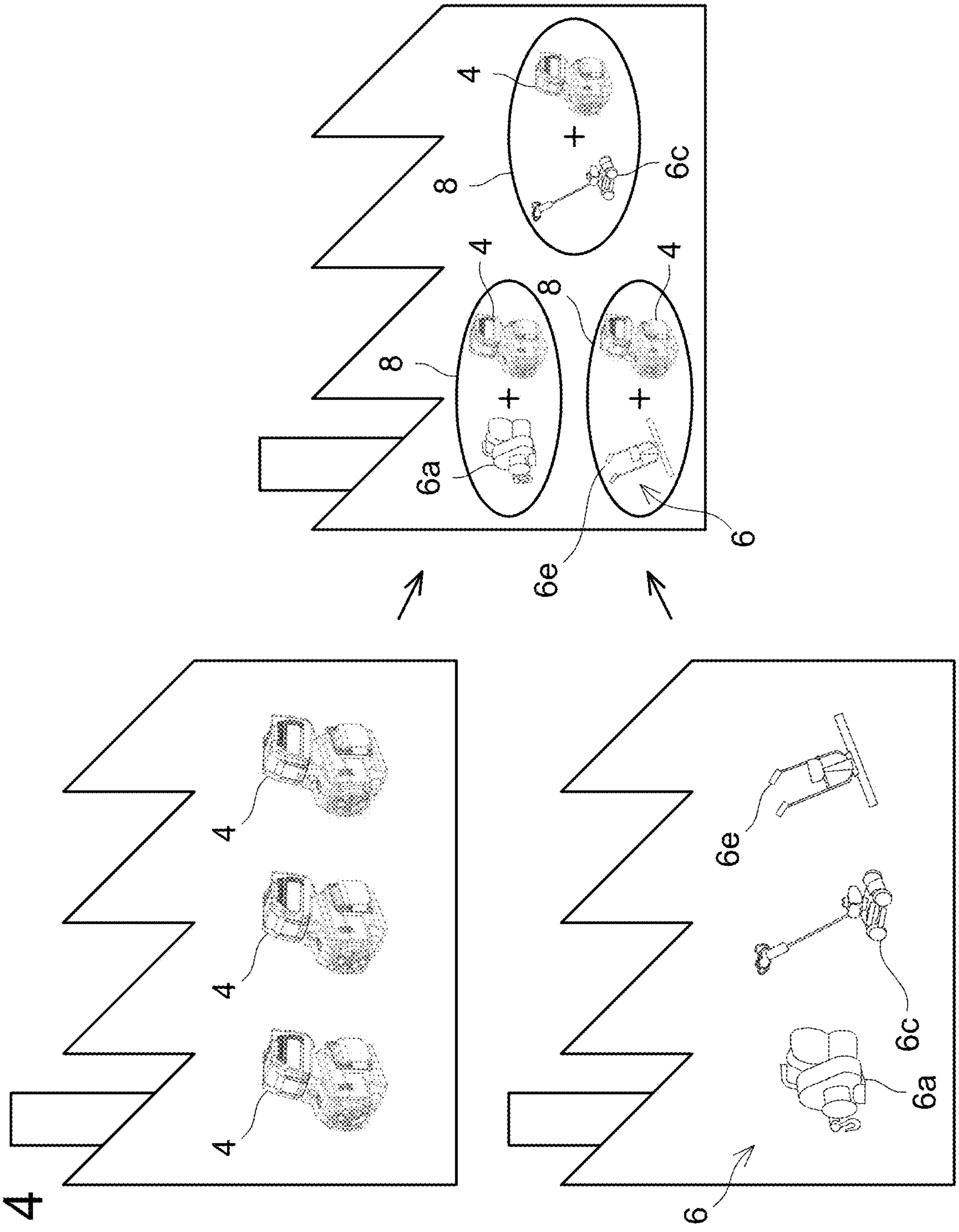
FIG. 4 shows an example of how a working machine 8 is manufactured according to the first embodiment.

In another example, as shown in FIG. 4, a first manufacturer manufactures the motor units 4, a second manufacturer manufactures working units 6, and a third manufacturer purchases the motor units 4 from the first manufacturer and purchases the working units 6 from the second manufacturer. The third manufacturer combines the purchased motor units 4 with the purchased working units 6, thereby manufacturing working machines 8.

Figure 5:
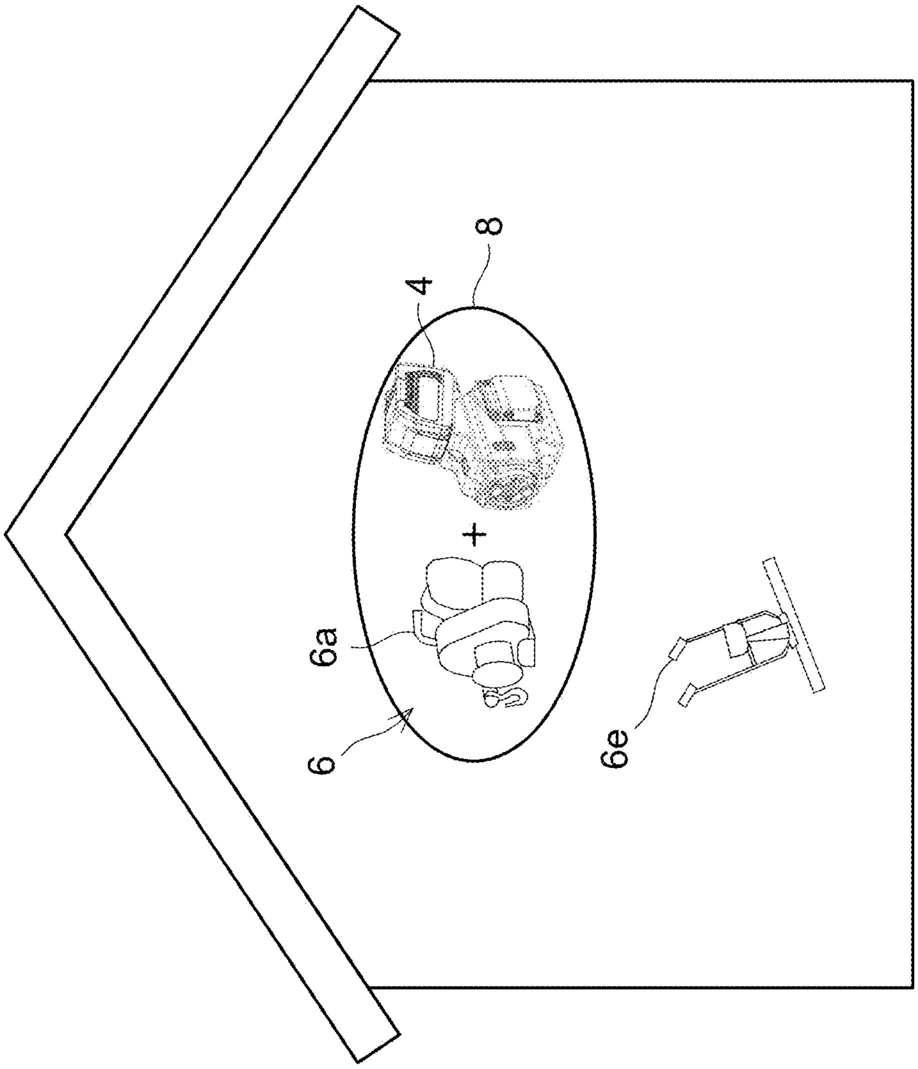
FIG. 5 shows an example of how a working machine 8 is manufactured according to the first embodiment.

In another example, as shown in FIG. 5, a user owns the motor unit 4 and different types of working units 6. The user changes combinations of the motor unit 4 and the working units 6 according to desired operations.

Figure 6:
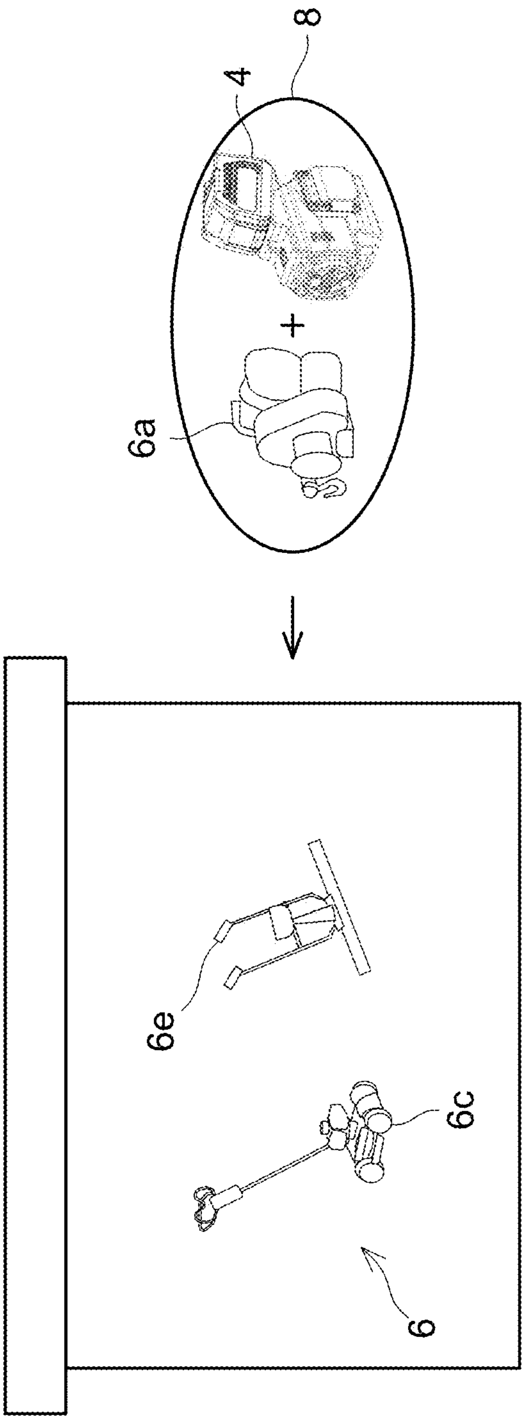
FIG. 6 shows an example of how a working machine 8 is manufactured according to the first embodiment.

In another example, as shown in FIG. 6, a user owns a working machine 8, and a store sells different types of working units 6. The user purchases a desired working unit 6 at the store. The store combines the motor unit 4 of the working machine 8 owned by the user with the purchased working unit 6. A working machine 8 is thereby manufactured.

Figure 7:
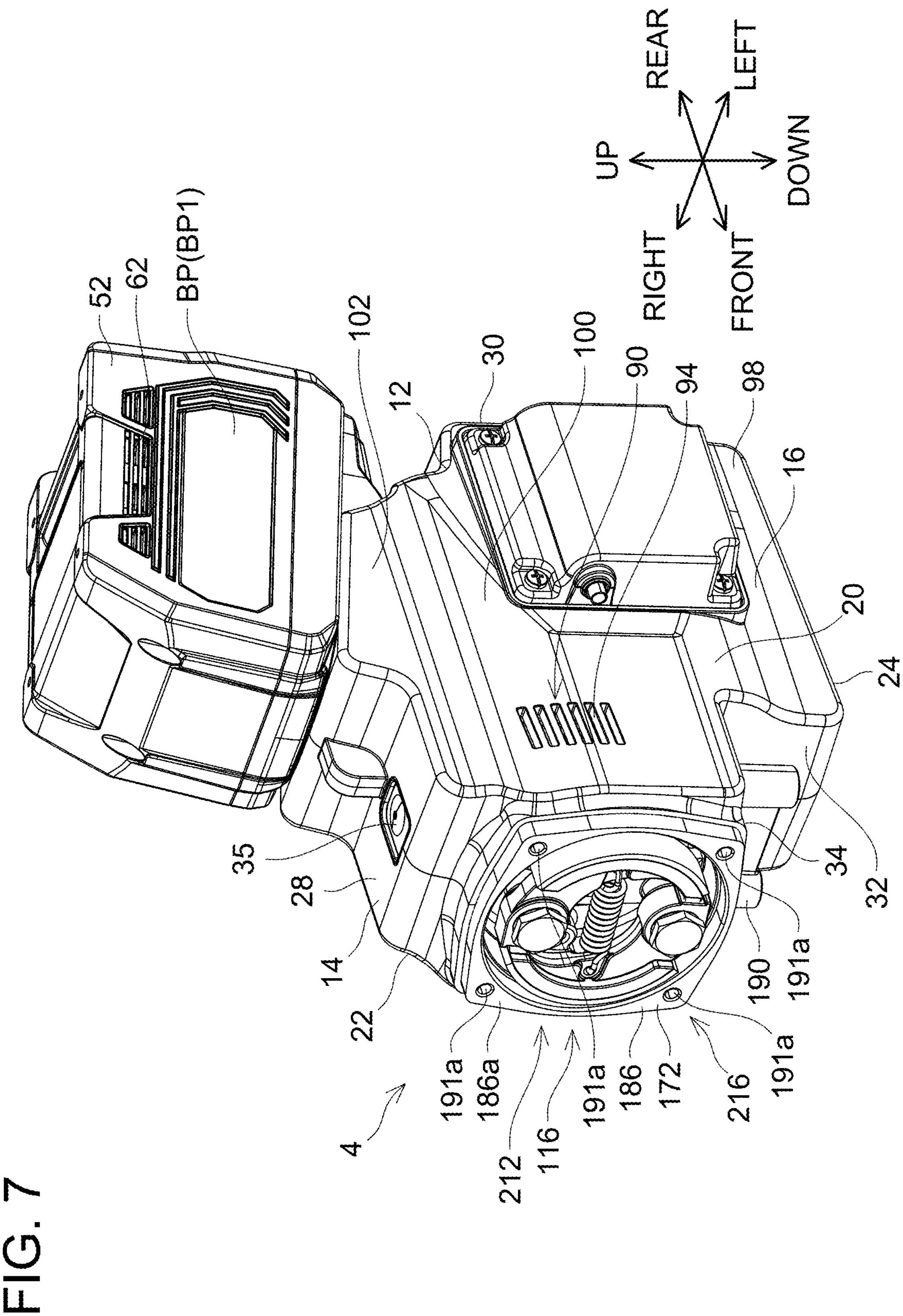
FIG. 7 shows a perspective view of a motor unit 4 and a battery pack BP according to the first embodiment.
Figure 8:
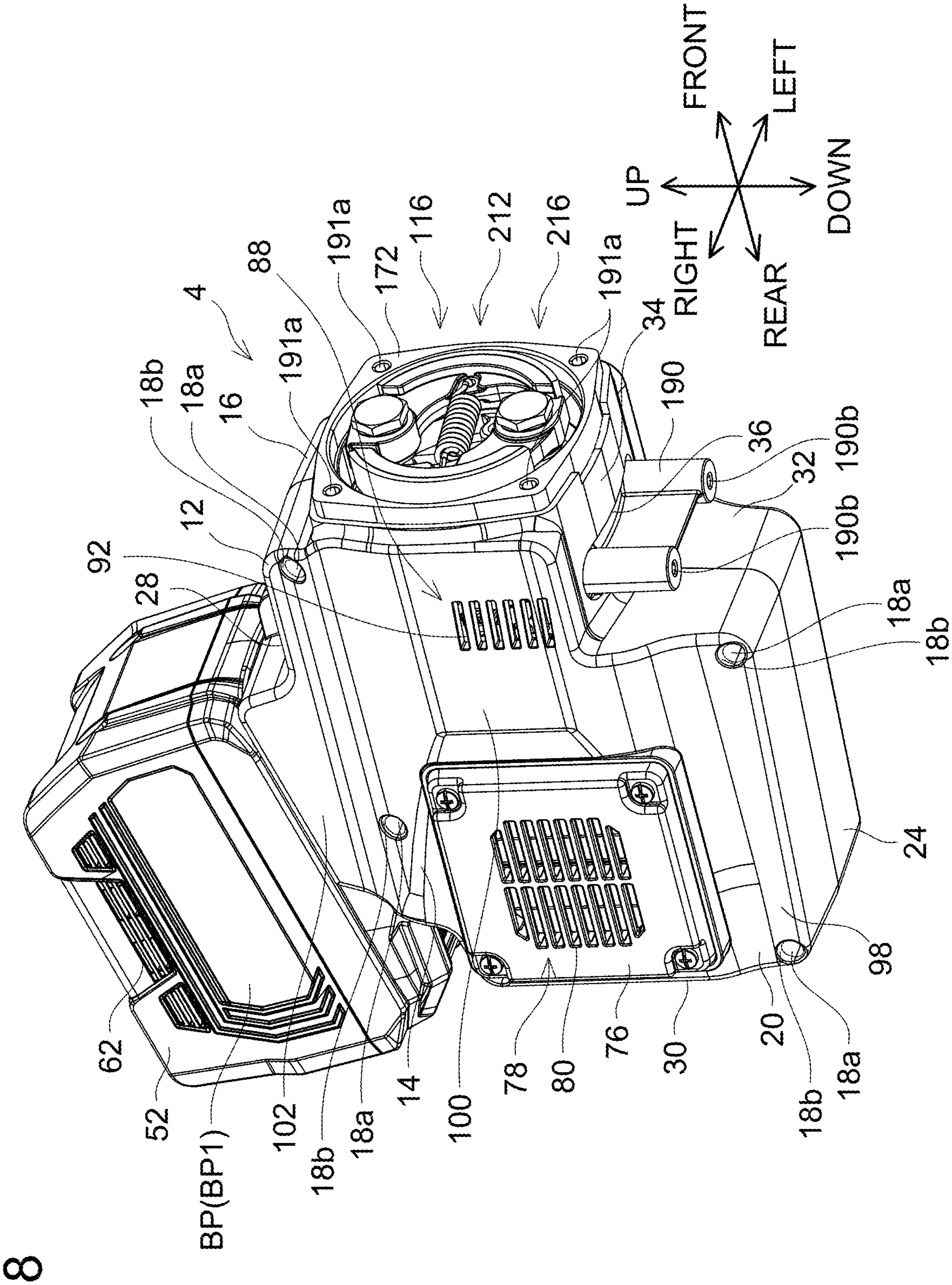
FIG. 8 shows a perspective view of the motor unit 4 and the battery pack BP according to the first embodiment.

As shown in FIGS. 7 and 8, the motor unit 4 operates with electric power from a battery pack BP. In this embodiment, the battery pack BP shown in FIGS. 7 and 8 may be termed a battery pack BP1. Hereinafter, a direction in which a motor shaft 158 of a motor 112 (to be described later) extends is termed a front-rear direction, a direction perpendicular to the front-rear direction is termed a left-right direction, and a direction perpendicular to the front-rear direction and the left-right direction is termed an up-down direction. The front-rear direction, the left-right direction, and the up-down direction are defined to describe a detail configuration of the motor unit 4. The front-rear direction, the left-right direction, and the up-down direction of the motor unit 4 may be different from a front-rear direction, a left-right direction, and an up-down direction of a working machine 8 in which the motor unit 4 is combined with a working unit 6.

As shown in FIG. 9, the weight of the motor unit 4 with the battery pack BP is equal to or more than 3.0 kg and equal to or less than 7.5 kg. In this case, the length of the motor unit 4 in the front-rear direction is equal to or more than 175 mm and equal to or less than 250 mm; the length of the motor unit 4 in the left-right direction is equal to or more than 105 mm and equal to or less than 240 mm; the length of the motor unit 4 in the up-down direction is equal to or more than 225 mm and equal to or less than 280 mm; and the volume of the motor unit 4 is equal to or more than 4000 $cm^3$ and equal to or less than 13000 $cm^3$. In this embodiment, the length of the motor unit 4 in the left-right direction is 120 mm. The length of the motor unit 4 in the left-right direction may be for example equal to or less than 150 mm.

The weight of the motor unit 4 without the battery pack BP is equal to or more than 2.0 kg and equal to or less than 3.5 kg. In this case, the length of the motor unit 4 in the front-rear direction is equal to or more than 175 mm and equal to or less than 210 mm; the length of the motor unit 4 in the left-right direction is equal to or more than 105 mm and equal to or less than 240 mm; the length of the motor unit 4 in the up-down direction is equal to or more than 180 mm and equal to or less than 190 mm; and the volume of the motor unit 4 is equal to or more than 3000 $cm^3$ and equal to or less than 10000 $cm^3$.

As shown in FIGS. 7 and 8, the motor unit 4 comprises a body housing 12. For example, the body housing 12 is constituted of a resin material. As shown in FIG. 9, the weight of the body housing 12 is equal to or more than 0.8 kg and equal to or less than 1.2 kg. The length of the body housing 12 in the front-rear direction is equal to or more than 175 mm and equal to or less than 210 mm. The length of the body housing 12 in the left-right direction is equal to or more than 105 mm and equal to or less than 240 mm. The length of the body housing 12 in the up-down direction is equal to or more than 180 mm and equal to or less than 190 mm. The volume of the body housing 12 is equal to or more than 3000 $cm^3$ and equal to or less than 10000 $cm^3$.

As shown in FIGS. 7 and 8, the body housing 12 comprises a right body housing 14 and a left body housing 16. The right body housing 14 defines an outer contour of right half surface of the body housing 12. The left body housing 16 defines an outer contour of left half surface of the body housing 12. The right body housing 14 and the left body housing 16 each have a shape that is obtained by halving the body housing 12 along a plane including the front-rear direction and the up-down direction. The border between the right body housing 14 and the left body housing 16 is positioned at the center of the body housing 12 in the left-right direction. The right body housing 14 and the left body housing 16 define the entire outer contour of the body housing 12. An accommodating space 17 (see FIG. 17) is defined between the right body housing 14 and the left body housing 16.

The right body housing 14 and the left body housing 16 are fixed to each other with four screws 18*a*. The screws 18*a* are inserted in screw holes 18*b* defined in the right body housing 14 and screwed into screw bosses (not shown) defined in the left body housing 16. In this embodiment, the distance between screw holes 18*b* aligned in the front-rear direction and the distance between screw holes 18*b* aligned in the up-down direction are each 70.7 mm.

The body housing 12 comprises a right wall 20, a left wall 22, a lower wall 24, an upper rear wall 26 (see FIG. 10), an upper front wall 28, a rear wall 30, a front vertical wall 32, and a front horizontal wall 34. In the left-right direction, the lower wall 24, the upper rear wall 26, the upper front wall 28, the rear wall 30, the front vertical wall 32, and the front horizontal wall 34 are positioned between the right wall 20 and the left wall 22. The lower wall 24 contacts a reference plane P (see FIG. 17) when the motor unit 4 is on the reference plane P. The lower wall 24 is inclined relative to a plane P1 including the left-right direction and the front-rear direction.

Figure 10:
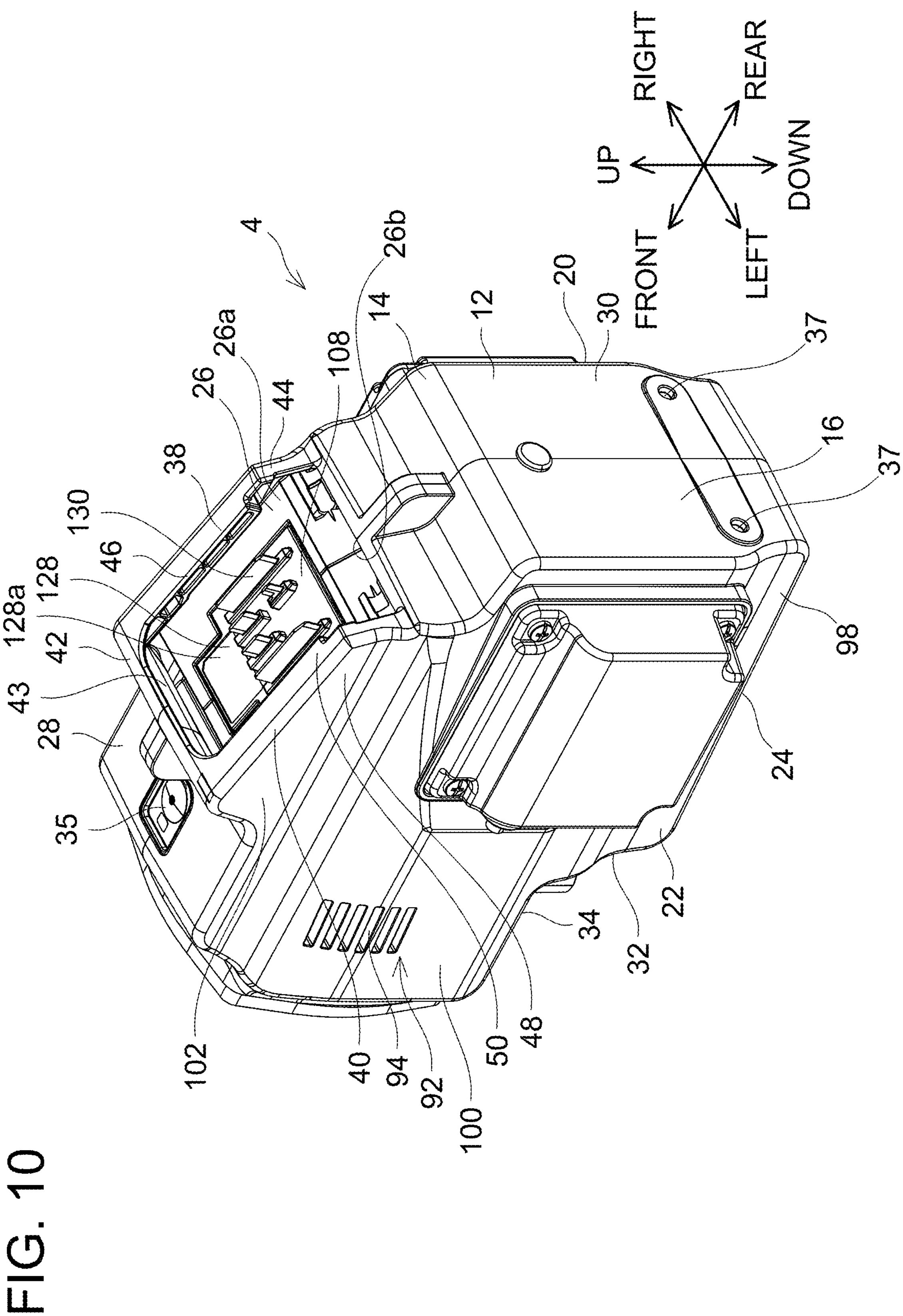
FIG. 10 shows a perspective view of the motor unit 4 with the battery pack BP removed therefrom, according to the first embodiment.
Figure 11:
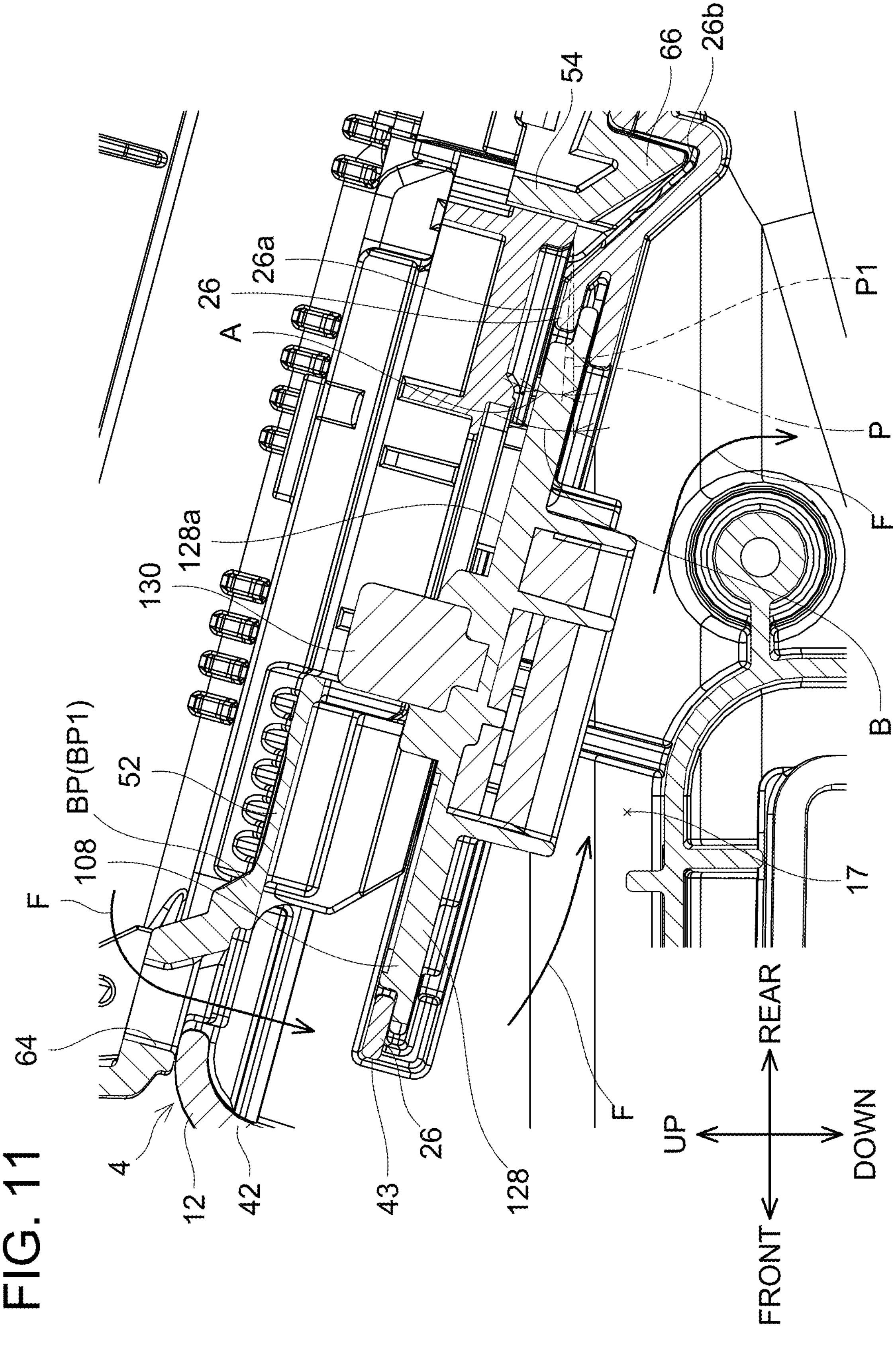
FIG. 11 shows a cross-sectional view of the motor unit 4 in the vicinity of a battery terminal 108 according to the first embodiment.

As shown in FIG. 10, the upper rear wall 26 opposes the lower wall 24. The upper rear wall 26 extends rearward and downward from its front end. As shown in FIG. 11, the upper rear wall 26 is inclined relative to the plane P1 including the left-right direction and the front-rear direction. An inclination angle A of an upper surface 26*a* of the upper rear wall 26 relative to the plane P1 is equal to or more than 5 degrees and equal to or less than 45 degrees. The upper rear wall 26 is also inclined relative to the lower wall 24 (see FIG. 7), i.e., the reference plane P (see FIG. 17). An inclination angle B of the upper surface 26*a* of the upper rear wall 26 relative to the reference plane P is equal to or more than 5 degrees and equal to or less than 45 degrees. Thus, a liquid on the upper rear wall 26 flows along the upper rear wall 26 down to the reference plane P. In FIG. 11, a plane parallel to the reference plane P is depicted by a dash-dot line.

As shown in FIG. 10, the upper front wall 28 is positioned forward of the upper rear wall 26. As shown in FIGS. 7 and 8, the upper front wall 28 extends along the plane P1 on which the left-right direction and the front-rear direction lie (see FIG. 11). A main power switch 35 is positioned on the upper front wall 28.

Figure 12:
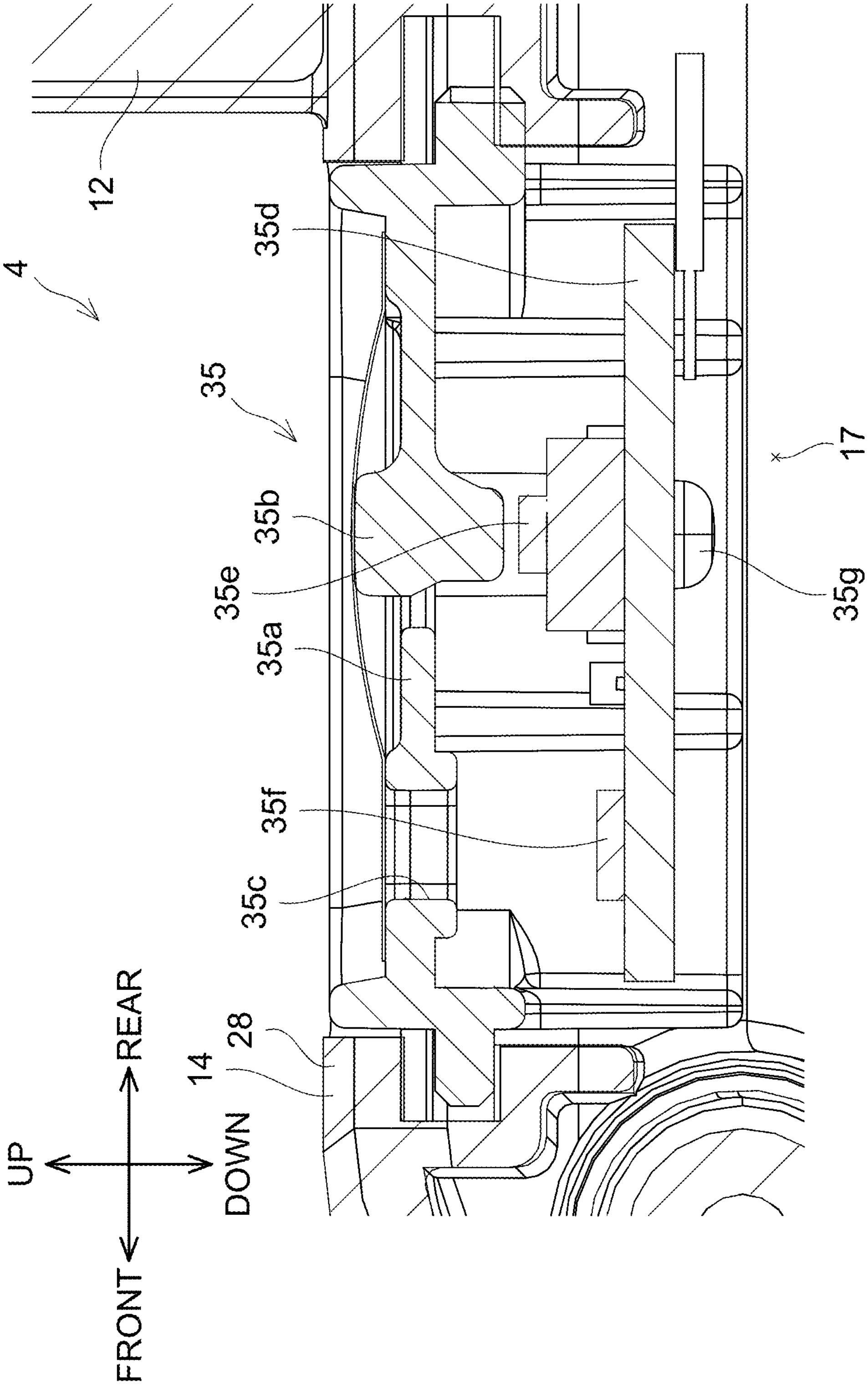
FIG. 12 shows a side cross-sectional view of the motor unit 4 in the vicinity of a main power switch 35 according to the first embodiment.

As shown in FIG. 12, the main power switch 35 comprises a base 35*a*, a manipulation button 35*b*, a display window 35*c*, a circuit board 35*d*, a switch 35*e*, and an LED 35*f*. The base 35*a* is held between the right body housing 14 and the left body housing 16 (see FIG. 7) to be supported by the body housing 12. The base 35*a* is constituted of for example a resin material. The manipulation button 35*b* and the display window 35*c* are positioned on/in the base 35*a*. The manipulation button 35*b* receives a user's operation for switching the motor unit 4 between an on-state and an off-state. The circuit board 35*d* is fixed to the base 35*a* from below the base 35*a* with a screw 35*g*. The switch 35*e* and the LED 35*f* are positioned on the upper surface of the circuit board 35*d*. The switch 35*e* is positioned immediately below the manipulation button 35*b*. When the manipulation button 35*b* is pressed, the switch 35*e* is pressed by the manipulation button 35*b*. Thereby, the motor unit 4 is switched between the on-state and the off-state. The LED 35*f* is positioned immediately below the display window 35*c*. The LED 35*f* lights when the motor unit 4 is in the on-state. The light from the LED 35*f* is visible to the user through the display window 35*c*.

As shown in FIG. 8, the front vertical wall 32 extends upward from the front end of the lower wall 24. The front horizontal wall 34 extends forward from the upper end of the front vertical wall 32. The front horizontal wall 34 opposes the upper front wall 28. The front horizontal wall 34 includes a through hole 36 extending through the front horizontal wall 34 in the up-down direction. The through hole 36 straddles across the border between the right body housing 14 and the left body housing 16.

As shown in FIG. 10, the body housing 12 includes two screw holes 37. The two screw holes 37 are positioned neat the lower end of the rear wall 30. The screw holes 37 extends through the rear wall 30 in the front-rear direction. One of the screw holes 37 is positioned in the right body housing 14. The other screw hole 37 is positioned in the left body housing 16. The screw holes 37 are configured to allow screws 354 (see FIG. 48) to be screwed thereto. The body housing 12 is configured to be fixed to a working unit 6 (see FIG. 1) via the screw holes 37 and the screws 354.

The body housing 12 further comprises a right rail 38, a left rail 40, and a connection wall 42. The right rail 38 and the left rail 40 are positioned on the upper rear wall 26. The right rail 38 extends from the rear end of the upper rear wall 26 toward the front end thereof along the right end of the upper rear wall 26. The left rail 40 extends from the rear end of the upper rear wall 26 toward the front end thereof along the left end of the upper rear wall 26. The left rail 40 opposes the right rail 38 in the left-right direction. The connection wall 42 connects the front end of the right rail 38 to the front end of the left rail 40. The connection wall 42 is connected to the rear end of the upper front wall 28. The connection wall 42 is separated from the front end of the upper rear wall 26. Thereby, an opening 43 is formed between the connection wall 42 and the front end of the upper rear wall 26. The opening 43 allows the accommodating space 17 (see FIG. 17) within the body housing 12 to communicate with the external space of the body housing 12.

The right rail 38 comprises a right rail base 44 extending upward from the upper rear wall 26 and a right rail claw 46 projecting leftward from the upper end of the right rail base 44. The left rail 40 comprises a left rail base 48 extending upward from the upper rear wall 26 and a left rail claw 50 projecting rightward from the upper end of the left rail base 48. The right rail claw 46 and the left rail claw 50 serve as a rail via which the battery pack BP (see FIG. 13) is attached to the body housing 12.

Figure 13:
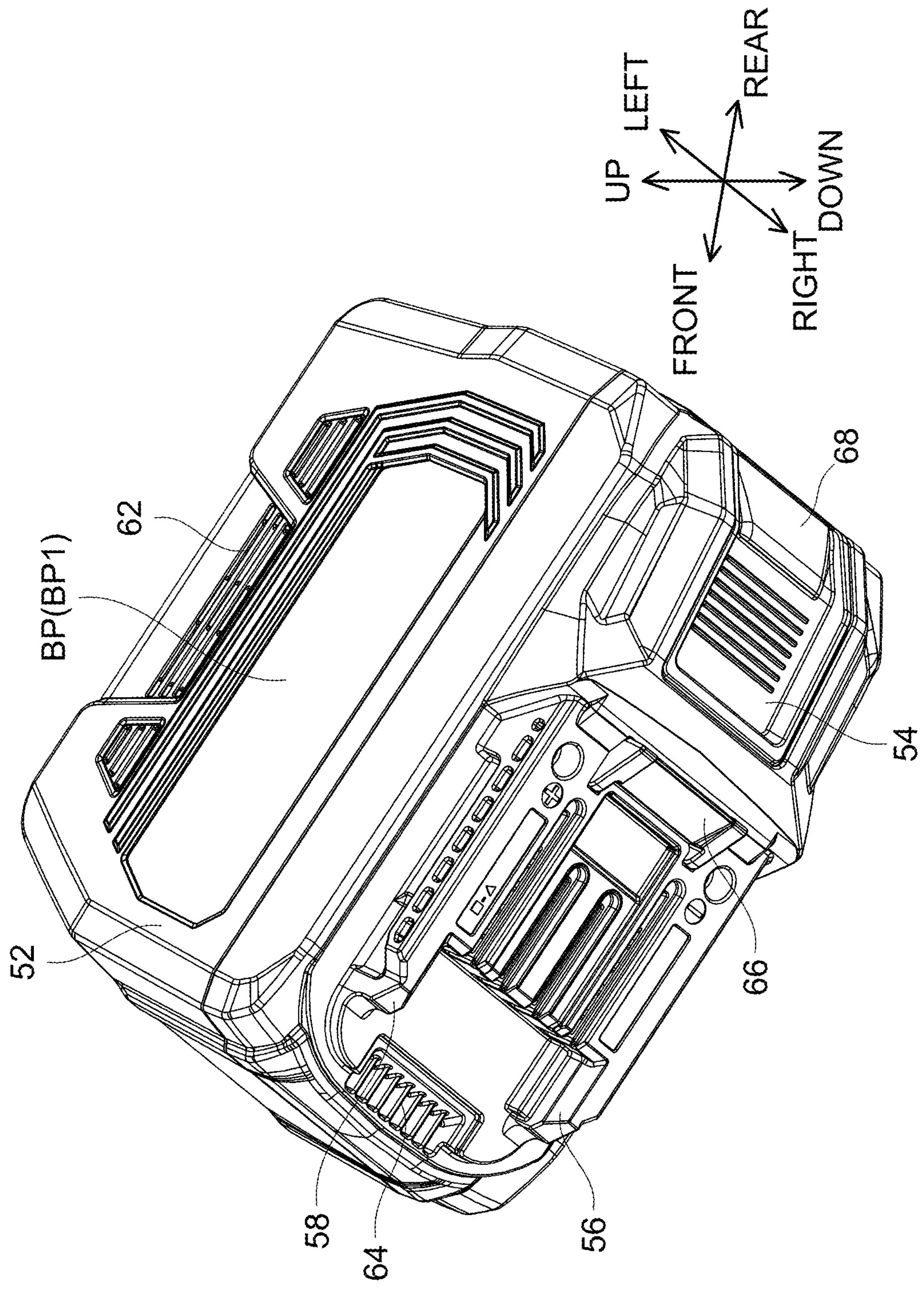
FIG. 13 shows a perspective view of the battery pack BP according to the first embodiment.

Now, the battery pack BP shown in FIG. 13 is described. The battery pack BP comprises one or more chargeable and dischargeable secondary batteries such as lithium ion batteries. As shown in FIG. 9, the weight of the battery pack BP is equal to or more than 0.6 kg and equal to or less than 2.0 kg. The length of the battery pack BP in the front-rear direction is equal to or more than 115 mm and equal to or less than 155 mm. The length of the battery pack BP in the left-right direction is equal to or more than 75 mm and equal to or less than 85 mm. The length of the battery pack BP in the up-down direction is equal to or more than 65 mm and equal to or less than 115 mm. The volume of the battery pack BP is equal to or more than 500 $cm^3$ and equal to or less than 1500 $cm^3$.

As shown in FIG. 14, the maximum voltage of the battery pack BP is equal to or more than 20 V and equal to or less than 100 V. The maximum voltage of the battery pack BP may be equal to or more than 40V and equal to or less than 80V. Further, the rated capacity of the battery pack BP is equal to or more than 1.5 Ah and equal to or less than 18 Ah. The battery pack BP shown in FIGS. 7 and 8, i.e., the battery pack BP1, may have the maximum voltage of 40 V and the rated capacity of for example 8.0 Ah. The battery pack BP may have the maximum voltage of 40 V and the rated capacity of 2.5 Ah. Alternatively, the battery pack BP may have the maximum voltage of 40 V and the rated capacity of 4.0 Ah. Alternatively, the battery pack BP may have the maximum voltage of 40 V and the rated capacity of 5.0 Ah.

As shown in FIG. 13, the battery pack BP comprises a battery housing 52, a hook 54, a right battery rail 56, and a left battery rail 58. The battery housing 52 accommodates cells of the one or more chargeable and dischargeable secondary batteries such as lithium ion batteries. The cells are not particularly limited in terms of the shape. For example, each cell may have a cylindrical shape and may be a laminated cell (pouch cell).

The battery housing 52 includes a battery inlet 62 and a battery outlet 64. The battery inlet 62 and the battery outlet 64 are configured to allow an internal space of the battery housing 52 to communicate with an external space thereof.

The hook 54 is movably attached to the battery housing 52. The hook 54 comprises an engagement portion 66 and a manipulation portion 68. The engagement portion 66 is for example an engagement claw. The engagement portion 66 usually projects outside the battery housing 52. When the manipulation portion 68 is pushed into the battery housing 52, the entire engagement portion 66 is thereby moved into the battery housing 52.

Figure 15:
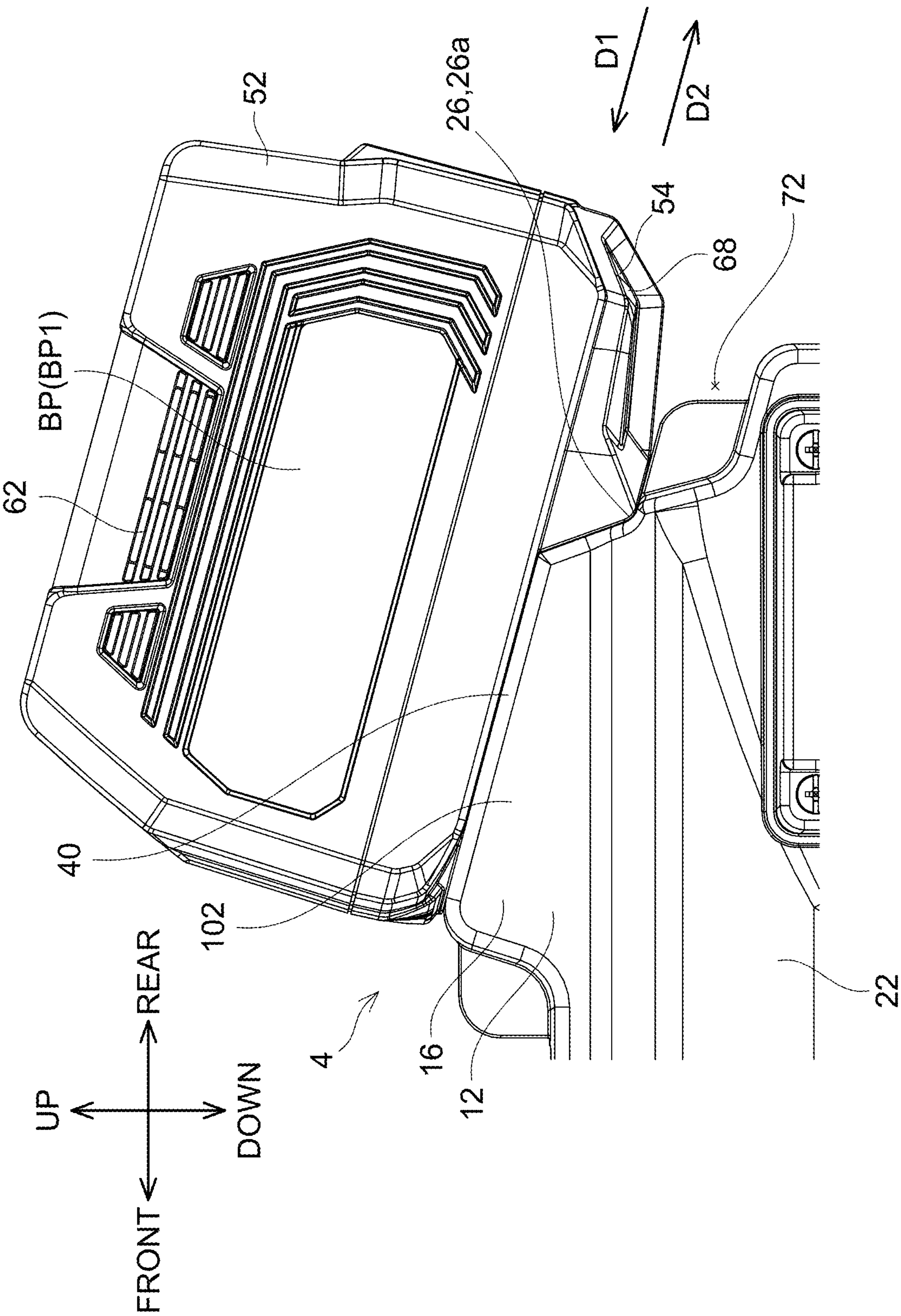
FIG. 15 shows a left side view of the motor unit 4 in the vicinity of the battery pack BP according to the first embodiment.

The right battery rail 56 and the left battery rail 58 are positioned near the battery outlet 64. The right battery rail 56 opposes the left battery rail 58 in the left-right direction. The engagement portion 66 is positioned between the right battery rail 56 and the left battery rail 58. In the state where the motor unit 4 is on the reference plane P (see FIG. 17) as shown in FIG. 15, when the battery pack BP is slid in a first direction D1, which is upward and forward from the rear of the body housing 12, (i.e., in a direction away from the reference plane P), the battery pack BP is guided by the right rail 38 (see FIG. 10) and the left rail 40 (see FIG. 10) to slide on the upper surface 26*a* of the upper rear wall 26. Further, the right rail claw 46 engages with the right battery rail 56 (see FIG. 13) and the left rail claw 50 engages with the left battery rail 58 (see FIG. 13). While the battery pack BP is sliding on the upper surface 26*a*, the engagement portion 66 (see FIG. 13) is pushed into the battery housing 52 by the upper surface 26*a*. As shown in FIG. 11, a groove 26*b* is defined in the upper surface 26*a*. The engagement portion 66, when reaching the groove 26*b*, pops out from the inside of the battery housing 52 and engages with the upper surface 26*a* within the groove 26*b*. Thereby, the battery pack BP is attached to the body housing 12. In this attached state, the battery outlet 64 faces the opening 43. As shown in FIG. 10, the groove 26*b* straddles across the border between the right body housing 14 and the left body housing 16. As shown in FIG. 15, in the state where the battery pack BP is attached to the body housing 12, there is a space 72 between a lower rear portion of the battery pack BP and the body housing 12. The user grips the battery pack BP with at least one of his/her fingers inserted in the space 72 to push the manipulation portion 68 and then slides the battery pack BP in a second direction D2. Thereby, the battery pack BP is easily removed from the body housing 12 with the aid of the weight of the battery pack BP.

Figure 16:
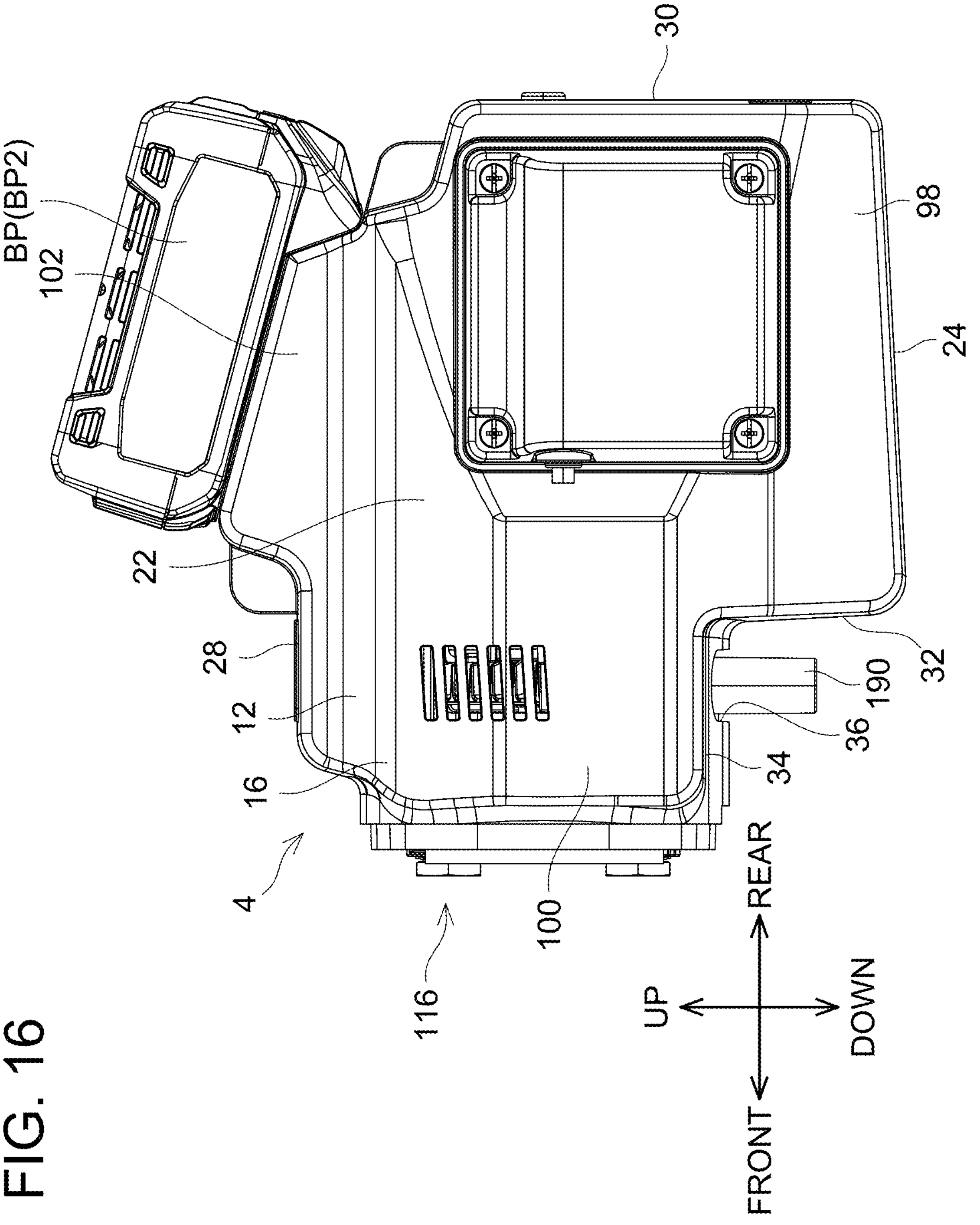
FIG. 16 shows a left side view of the motor unit 4 and the battery pack BP according to the first embodiment.

As shown in FIGS. 7 and 16, various battery packs BP can be selectively attached to the body housing 12 of the motor unit 4 according to this embodiment. For example, the battery pack BP1 show in FIG. 7 has the maximum voltage of 40 V and the rated capacity of for example 8.0 Ah. The battery pack BP shown in FIG. 16, i.e., a battery pack BP2, has the maximum voltage of 40 V and the rated capacity of 2.5 Ah. The size of the battery pack BP2 is smaller than the size of the battery pack BP1.

Figure 17:
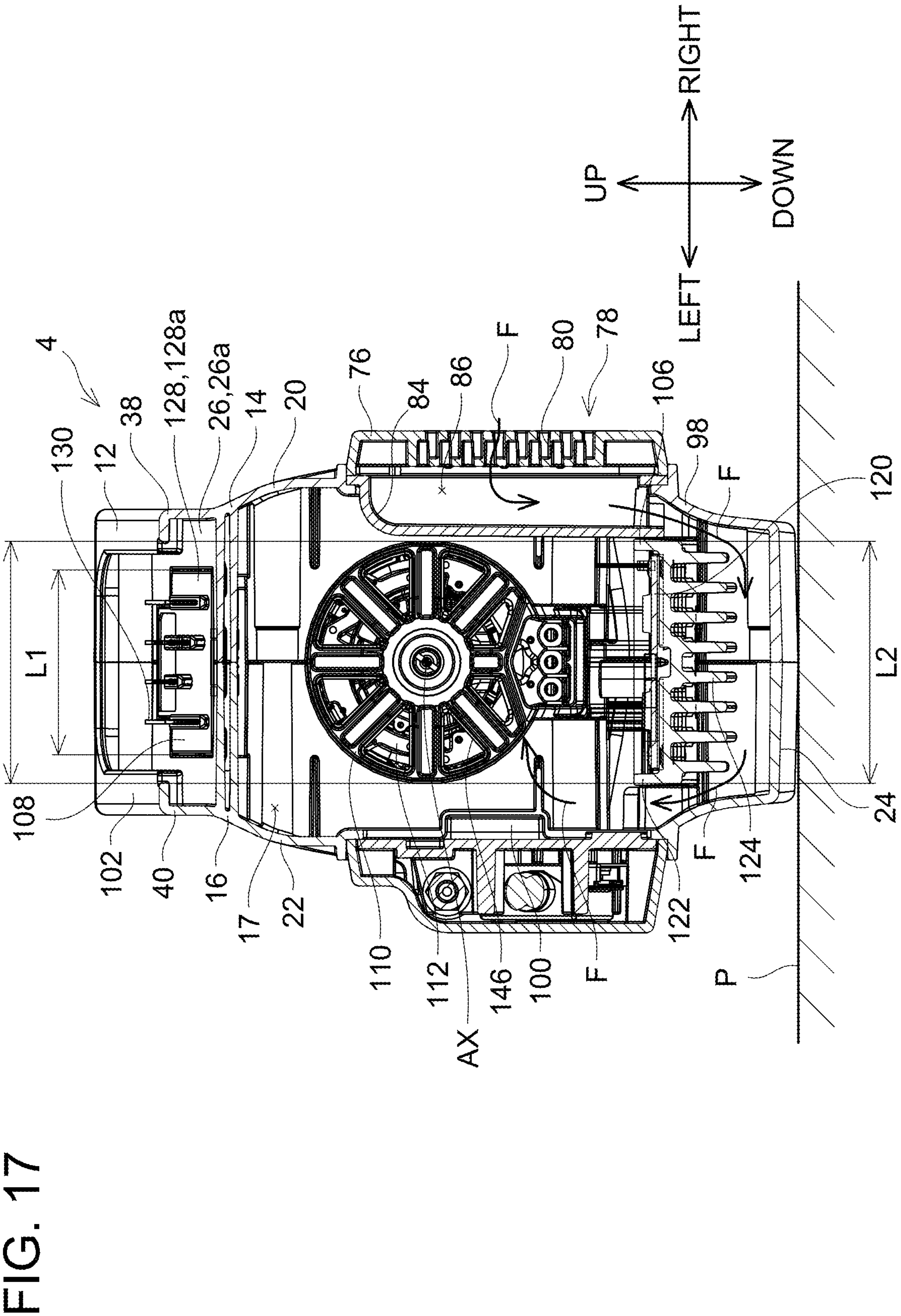
FIG. 17 shows a rear cross-sectional view of the motor unit 4 according to the first embodiment.

As shown in FIG. 8, an inlet cover 76 is fixed to a rear portion of the right wall 20 of the body housing 12, and the inlet cover 76 includes an inlet port 78. The inlet port 78 comprises a plurality of inlets 80. As shown in FIG. 17, the inlets 80 are configured to allow the accommodating space 17 within the body housing 12 to communicate with the external space of the body housing 12.

An air guide 84 is held between the inlet cover 76 and the right wall 20. The air guide 84 is positioned within the accommodating space 17. The air guide 84 is separated from the inlet port 78. The air guide 84 includes an inlet path 86 communicating with the inlet port 78. The inlet path 86 extends in the up-down direction. The inlet path 86 communicates with the accommodating space 17 at its lower end.

As shown in FIGS. 7 and 8, the body housing 12 further comprises a first outlet port 88 and a second outlet port 90. As shown in FIG. 8, the first outlet port 88 is positioned in a front portion of the right wall 20. The first outlet port 88 is positioned forward of the inlet cover 76. Thus, the inlets 80 are positioned rearward of the first outlet port 88. In an assembly in which the motor unit 4 is combined with a working unit 6 (see FIG. 37), the front end of the motor unit 4 is fixed to the working unit 6, and thus the inlets 80 are farther away from the working unit 6 than the first outlet port 88. Therefore, even when water or dust is caused by the working unit 6 performing an operation, the water or the dust is suppressed from entering the accommodating space 17 (see FIG. 17) of the body housing 12 through the inlets 80. The first outlet port 88 comprises a plurality of first outlets 92. The first outlets 92 are configured to allow the accommodating space 17 (see FIG. 17) within the body housing 12 to communicate with the external space of the body housing 12.

As shown in FIG. 7, the second outlet port 90 is positioned in a front portion of the left wall 22. In the front-rear direction, the position of the second outlet port 90 is substantially coincide with the position of the first outlet port 88 (see FIG. 8). The second outlet port 90 comprises a plurality of second outlets 94. The second outlets 94 are configured to allow the accommodating space 17 (see FIG. 17) within the body housing 12 to communicate with the external space of the body housing 12.

As shown in FIGS. 7 and 8, the body housing 12 comprises a board accommodating portion 98, a motor accommodating portion 100, and a battery attachment portion 102. The board accommodating portion 98 is positioned in a lower portion of the body housing 12. The board accommodating portion 98 is defined by a lower portion of the right wall 20, a lower portion of the left wall 22, the lower wall 24, a lower portion of the rear wall 30 and the front vertical wall 32.

The motor accommodating portion 100 is positioned above the board accommodating portion 98. The length of the motor accommodating portion 100 in the front-rear direction is longer than the length of the board accommodating portion 98 in the front-rear direction. The length of the motor accommodating portion 100 in the front-rear direction is substantially the same as the length of the body housing 12 in the front-rear direction. The battery attachment portion 102 is defined by an upper portion of the right wall 20, an upper portion of the left wall 22, the upper front wall 28, an upper portion of the rear wall 30, and the front horizontal wall 34.

The battery attachment portion 102 is positioned above the motor accommodating portion 100. The battery attachment portion 102 is defined by the upper rear wall 26, the right rail 38, the left rail 40, and the connection wall 42. In other words, the battery attachment portion 102 comprises the upper rear wall 26, the right rail 38, the left rail 40, and the connection wall 42.

As shown in FIG. 17, the width of the board accommodating portion 98 in the left-right direction and the width of the battery attachment portion 102 in the left-right direction are each smaller than the width of the motor accommodating portion 100 in the left-right direction. That is, the widths of the upper and lower portions of the body housing 12 in the left-right direction are smaller than the width of the middle portion of the body housing 12 in the left-right direction.

Thus, the body housing 12 has a smaller size as compared to a body housing of which width in the left-right direction is constant.

Figure 18:
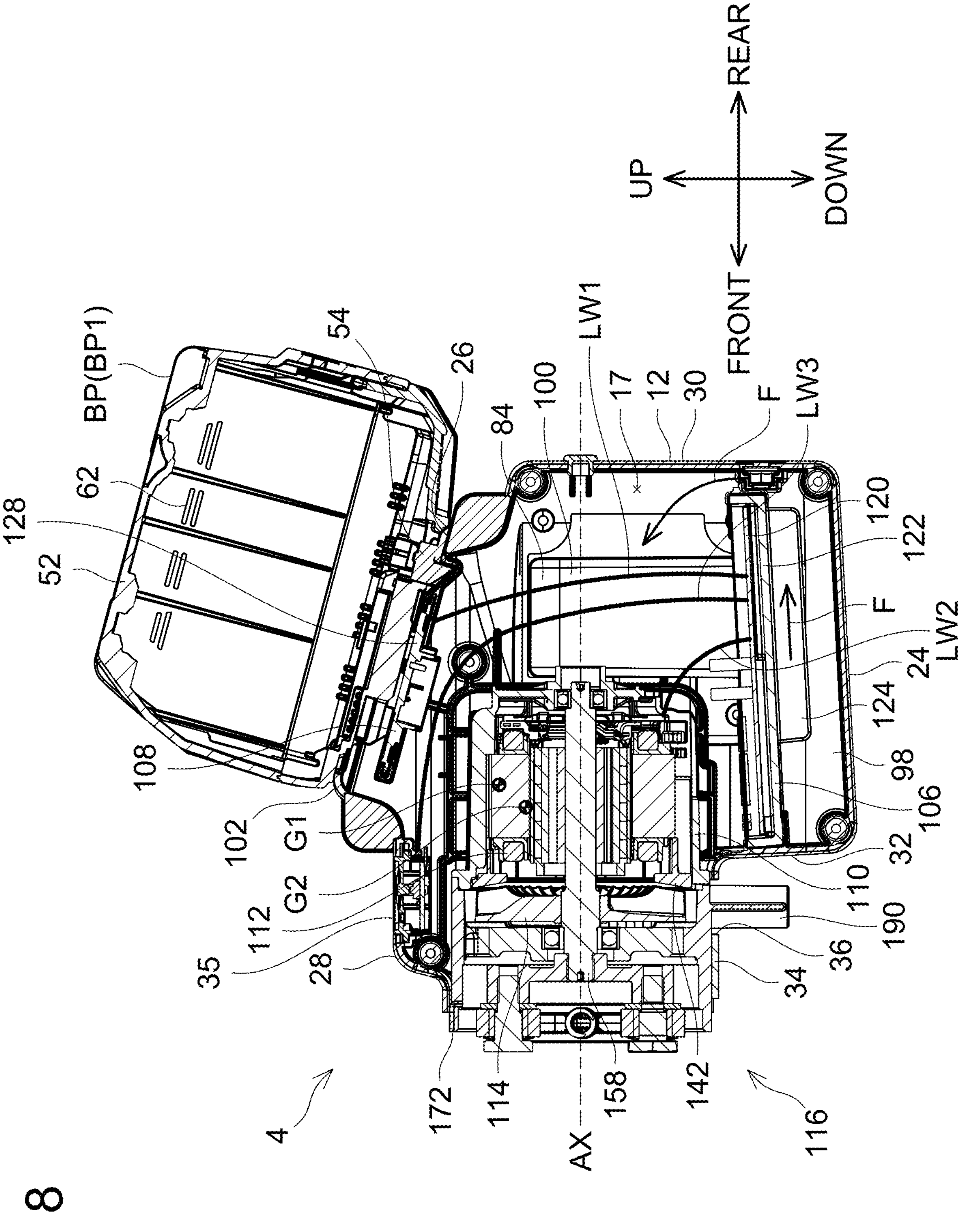
FIG. 18 shows a side cross-sectional view of the motor unit 4 and the battery pack BP according to the first embodiment.

As shown in FIG. 18, the motor unit 4 comprises a control unit 106, a battery terminal 108, a motor housing 110, a motor 112, a cooling fan 114, and an output unit 116. In FIG. 18, the internal structure of the battery pack BP is not shown. The control unit 106, the battery terminal 108, the motor housing 110, the motor 112, the cooling fan 114, and the output unit 116 are positioned in the accommodating space 17.

Figure 19:
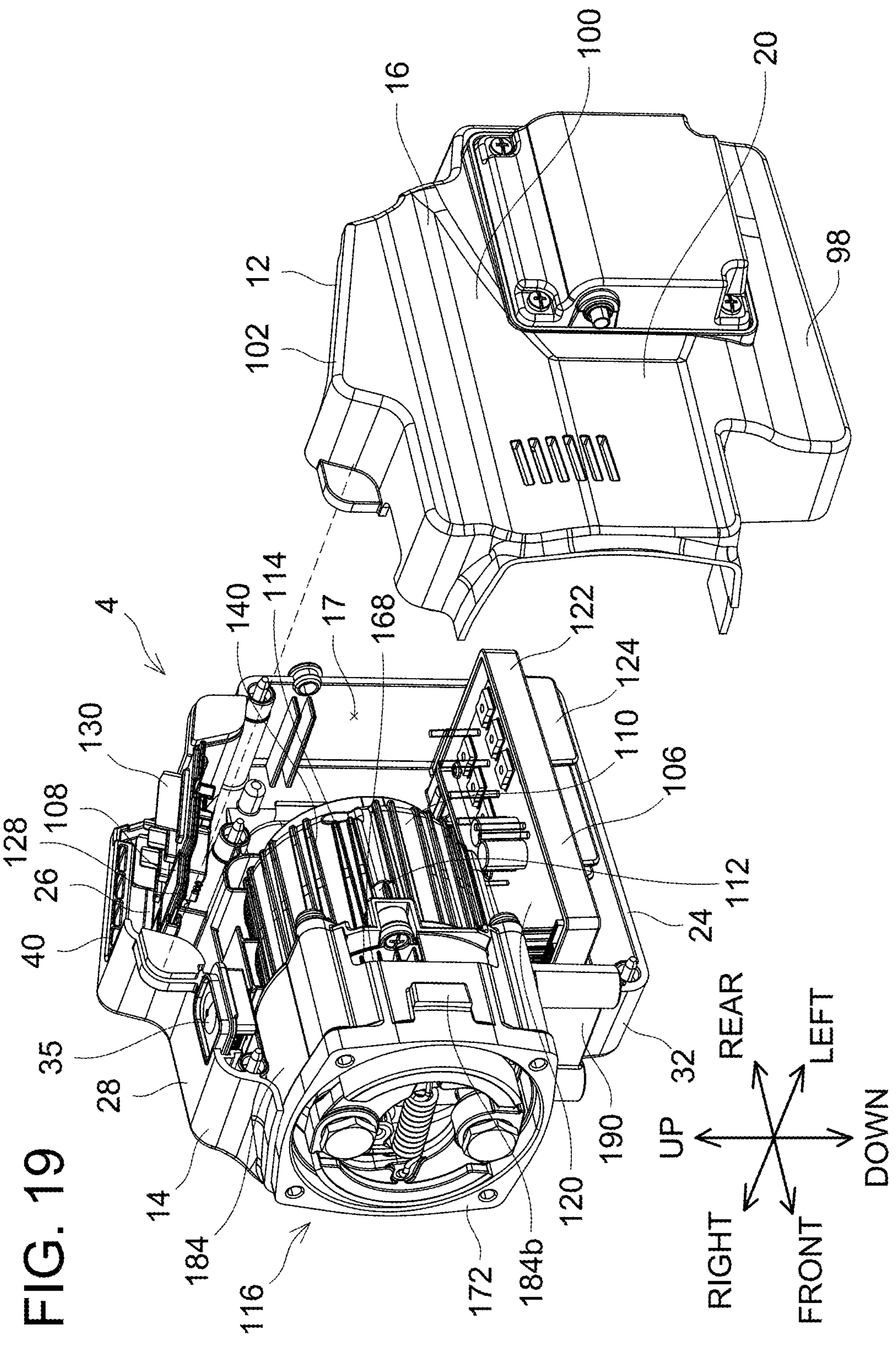
FIG. 19 shows an exploded perspective view of the motor unit 4 according to the first embodiment.

As shown in FIG. 19, the control unit 106 is held between the right body housing 14 and the left body housing 16 (see FIG. 17) to be supported by both the right body housing 14 and the left body housing 16. As shown in FIG. 18, the control unit 106 is positioned in the board accommodating portion 98. The control unit 106 is in contact with the front vertical wall 32. The control unit 106 is separated from the rear wall 30 in the front-rear direction. The control unit 106 is electrically connected to the battery terminal 108 via a first lead LW1. The control unit 106 is electrically connected to the motor 112 via a second lead LW2. The control unit 106 is connected to the main power switch 35 via third lead LW3. The control unit 106 operates with electric power supplied from the battery pack BP. The control unit 106 controls the motor 112 and the main power switch 35.

The control unit 106 comprises a control board 120 including a microcomputer and a plurality of switching elements, and a metal casing 122. The switching elements are for example IGBTs or MOSFETs. The switching elements are controlled by the microcomputer to be switched between an on-state and an off-state. The control board 120 lies along the lower wall 24.

The casing 122 has the shape of a casing open upward. This allows the second lead LW2 to be easily connected to the control board 120 and the third lead LW3 to be easily connected to the main power switch 35. The casing 122 accommodates the control board 120 therein. The control board 120 is attached to the casing 122. The casing 122 lies along the lower wall 24.

Figure 20:
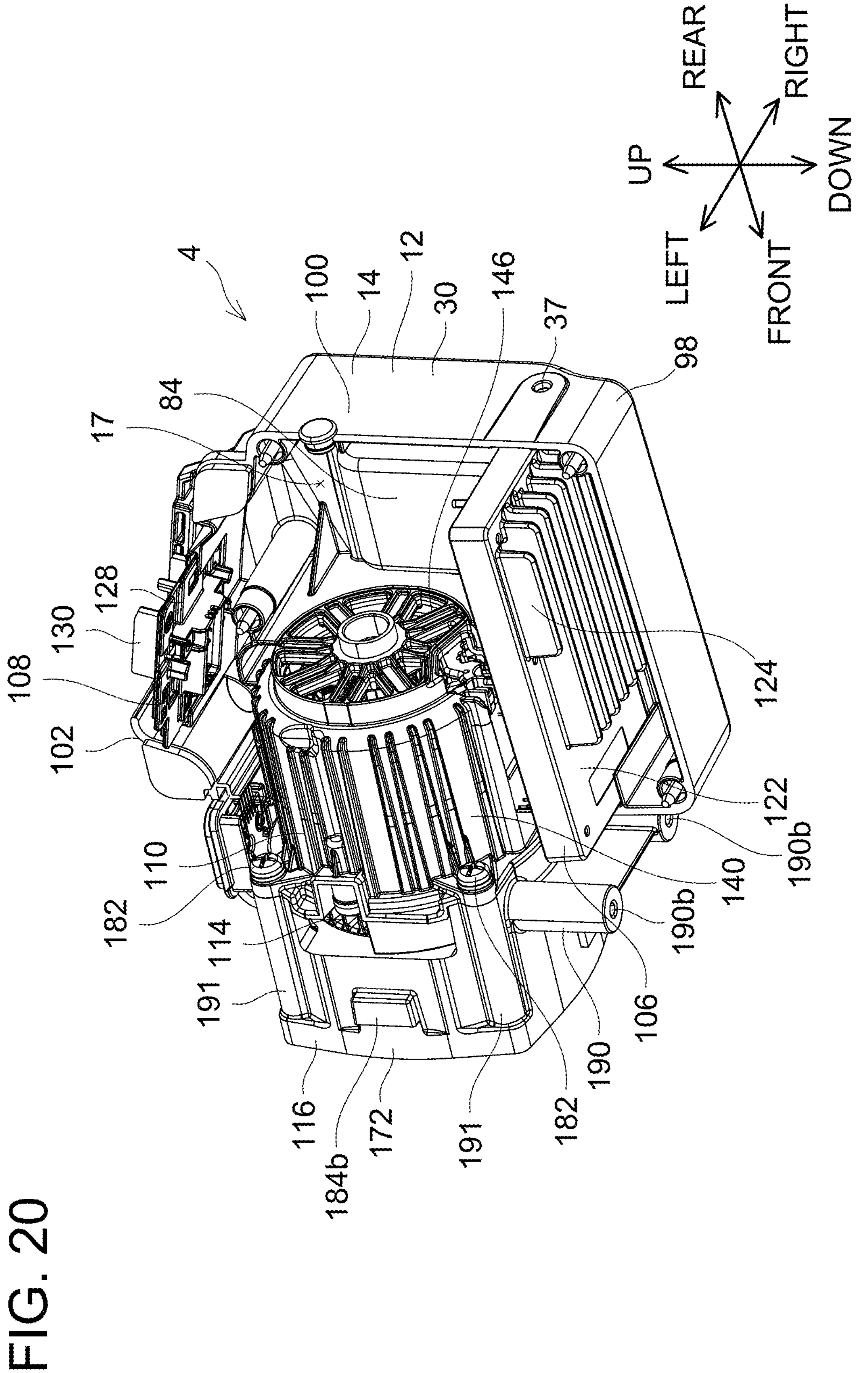
FIG. 20 shows a perspective view of the motor unit 4 with a left body housing 16 removed therefrom as viewed from the lower rear left side, according to the first embodiment.

As shown in FIG. 20, the control unit 106 further comprises a plurality of heat releasing fins 124 constituted of an aluminum alloy. The heat releasing fins 124 are positioned on the lower surface of the casing 122. The heat releasing fins 124 are formed integrally with the casing 122. The heat releasing fins 124 each have a plate shape elongated in the front-rear direction. The heat releasing fins 124 are spaced apart from each other in the left-right direction.

As shown in FIG. 19, the battery terminal 108 is held between the right body housing 14 and the left body housing 16 (see FIG. 17) to be supported by both the right body housing 14 and the left body housing 16. As shown in FIG. 18, the battery terminal 108 is positioned on the upper rear wall 26. In the front-rear direction, the battery terminal 108 is positioned between the front and rear ends of the control unit 106. In the top view of the motor unit 4, the battery terminal 108 at least partially overlaps the control unit 106. As shown in FIG. 17, a length L1 of the battery terminal 108 in the left-right direction is shorter than a length L2 of the control unit 106 in the left-right direction.

As shown in FIG. 10, the battery terminal 108 comprises a terminal base 128 and a plurality of terminal members 130. The terminal base 128 has a substantially plate shape. In the left-right direction, the terminal base 128 is positioned between the right rail 38 and the left rail 40. The terminal base 128 extends through the upper rear wall 26. An outer surface 128*a* of the terminal base 128 is exposed to the external space of the body housing 12. The outer surface 128*a* corresponds to the upper surface of the terminal base 128. The outer surface 128*a* of the terminal base 128 is substantially flush with the upper surface 26*a* of the upper rear wall 26. Thus, the inclination angle B (see FIG. 11) of the outer surface 128*a* relative to the reference plane P is equal to or more than 5 degrees and equal to or less than 45 degrees.

The terminal members 130 are fixed to the terminal base 128. The terminal members 130 project from the terminal base 128. The terminal members 130 are constituted of for example a metal material. When the battery pack BP (see FIG. 13) is attached to the battery attachment portion 102 of the body housing 12, the terminal members 130 are electrically connected to battery terminal members (not shown) of the battery pack BP. Thereby, electric power is supplied from the battery pack BP to the motor unit 4. Further, the terminal members 130 are connected to the first lead LW1. Therefore, the electric power is also supplied from the battery pack BP to the control unit 106 via the first lead LW1.

As shown in FIG. 19, the motor housing 110 is held between the right body housing 14 and the left body housing 16 (see FIG. 17) to be supported by both the right body housing 14 and the left body housing 16. As shown in FIG. 18, the motor housing 110 is positioned in a front part of the motor accommodating portion 100. The motor housing 110 is separated from the rear wall 30 in the front-rear direction. In the up-down direction, the motor housing 110 is positioned between the control unit 106 and the battery terminal 108. In the top view of the motor unit 4, the motor housing 110 at least partially overlaps each of the control unit 106 and the battery terminal 108.

Figure 21:
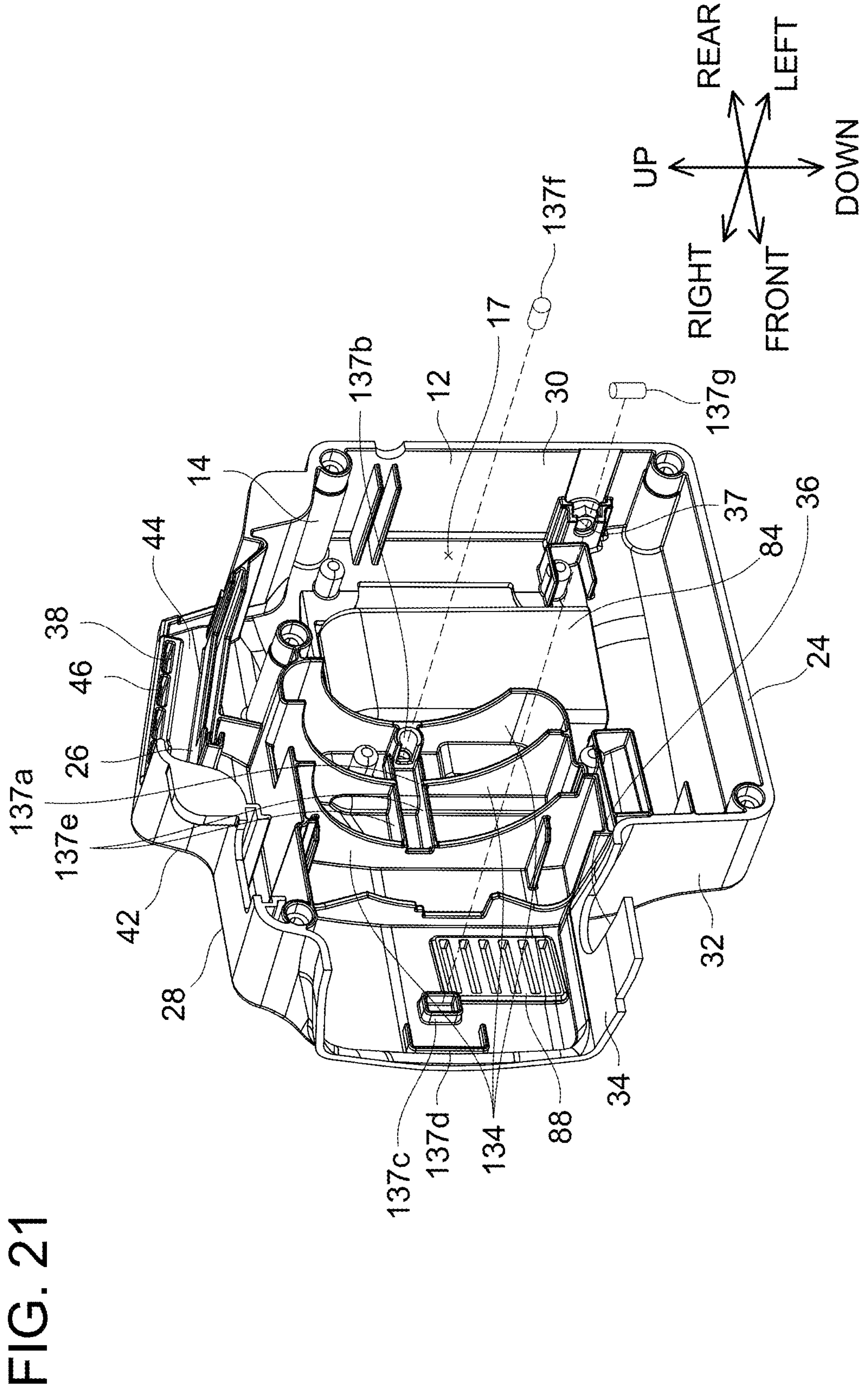
FIG. 21 shows a perspective view of a right body housing 14 according to the first embodiment.
Figure 22:
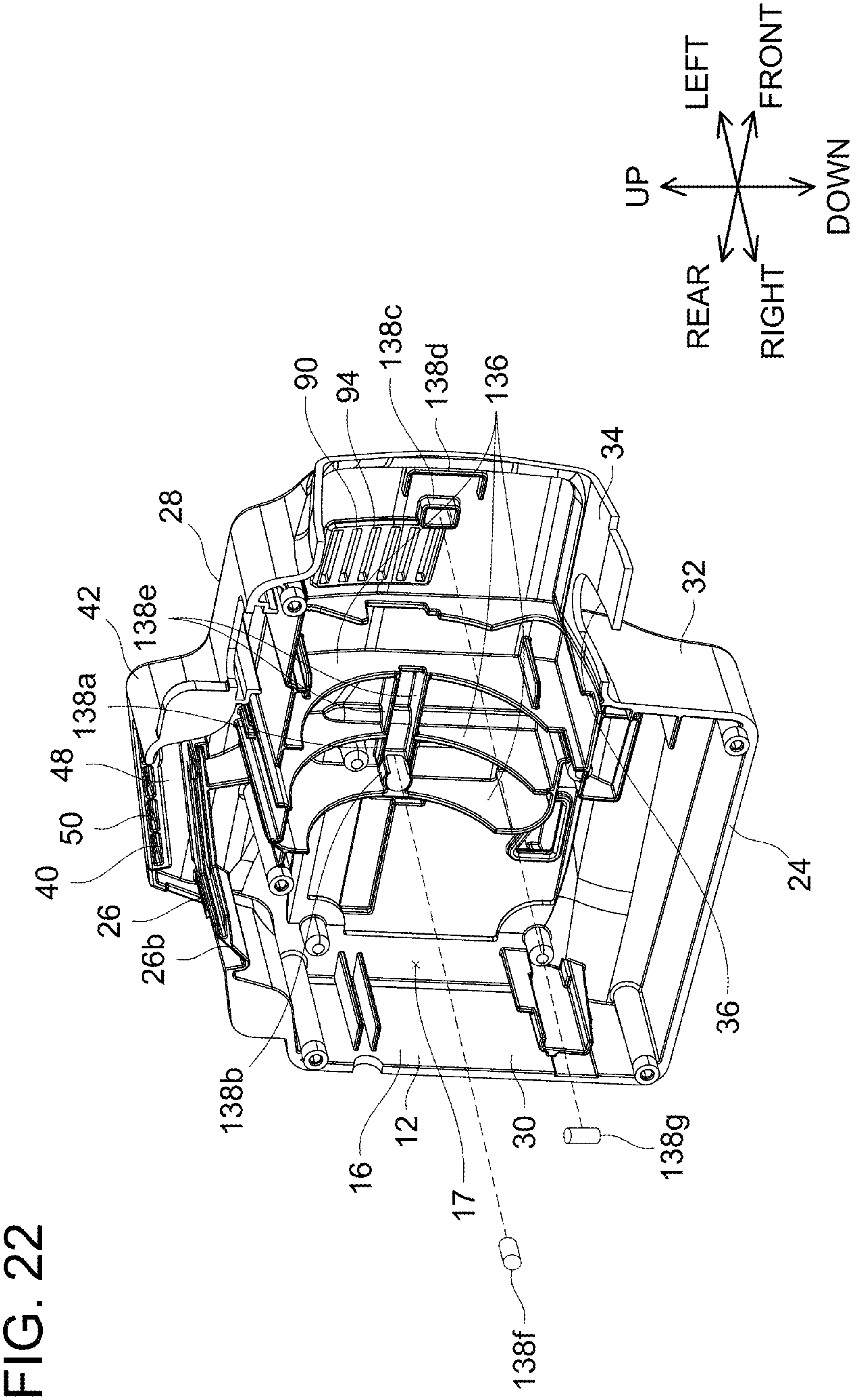
FIG. 22 shows a perspective view of the left body housing 16 according to the first embodiment.

As shown in FIG. 21, the right body housing 14 comprises a plurality of right battery supporting walls 134 (three right battery supporting walls 134 in this embodiment) projecting from the inner surface of the right body housing 14. The right battery supporting walls 134 are positioned in the motor accommodating portion 100. The right battery supporting walls 134 are positioned forward of the air guide 84 and the inlet cover 76 (see FIG. 17). The right battery supporting walls 134 are positioned rearward of the first outlet port 88. As shown in FIG. 22, the left body housing 16 comprises a plurality of left battery supporting walls 136 (three left battery supporting walls 136 in this embodiment) projecting from the inner surface of the left body housing 16. The left battery supporting walls 136 are positioned in the motor accommodating portion 100. The left battery supporting walls 136 are positioned rearward of the second outlet port 90. The right battery supporting walls 134 (see FIG. 21) and the left battery supporting walls 136 surround the outer circumferential surface of the motor housing 110 (see FIG. 18) to hold the motor housing 110. The motor housing 110 is thereby supported by the right body housing 14 and the left body housing 16.

As shown in FIG. 21, the right body housing 14 comprises a right support portion 137*a*, a first right pin support portion 137*b*, a second right pin support portion 137*c*, and a right retention portion 137*d*.

The right support portion 137*a* comprises two right support ribs 137*e*. The two right support ribs 137*e* project from the inner surface of the right body housing 14. The two right support ribs 137*e* are positioned rearward of the first outlet port 88. The two right support ribs 137*e* are spaced from each other in the up-down direction. The right support ribs 137*e* extend in the front-rear direction. The right support ribs 137*e* cut across the middle right battery supporting wall 134 in the front-rear direction. The front ends of the right support ribs 137*e* are connected to the most forward right battery supporting wall 134. The rear ends of the right support ribs 137*e* are positioned between the middle right battery supporting wall 134 and the most rearward right battery supporting wall 134.

The first right pin support portion 137*b* projects from the inner surface of the right body housing 14. The first right pin support portion 137*b* is connected to the rear ends of the two right support ribs 137*e* and the most rearward right battery supporting wall 134. The first right pin support portion 137*b* has a substantially cylindrical shape. The first right pin support portion 137*b* supports a first right pin 137*f*. The first right pin 137*f* is constituted of an elastic material. The first right pin 137*f* has a substantially cylindrical shape. The first right pin 137*f* is inserted in the first right pin support portion 137*b* to be received in the first right pin support portion 137*b*. When the first right pin 137*f* is in the first right pin support portion 137*b*, the longitudinal axis of the first right pin 137*f* extends in the left-right direction.

The second right pin support portion 137*c* projects from the inner surface of the right body housing 14. The second right pin support portion 137*c* is positioned forward of the first outlet port 88. The second right pin support portion 137*c* is a rib having a frame shape (substantially O-shape). The second right pin support portion 137*c* supports a second right pin 137*g*. The second right pin 137*g* is constituted of an elastic material. The second right pin 137*g* has a substantially cylindrical shape. The second right pin 137*g* is inserted in the second right pin support portion 137*c* to be received in the second right pin support portion 137*c*. When the second right pin 137*g* is in the second right pin support portion 137*c*, the longitudinal axis of the second right pin 137*g* extends in the up-down direction.

The right retention portion 137*d* projects from the inner surface of the right body housing 14. The right retention portion 137*d* is positioned forward of the second right pin support portion 137*c*. The right retention portion 137*d* is positioned near the front end of the right body housing 14. The right retention portion 137*d* is a rib having a substantially U-shape. The right retention portion 137*d* extends forward, bends and extends downward, and then bends and extends rearward.

As shown in FIG. 22, the left body housing 16 comprises a left support portion 138*a*, a first left pin support portion 138*b*, a second left pin support portion 138*c*, and a left retention portion 138*d*.

The left support portion 138*a* is positioned to face the right support portion 137*a* (see FIG. 21) in the left-right direction. The left support portion 138*a* comprises two left support ribs 138*e*. The two left support ribs 138*e* project from the inner surface of the left body housing 16. The two left support ribs 138*e* are positioned rearward of the second outlet port 90. The two left support ribs 138*e* are spaced from each other in the up-down direction. The left support ribs 138*e* extend in the front-rear direction. The left support ribs 138*e* cut across the middle left battery supporting wall 136 in the front-rear direction. The front ends of the left support ribs 138*e* are connected to the most forward left battery supporting wall 136. The rear ends of the left support ribs 138*e* are positioned between the middle left battery supporting wall 136 and the most rearward left battery supporting wall 136.

The first left pin support portion 138*b* is positioned to face the first right pin support portion 137*b* (see FIG. 21) in the left-right direction. The first left pin support portion 138*b* projects from the inner surface of the left body housing 16. The first left pin support portion 138*b* is connected to the rear ends of the two left support ribs 138*e* and the most rearward left battery supporting wall 136. The first left pin support portion 138*b* has a substantially cylindrical shape. The first left pin support portion 138*b* supports a first left pin 138*f*. The first left pin 138*f* is constituted of an elastic material. The first left pin 138*f* has a substantially cylindrical shape. The first left pin 138*f* is inserted in the first left pin support portion 138*b* to be received in the first left pin support portion 138*b*. When the first left pin 138*f* is in the first left pin support portion 138*b*, the longitudinal axis of the first left pin 138*f* extends in the left-right direction.

The second left pin support portion 138*c* is positioned to face the second right pin support portion 137*c* (see FIG. 21) in the left-right direction. The second left pin support portion 138*c* projects from the inner surface of the left body housing 16. The second left pin support portion 138*c* is positioned forward of the second outlet port 90. The second left pin support portion 138*c* is a rib having a frame shape (substantially O-shape). The second left pin support portion 138*c* supports a second left pin 138*g*. The second left pin 138*g* is constituted of an elastic material. The second left pin 138*g* has a substantially cylindrical shape. The second left pin 138*g* is inserted in the second left pin support portion 138*c* to be received in the second left pin support portion 138*c*. When the second left pin 138*g* is in the second left pin support portion 138*c*, the longitudinal axis of the second left pin 138*g* extends in the up-down direction.

The left retention portion 138*d* is positioned to face the right retention portion 137*d* (see FIG. 21) in the left-right direction. The left retention portion 138*d* projects from the inner surface of the left body housing 16. The left retention portion 138*d* is positioned forward of the second left pin support portion 138*c*. The left retention portion 138*d* is positioned near the front end of the left body housing 16. The left retention portion 138*d* is a rib having a substantially U-shape. The left retention portion 138*d* extends forward, bends and extends downward, and then bends and extends rearward.

Figure 23:
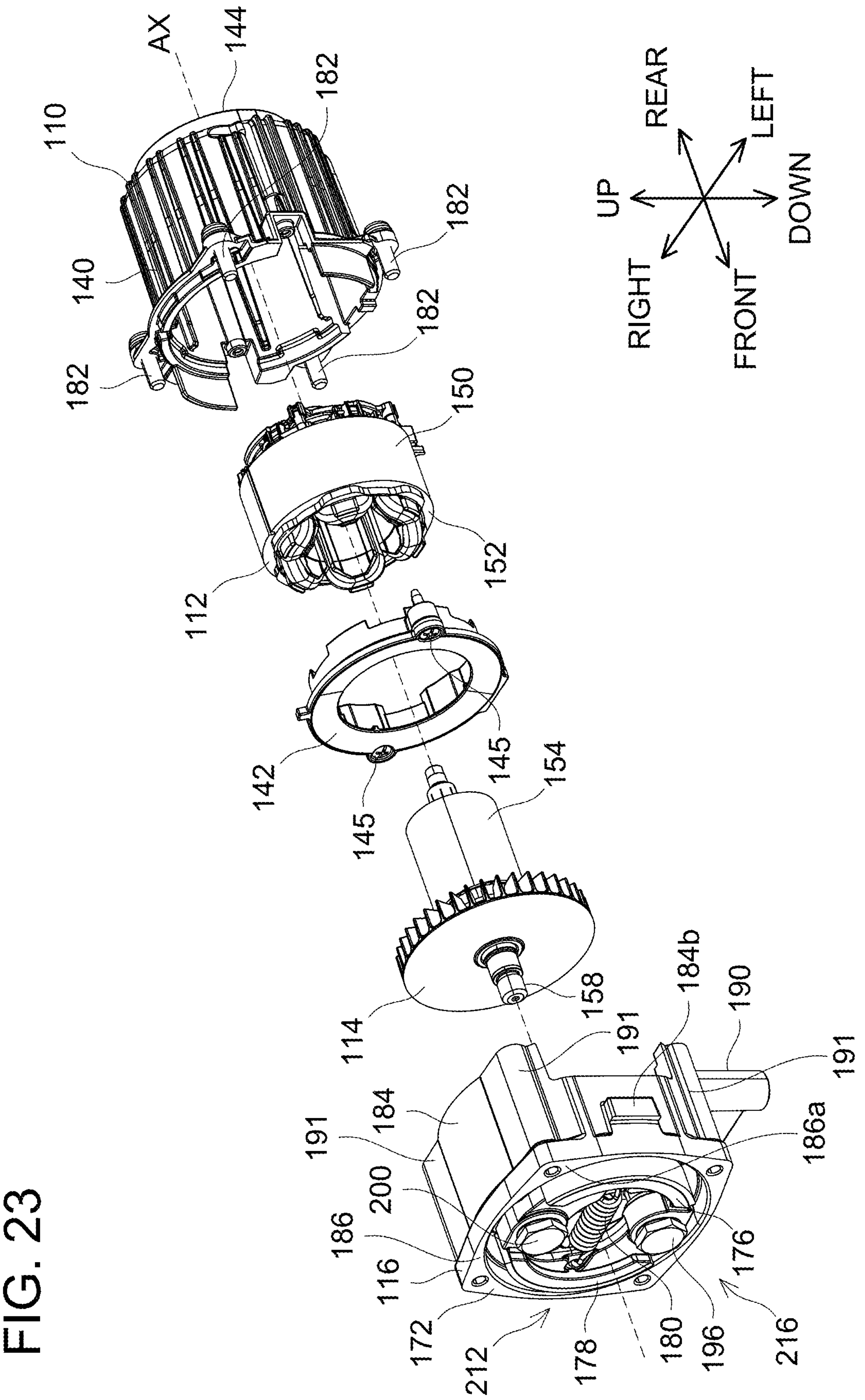
FIG. 23 shows an exploded perspective view of a motor housing 110, the motor 112, and an output unit 116 according to the first embodiment.

As shown in FIG. 23, the motor housing 110 comprises a motor housing body 140 and a baffle plate 142. The motor housing body 140 has a substantially cylindrical shape with a bottom wall 144 at its rear end. The baffle plate 142 is fixed to the front end of the motor housing body 140 with two screws 145. The baffle plate 142 partially closes a front end opening of the motor housing body 140.

Figure 24:
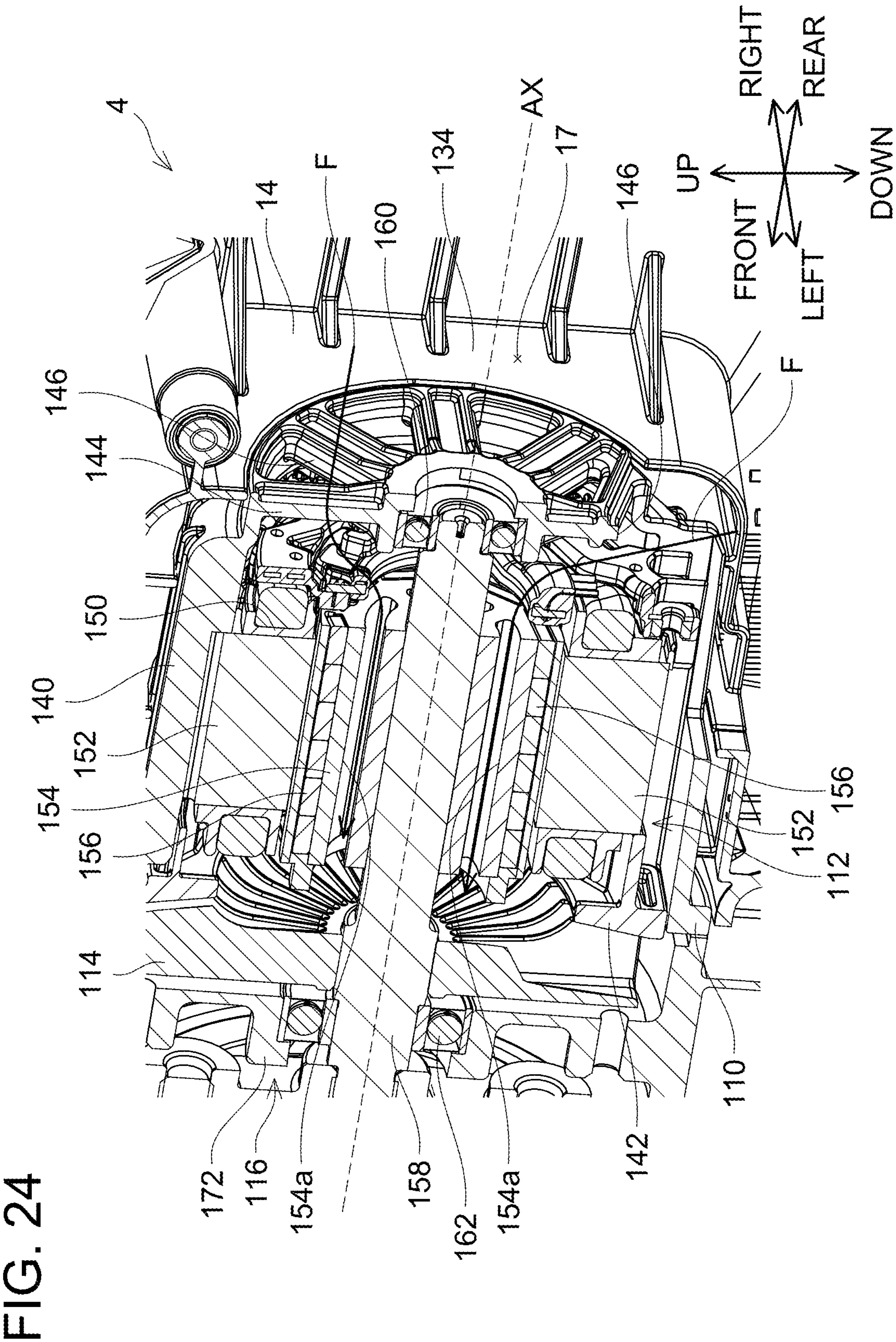
FIG. 24 shows a perspective cross-sectional view of the motor unit 4 in the vicinity of the motor 112 according to the first embodiment.
Figure 25:
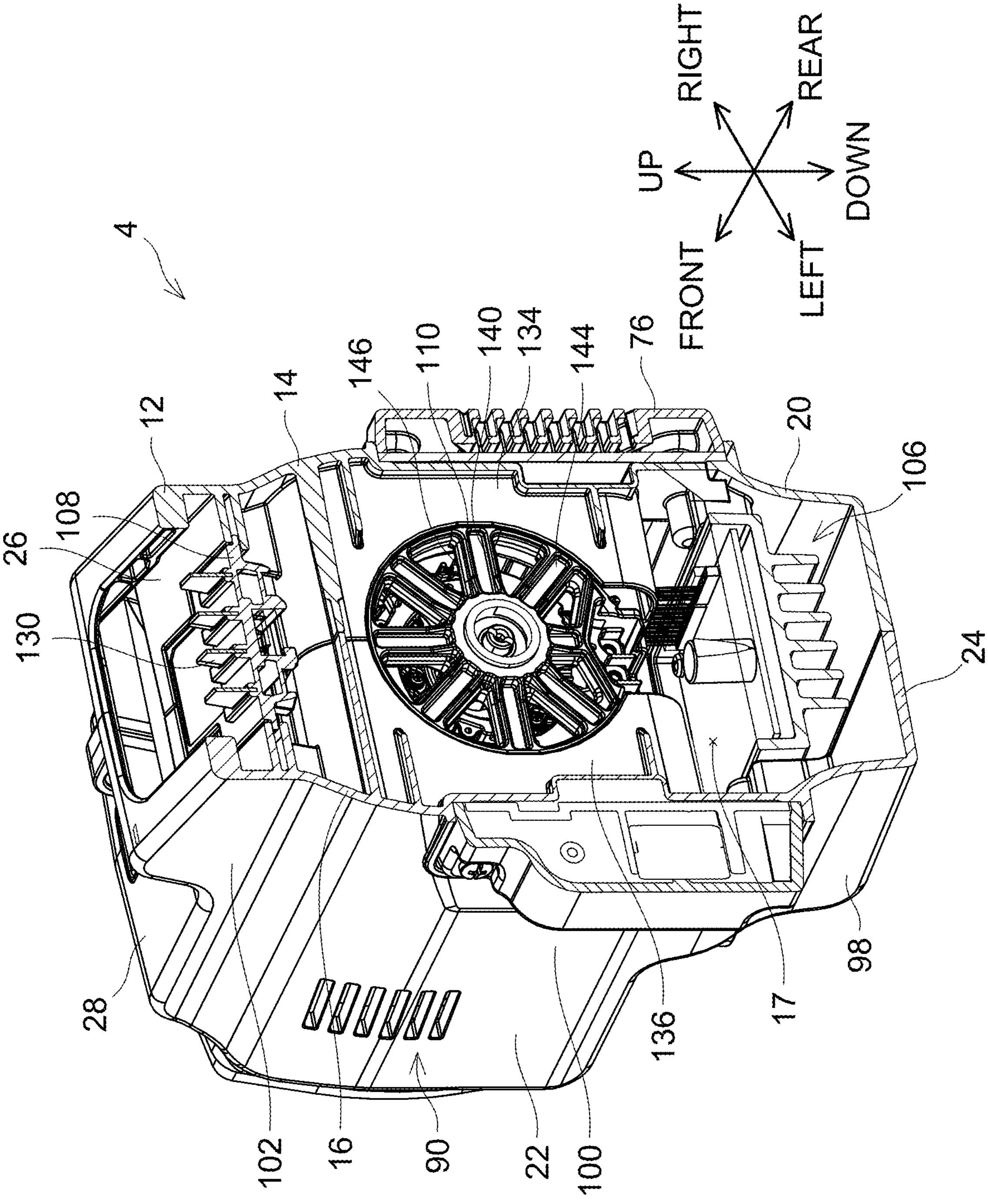
FIG. 25 shows a perspective cross-sectional view of the motor unit 4 in the vicinity of a rear end of the motor housing 110 according to the first embodiment.

As shown in FIG. 24, the motor housing body 140 includes a plurality of motor inlets 146. The motor inlets 146 extend through the bottom wall 144. The motor inlets 146 are configured to allow the accommodating space 17 to communicate with the internal space of the motor housing 110. As shown in FIG. 25, in the front-rear direction, the position of the motor inlets 146 is substantially coincide with the position of the most rearward right battery supporting wall 134 and the position of the most rearward left battery supporting wall 136. Thus, the motor inlets 146 are positioned forward of the air guide 84 (see FIG. 17) and the inlet cover 76 (see FIG. 17). Further, the motor inlets 146 are surrounded by the most rearward right battery supporting wall 134 and the most rearward left battery supporting wall 136. As shown in FIG. 17, the motor inlets 146 are positioned between the control unit 106 and the battery terminal 108.

Figure 26:
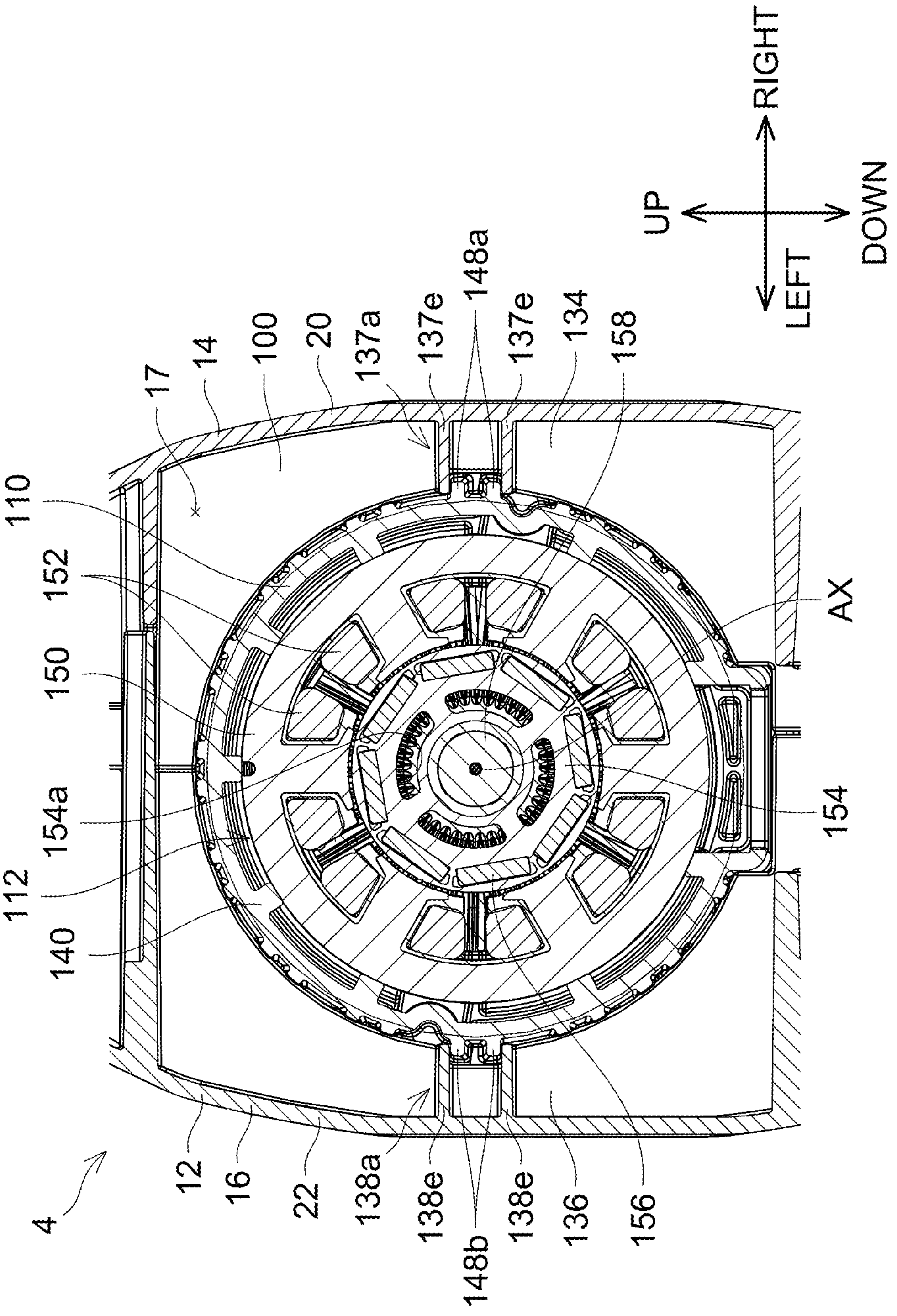
FIG. 26 shows a rear cross-sectional view of the motor unit 4 in the vicinity of a right support portion 137*a* and a left support portion 138*a* according to the first embodiment.

As shown in FIG. 26, two right ribs 148*a* and two left ribs 148*b* are formed on the outer circumferential surface of the motor housing body 140. The two right ribs 148*a* project rightward from the outer circumferential surface of the motor housing body 140. The two right ribs 148*a* are spaced apart from each other in the up-down direction. The right ribs 148*a* extend in the front-rear direction. The two left ribs 148*b* projects leftward from the outer circumferential surface of the motor housing body 140. The two left ribs 148*b* are spaced apart from each other in the up-down direction. The left ribs 148*b* extend in the front-rear direction. The center position between the two left ribs 148*b* is 180 degrees apart from the center position between the two right ribs 148*a* about an axis extending in the front-rear direction.

In the up-down direction, the two right ribs 148*a* are held between the two right support ribs 137*e*. Further, in the up-down direction, the two left ribs 148*b* are held between the two left support ribs 138*e*. The motor housing 110 is thereby supported by the right body housing 14 and the left body housing 16.

Figure 27:
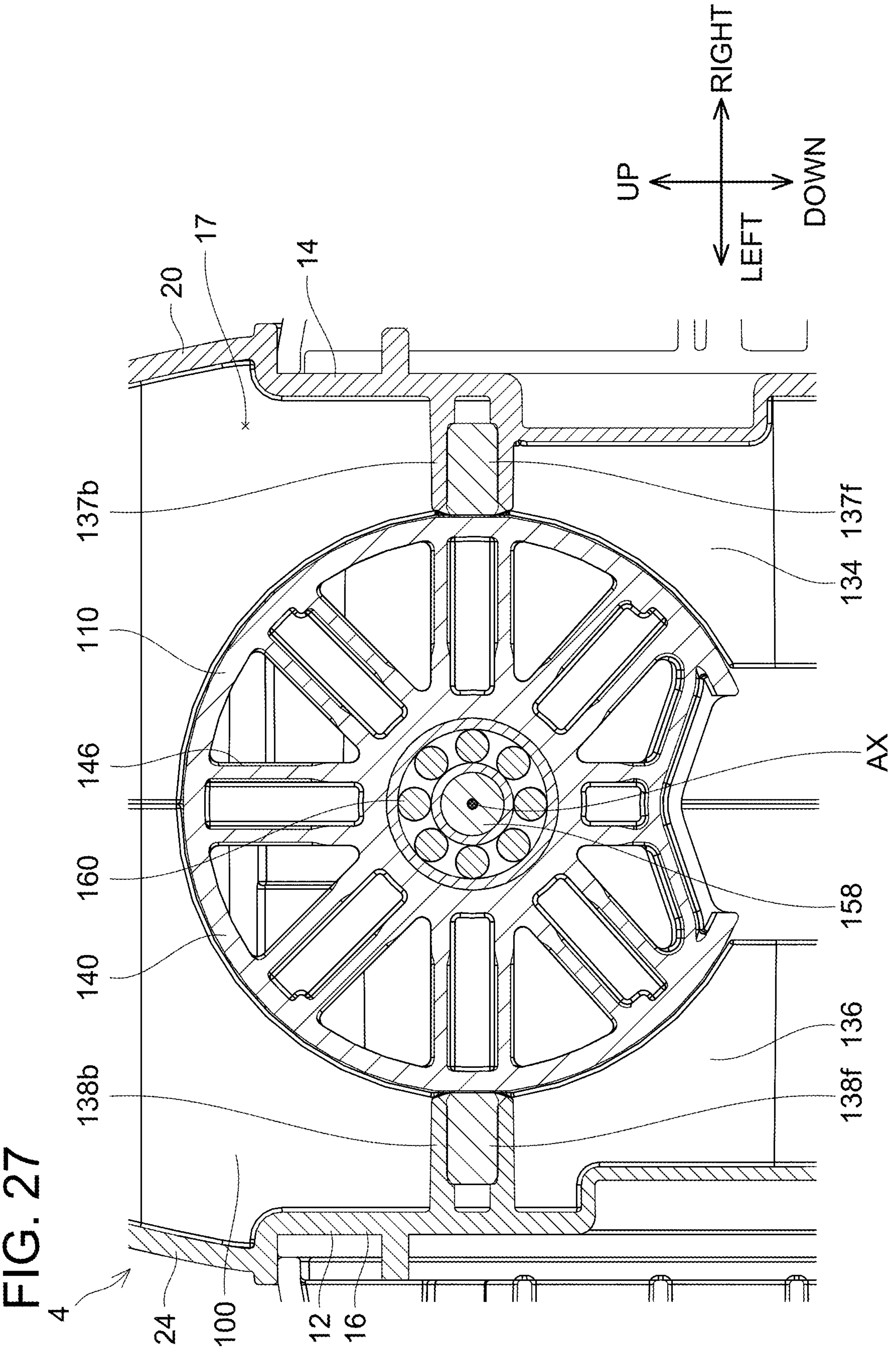
FIG. 27 shows a rear cross-sectional view of the motor unit 4 in the vicinity of a first right pin 137*f* and a first left pin 138*f* according to the first embodiment.

As shown in FIG. 27, the outer circumferential surface of the motor housing body 140 contacts the first right pin 137*f* and the first left pin 138*f*. The motor housing 110 is thereby supported by the right body housing 14 and the left body housing 16 via the first right pin 137*f* and the first left pin 138*f*. Even when there is a subtle gap between the outer circumferential surface of the motor housing body 140 and the right body housing 14 and/or the left body housing 16, the first right pin 137*f* and the first left pin 138*f* suppress the motor housing 110 from rattling against the right body housing 14 and/or the left body housing 16.

As shown in FIG. 18, the motor 112 is positioned in the front part of the motor accommodating portion 100. The motor 112 is for example an inner-rotor blushless motor. In a variant, the motor 112 may be an outer-rotor blushless motor or a brush motor. The motor 112 is shifted to an operable state when the motor unit 4 is switched to the on-state by the main power switch 35 (see FIG. 7) being manipulated. The motor 112 operates with electric power supplied from the battery pack BP. The motor 112 is accommodated in the motor housing 110. The baffle plate 142 suppresses the motor 112 from moving out from the motor housing 110.

Figure 28:
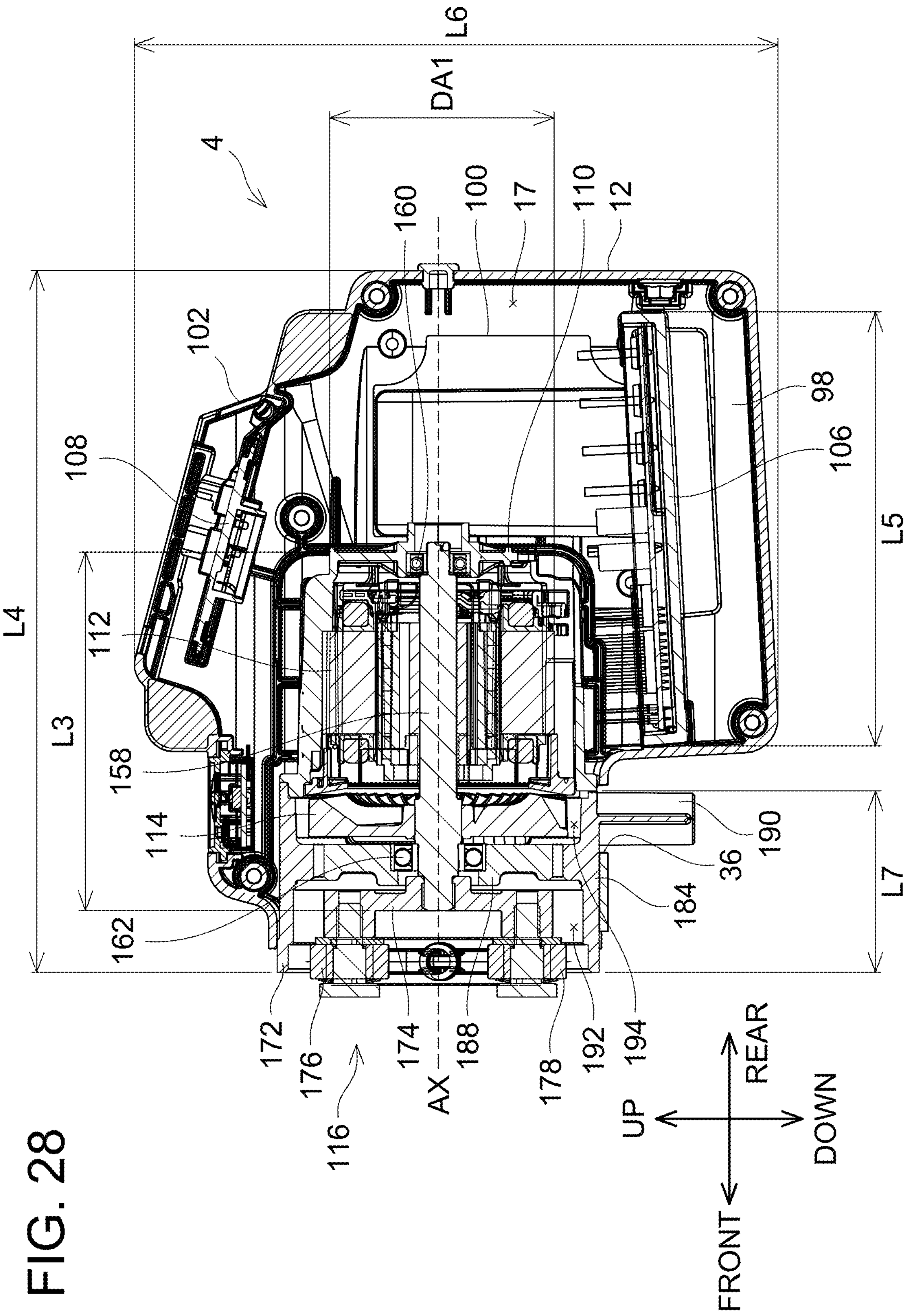
FIG. 28 shows a side cross-sectional view of the motor unit 4 according to the first embodiment.

In the up-down direction, the motor 112 is positioned between the control unit 106 and the battery terminal 108. In the top view of the motor unit 4, the motor 112 at least partially overlaps each of the control unit 106 and the battery terminal 108. The motor 112 is positioned forward of the center position of the control unit 106 in the front-rear direction and the center position of the battery terminal 108 in the front-rear direction. As shown in FIG. 28, a length L3 of the motor 112 in the front-rear direction is less than a length L4 of the body housing 12 in the front-rear direction. The length L4 is equal to or more than 1.5 times the length L3 and equal to or less than 2.0 times the length L3. The length L3 is less than a length L5 of the control unit 106 in the front-rear direction. A diameter DAI of the motor 112 is less than a length L6 of the body housing 12 in the up-down direction. The length L6 is equal to or more than 2.3 times the diameter DAI and equal to or less than 3.3 times the diameter DAI. As shown in FIG. 17, the diameter DAI of the motor 112 is more than the length L1 of the battery terminal 108 in the left-right direction. The diameter DAI of the motor 112 is less than the length L2 of the control unit 106 in the left-right direction.

As shown in FIG. 9, the weight of the motor 112 is equal to or more than 0.7 kg and equal to or less than 1.1 kg. The length L3 of the motor 112 in the front-rear direction is equal to or more than 110 mm and equal to or less than 119 mm. The diameter DAI of the motor 112 is equal to or more than 85 mm and equal to or less than 100 mm. The volume of the motor 112 is equal to or more than 500 $cm^3$ and equal to or less than 1000 $cm^3$. As shown in FIG. 14, the maximum output of the motor 112 is equal to or more than 0.5 kW and equal to or less than 2.0 kW. The motor 112 is a low-power motor. The maximum output of the motor 112 may be equal to or more than 0.5 kW and equal to or less than 1.5 kW. The maximum output of the motor 112 may be equal to or more than 0.5 kW and equal to or less than 1.2 kW. The maximum output of the motor 112 may be equal to or more than 0.5 kW and equal to or less than 1.0 kW. The maximum current of the motor 112 is equal to or more than 35 A and equal to or less than 50 A. The torque of the motor 112 is equal to or more than 1.5 N·m and equal to or less than 3.0 N·m. The rotation speed of the motor 112 is equal to or more than 4000 rpm and equal to or less than 10000 rpm.

As shown in FIG. 23, the motor 112 comprises a stator body 150, a plurality of coils 152 (six coils 152 in this embodiment), a rotor body 154, a plurality of permanent magnets 156 (see FIG. 24), and a motor shaft 158. Each coil 152 is wounded around the stator body 150. The rotor body 154 is inserted in a center opening of the stator body 150. As shown in FIG. 24, the rotor body 154 includes a plurality of cooling holes 154*a* extending through the rotor body 154 in the front-rear direction. The permanent magnets 156 are positioned within the rotor body 154. The permanent magnets 156 are positioned radially outward of the cooling holes 154*a* in the rotor body 154. The motor shaft 158 extends through the rotor body 154 in the front-rear direction. The motor shaft 158 extends in the front-rear direction. The length of the motor shaft 158 in the front-rear direction is substantially the same as the length L3 of the motor 112 in the front-rear direction. The rear end of the motor shaft 158 is rotatably supported by the motor housing body 140 via a bearing 160. The front end of the motor shaft 158 is rotatably supported by the output unit 116 via a bearing 162. The motor shaft 158 rotates about a rotation axis AX extending in the front-rear direction.

When the microcomputer of the control unit 106 (see FIG. 18) selectively switches the switching elements between the on-state and the off-state, electric power is supplied from the battery pack BP to each coil 152. Due to magnetic fields generated by the coils, the permanent magnets 156 rotate around the rotation axis AX. Thereby, the rotor body 154 and the motor shaft 158 rotate about the rotation axis AX.

The cooling fan 114 is fixed to the motor shaft 158 outside the motor housing 110. The cooling fan 114 is positioned within the output unit 116. The cooling fan 114 is positioned closer to the motor housing 110 than the bearing 162 is. The cooling fan 114 is a centrifugal fan. In a variant, the cooling fan 114 may be an axial flow fan. The cooling fan 114 rotates about the rotation axis AX integrally with the motor shaft 158.

Figure 29:
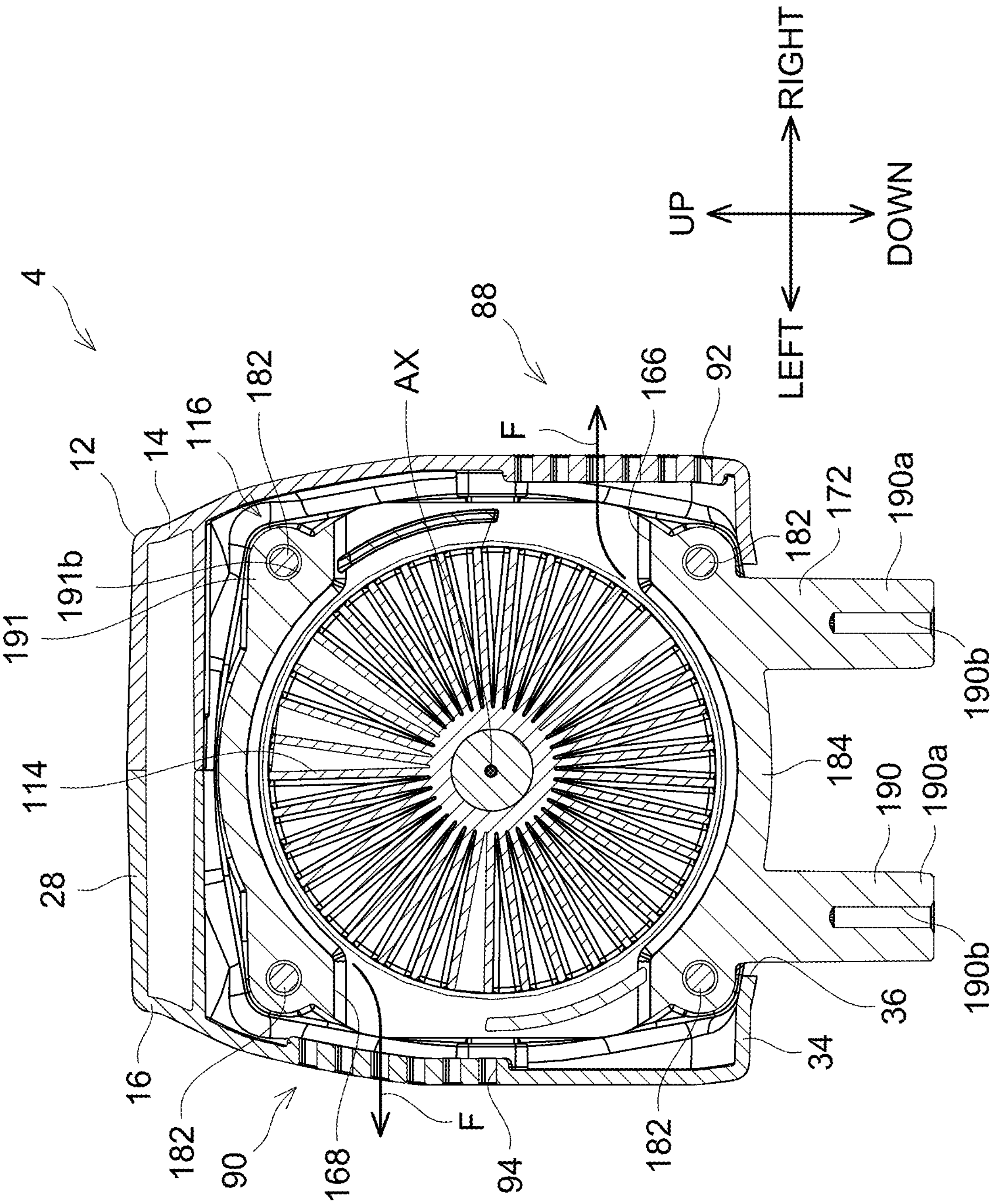
FIG. 29 shows a rear cross-sectional view of the motor unit 4 in the vicinity of a cooling fan 114 according to the first embodiment.

As shown in FIG. 29, the output unit 116 includes a first motor outlet 166 and a second motor outlet 168. The first motor outlet 166 and the second motor outlet 168 are positioned radially outward of the cooling fan 114. The first motor outlet 166 faces the first outlet port 88. The second motor outlet 168 faces the second outlet port 90. The second motor outlet 168 is 180 degrees apart from the first motor outlet 166 about the rotation axis AX.

When the cooling fan 114 rotates, air flows into the inlet path 86 from the external space of the body housing 12 through the inlet port 78, as shown in FIG. 17. In the drawings, the air flow is indicated by arrows F. Once flowed in, the air flows into the accommodating space 17 from the lower end of the inlet path 86. Then, the air flows around the control unit 106 clockwise in the front view of the motor unit 4. The control board 120 is cooled by the heat releasing fins

124 being cooled by the air. Thereafter, the air flows through between the control unit 106 and the battery terminal 108 and then flows forward toward the motor inlets 146. The control unit 106 and the battery terminal 108 are thereby cooled.

Further, as shown in FIG. 18, a part of the air that has flowed into the accommodating space 17 from the inlet path 86 (see FIG. 17) flows rearward along the heat releasing fins 124. The control board 120 is cooled by the heat releasing fins 124 being cooled by the air. Thereafter, the air flows upward between the control unit 106 and the rear wall 30, flows through between the control unit 106 and the battery terminal 108, and then flows forward toward the motor inlets 146. The control unit 106 and the battery terminal 108 are thereby cooled.

Further, as shown in FIG. 11, air also flows into the internal space of the battery housing 52 from the external space thereof though the battery inlet 62 (see FIG. 13). Once flowed in, the air flows through the internal space of the battery housing 52. The battery pack BP is thereby cooled. Then, the air flows into the accommodating space 17 of the body housing 12 from the internal space of the battery housing 52 through the battery outlet 64 of the battery housing 52 and the opening 43 between the connection wall 42 and the front end of the upper rear wall 26. Once flowed into the accommodating space 17, the air flows rearward along the upper rear wall 26 and then turns to flow forward toward the motor inlets 146 (see FIG. 24).

As shown in FIG. 24, the motor inlets 146 are surrounded by the most rearward right battery supporting wall 134 and the most rearward left battery supporting wall 136 (see FIG. 25). Thus, the right battery supporting walls 134 and the left battery supporting walls 136 define an air path for the air to be guided into the motor housing 110 through the motor inlets 146. Thereby, the air flows into the motor housing 110 through the motor inlets 146. Once flowed in, the air flows forward through the cooling holes 154*a* and also flows forward between the stator body 150 and the rotor body 154. The motor 112 is thereby cooled.

As shown in FIG. 29, once reaching the cooling fan 114, the air is directed to be away from the rotation axis AX (i.e., radially outward) by the cooling fan 114. This air flows out to the external space of the body housing 12 through the first motor outlet 166 and the first outlet port 88 and through the second motor outlet 168 and the second outlet port 90.

As shown in FIG. 28, the output unit 116 is positioned in the front part of the motor accommodating portion 100. A portion of the output unit 116 near its front end is exposed to the external space of the body housing 12. The output unit 116 is inserted in the front end of the body housing 12. The output unit 116 is fixed to the front end of the motor housing 110. A length L7 of the output unit 116 in the front-rear direction is less than the length L3 of the motor 112 in the front-rear direction.

Figure 30:
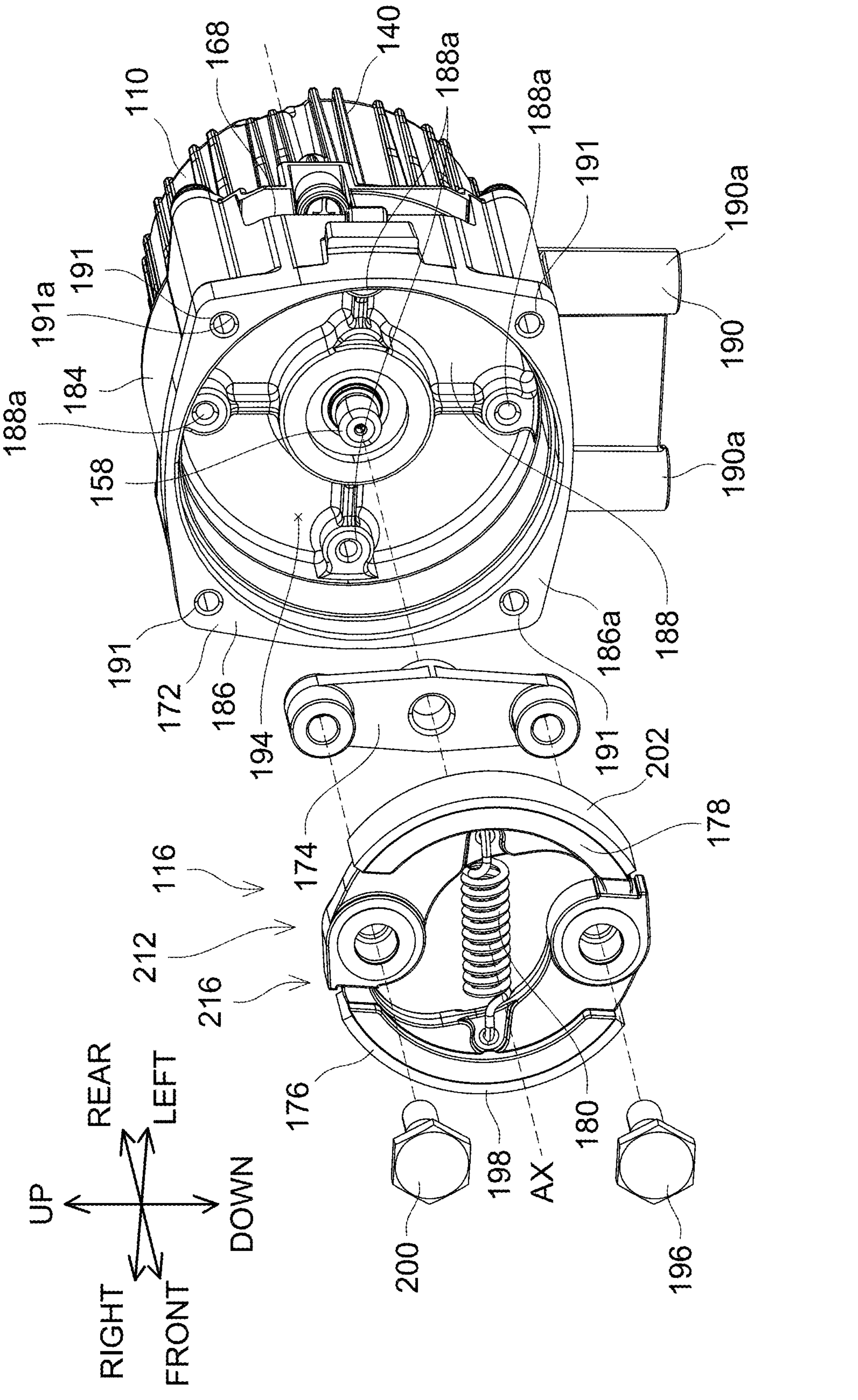
FIG. 30 shows an exploded perspective view of the motor housing 110, the motor 112, and the output unit 116 according to the first embodiment.

As shown in FIG. 30, the output unit 116 comprises a mount base 172, an intermediate member 174, a first clutch shoe 176, a second clutch shoe 178, and a clutch spring 180.

The mount base 172 is fixed to the front end of the motor housing body 140 with four screws 182 (see FIG. 23). The mount base 172 comprises a tubular portion 184, a flange 186, a partition wall 188, and a first screw boss 190. The inner surface of the tubular portion 184 has a substantially circular cross-sectional shape. The first motor outlet 166 (see FIG. 29) and the second motor outlet 168 are defined in the rear end of the tubular portion 184.

Figure 31:
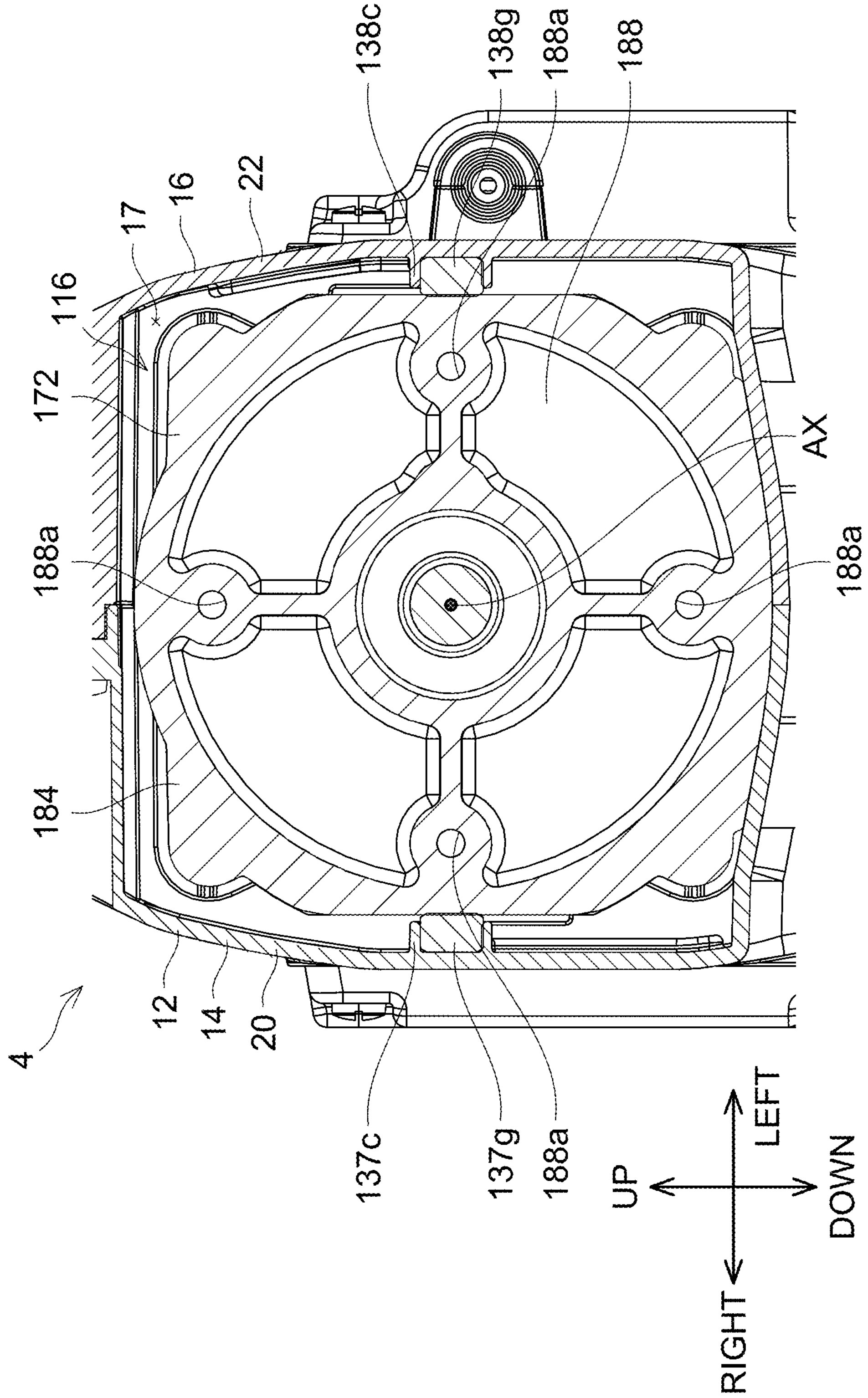
FIG. 31 shows a front cross-sectional view of the motor unit 4 in the vicinity of a second right pin 137*g* and a second left pin 138*g* according to the first embodiment.

As shown in FIG. 31, the outer surface of the tubular portion 184 contacts the second right pin 137*g* and the second left pin 138*g*. Thereby, the mount base 172 is supported by the right body housing 14 and the left body housing 16 via the second right pin 137*g* and the second left pin 138*g*. Further, the second right pin 137*g* and the second left pin 138*g* suppress the mount base 172 from rattling against the right body housing 14 and the left body housing 16.

Figure 32:
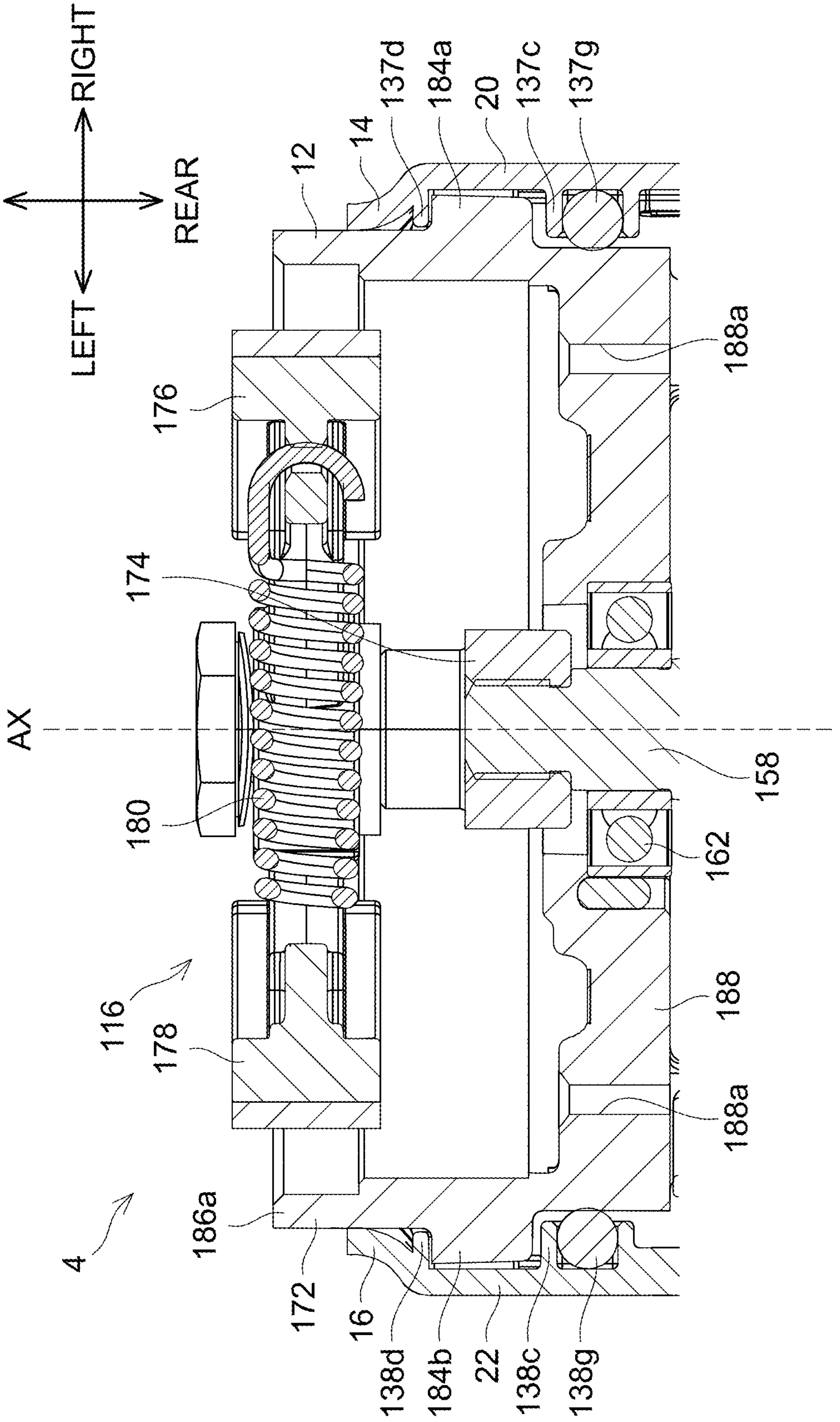
FIG. 32 shows a horizontal cross-sectional view of the motor unit 4 in the vicinity of a right retention portion 137*d* and a left retention portion 138*d* according to the first embodiment.

As shown in FIG. 32, a right projection 184*a* and a left projection 184*b* are formed on the outer surface of the tubular portion 184. The right projection 184*a* projects rightward from the outer surface of the tubular portion 184. The right projection 184*a* is received in the right retention portion 137*d* of the right body housing 14. The right projection 184*a* is positioned forward of the second right pin support portion 137*c*. The left projection 184*b* projects leftward from the outer surface of the tubular portion 184. The left projection 184*b* is received in the left retention portion 138*d* of the left body housing 16. The left projection 184*b* is positioned forward of the second left pin support portion 138*c*.

When forward force acts on the mount base 172, the right projection 184*a* contacts the right retention portion 137*d* from rear and the left projection 184*b* contacts the left retention portion 138*d* from rear. Thereby, the mount base 172 is moved forward relative to the body housing 12 and suppressed from moving out of the body housing 12. When a rearward force acts on the mount base 172, the right projection 184*a* contacts the second right pin support portion 137*c* from front and the left projection 184*b* contacts the second left pin support portion 138*c* from front. Thereby, the mount base 172 is suppressed from moving rearward relative to the body housing 12.

As shown in FIG. 30, the flange 186 is positioned at the front end of the tubular portion 184. The flange 186 projects from the tubular portion 184 in a direction away from the rotation axis AX. A front surface 186*a* of the flange 186 lies on a plane including the left-right direction and the up-down direction. The outer surface of the flange 186 has a substantially quadrangle shape. The outer surface of the flange 186 is surrounded by the body housing 12 (see FIG. 19). The mount base 172 is thereby suppressed from rotating about the rotation axis AX relative to the body housing 12. The flange 186 is configured to be fixed to a working unit 6 (see FIG. 1) with the front surface 186*a* contacting the working unit 6. The front surface 186*a* of the flange 186 corresponds to a fixing member.

As shown in FIG. 28, the partition wall 188 is positioned in the inner surface of the tubular portion 184. The partition wall 188 is positioned near the center position of the tubular portion 184 in the front-rear direction. The partition wall 188 partitions the internal space of the tubular portion 184 into a front space 192 and a rear space 194. The cooling fan 114 is positioned in the rear space 194. The motor shaft 158 extends through the partition wall 188. The partition wall 188 supports the motor shaft 158 via the bearing 162 such that the motor shaft 158 is rotatable. As shown in FIG. 30, the partition wall 188 includes four screw holes 188*a*. The screw holes 188*a* extend through the partition wall 188 in the front-rear direction. The four screw holes 188*a* are positioned near the inner surface of the tubular portion 184. The four screw holes 188*a* are positioned at regular intervals about the rotation axis AX.

The first screw boss 190 projects downward from the tubular portion 184. The first screw boss 190 is inserted in the through hole 36 of the body housing 12. The mount base 172 is thereby fixed in position in the front-rear direction relative to the body housing 12. Further, the mount base 172 is fixed to the body housing 12.

As shown in FIG. 29, the first screw boss 190 comprises two cylindrical portions 190*a* aligned in the left-right direction. Each cylindrical portion 190*a* includes a screw hole 190*b*. The screw holes 190*b* extend upward from the lower ends of the cylindrical portions 190*a*. The screw holes 190*b* are configured to allow screws 364 (see FIG. 49) to be screwed thereto. The first screw boss 190 is configured to be fixed to a working unit 6 (see FIG. 1) via the screw holes 190*b* and the screws 364.

As shown in FIG. 30, the mount base 172 comprises four second screw bosses 191. The four second screw bosses 191 are formed by the tubular portion 184 and the flange 186. Each second screw boss 191 is positioned near corresponding one of the corners of the flange 186. The second screw bosses 191 extend in the front rear direction.

Figure 33:
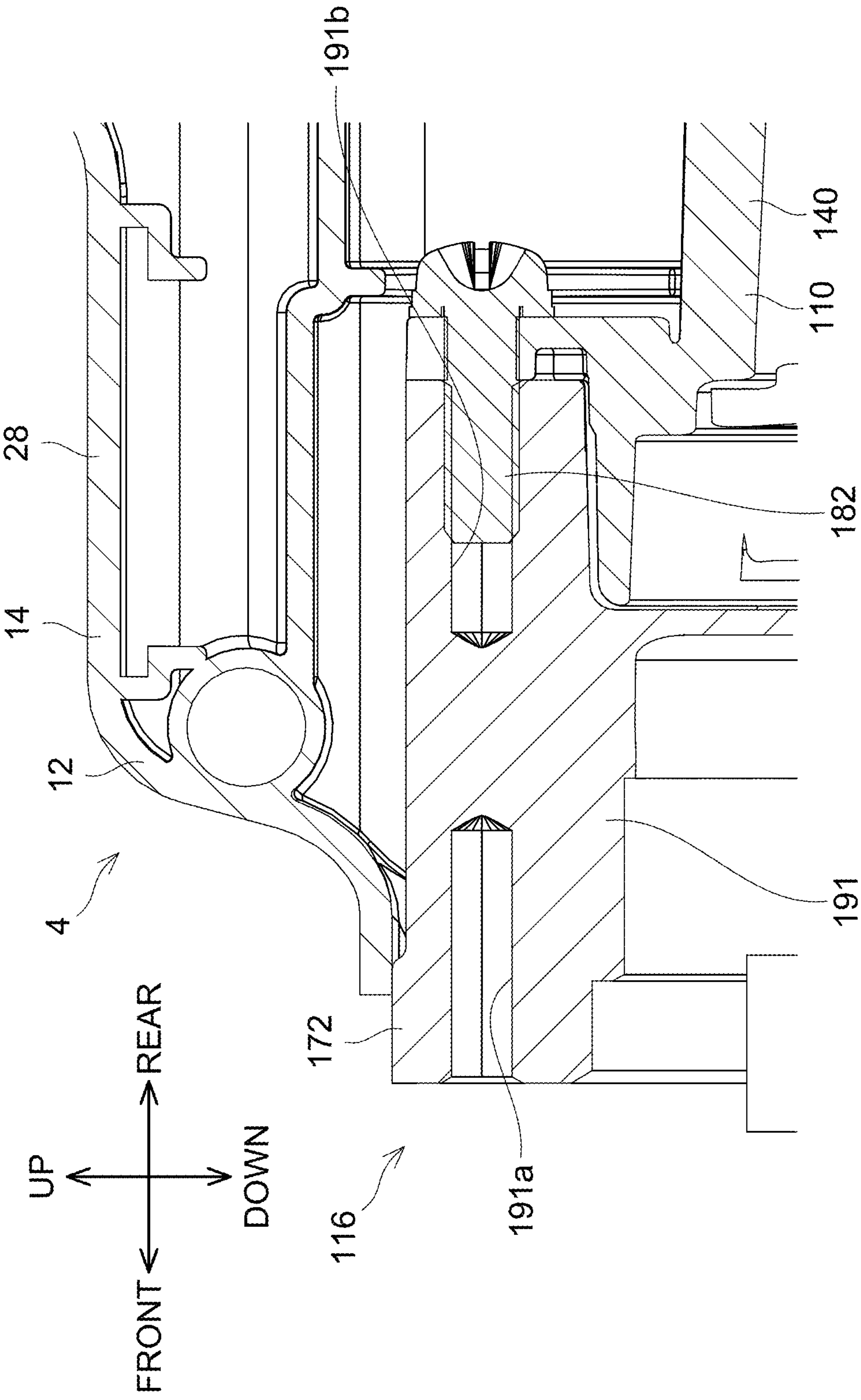
FIG. 33 shows a side cross-sectional view of the motor unit 4 in the vicinity of a second screw boss 191 according to the first embodiment.

As shown in FIG. 33, each second screw boss 191 includes a front screw hole 191*a* and a rear screw hole 191*b*. The front screw holes 191*a* extend rearward from the front ends of the second screw bosses 191. The front screw holes 191*a* are configured to allow screws 256 (see FIG. 41) to be screwed thereto. The second screw bosses 191 are configured to be fixed to a working unit 6 (see FIG. 1) via the front screw holes 191*a* and the screws 256.

The rear screw holes 191*b* extend forward from the rear ends of the second screw bosses 191. The rear screw holes 191*b* are not connected to the front screw holes 191*a*. Each rear screw hole 191*b* and its corresponding front screw hole 191*a* are aligned in a line. The rear screw holes 191*b* are configured to allow screws 182 to be screwed thereto. The second screw bosses 191 are fixed to the motor housing body 140 by the screws 182 being screwed into the rear screw holes 191*b*.

The intermediate member 174 is positioned in the front space 192. The intermediate member 174 has an elongated shape. A center portion of the intermediate member 174 in its longitudinal direction is fixed to the front end of the motor shaft 158.

Figure 34:
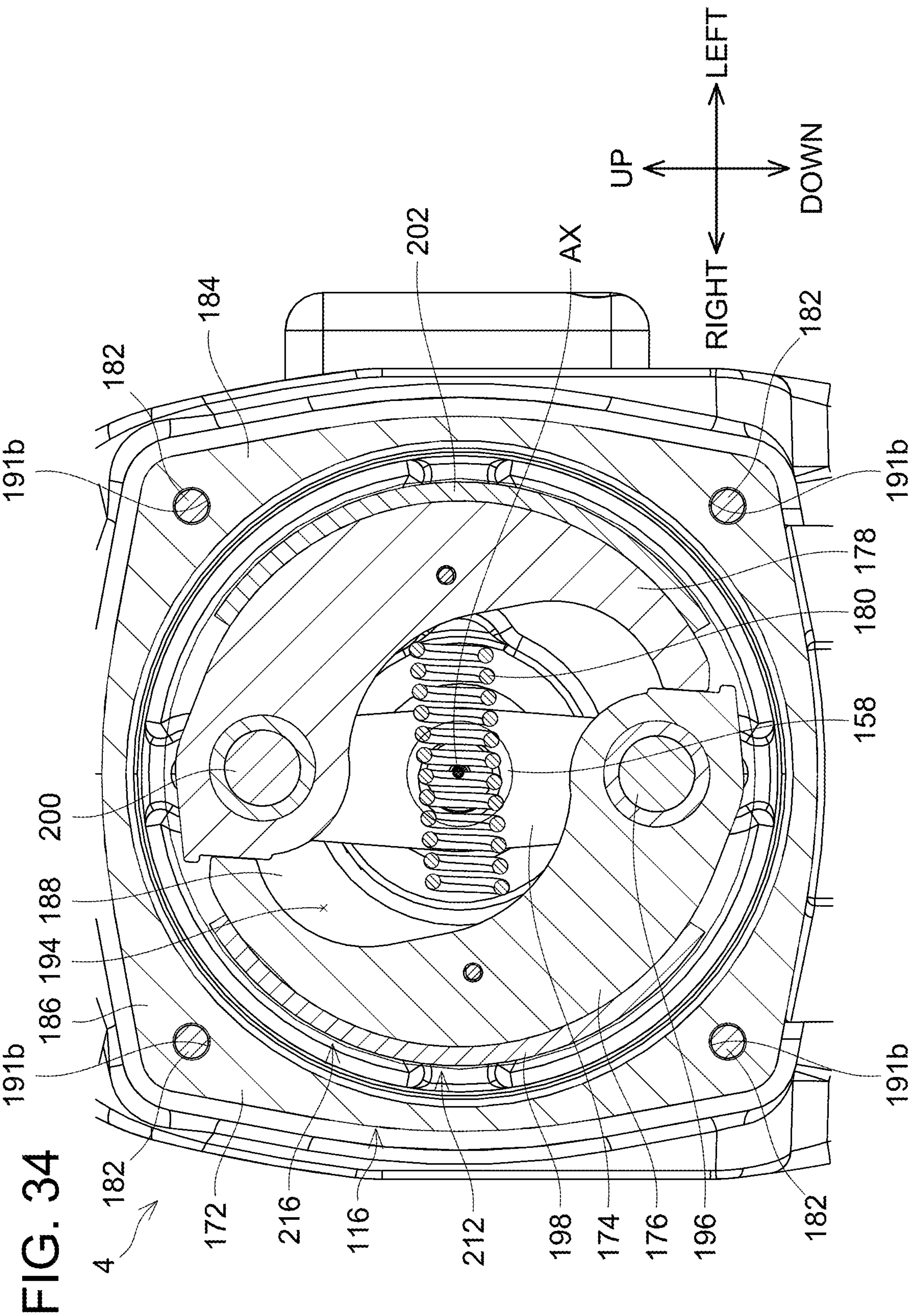
FIG. 34 shows a front cross-sectional view of the motor unit 4 in the vicinity of a clutch spring 180 according to the first embodiment.

As shown in FIG. 34, the first clutch shoe 176 has an arc shape. One end of the first clutch shoe 176 is attached to one end of the intermediate member 174 with a bolt 196 such that the first clutch shoe 176 is movable. A friction member 198 is fixed to a surface of the first clutch shoe 176 that faces the inner surface of the tubular portion 184.

The second clutch shoe 178 has a shape that is substantially the same as that of the first clutch shoe 176. One end of the second clutch shoe 178 is attached to another end of the intermediate member 174 with a bolt 200 such that the second clutch shoe 178 is movable. A friction member 202 is fixed to a surface of the second clutch shoe 178 that faces the inner surface of the tubular portion 184. The one end of the second clutch shoe 178 faces the other end of the first clutch shoe 176. The other end of the second clutch shoe 178 faces the one end of the first clutch shoe 176.

The clutch spring 180 is attached to the first clutch shoe 176 and the second clutch shoe 178. The clutch spring 180 is for example a compression spring. The clutch spring 180 biases the first clutch shoe 176 and the second clutch shoe 178 in directions that bring them closer toward each other.

When the motor shaft 158 rotates about the rotation axis AX, the first clutch shoe 176 and the second clutch shoe 178 rotate around the rotation axis AX. When the rotation speed of the motor shaft 158 reaches or exceeds a predetermined speed, the first clutch shoe 176 and the second clutch shoe 178 move against the biasing force of the clutch spring 180. Specifically, the other end of the first clutch shoe 176 and the other end of the second clutch shoe 178 move radially outward toward the inner surface of the tubular portion 184.

As shown in FIG. 18, in the state where the battery pack BP is attached to the body housing 12, a center of gravity G1 of the motor unit 4 is positioned within the motor 112. The center of gravity G1 is positioned forward of the center position of the body housing 12 in the front-rear direction and the front end of the battery terminal 108. The center of gravity G1 is positioned rearward of the front end of the control unit 106. The center of gravity G1 is positioned above the rotation axis AX of the motor shaft 158.

In the state where the battery pack BP is not attached to the body housing 12, a center of gravity G2 of the motor unit 4 is positioned within the motor 112. The center of gravity G2 is positioned forward of the center of gravity G1. The center of gravity G2 is positioned rearward of the front end of the control unit 106. The center of gravity G2 is positioned above the rotation axis AX of the motor shaft 158. The center of gravity G2 is closer to the rotation axis AX than the center of gravity G1 is.

Figure 35:
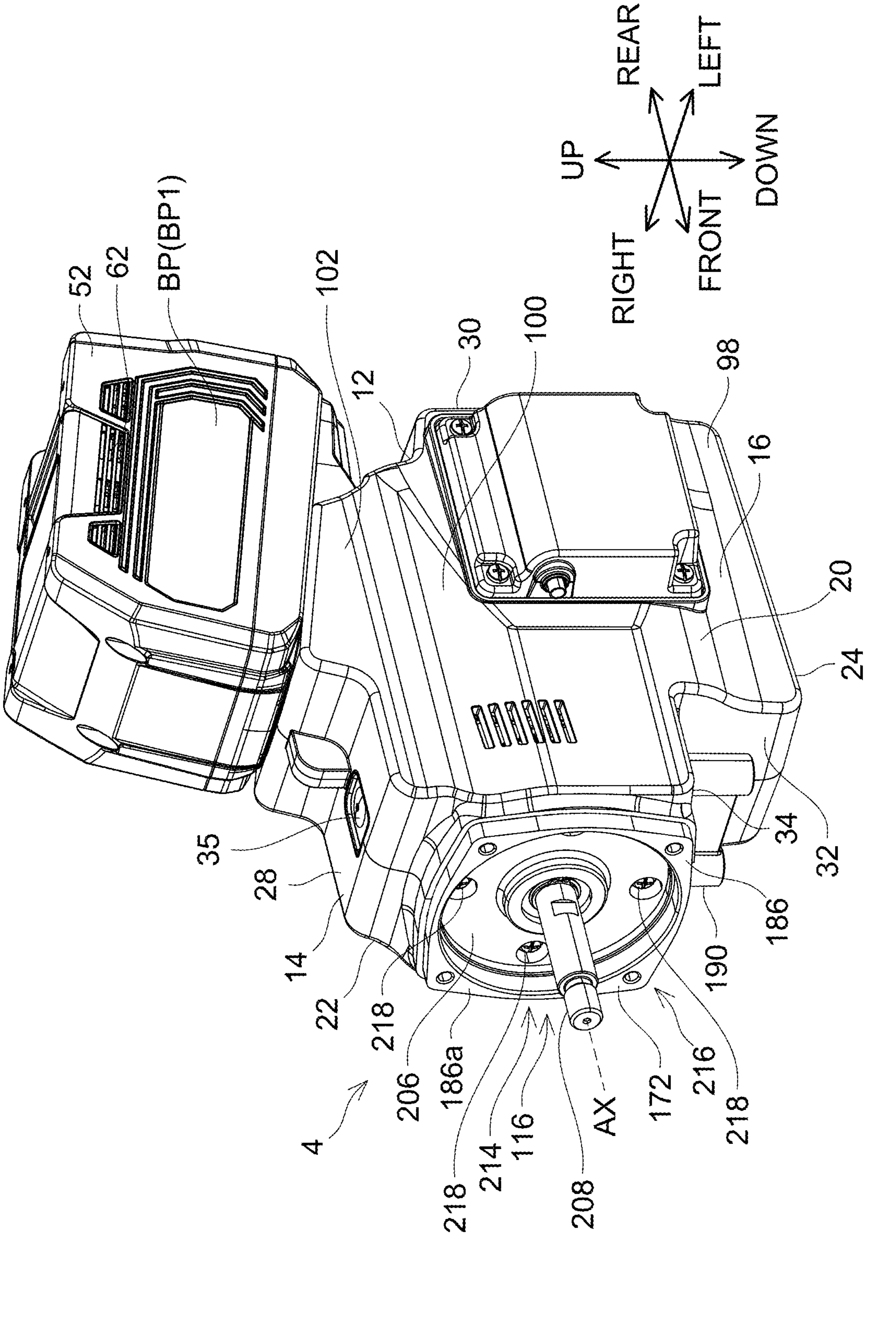
FIG. 35 shows a perspective view of the motor unit 4 comprising a spindle 208 and the battery pack BP according to the first embodiment.

As shown in FIG. 35, the output unit 116 further comprises a support member 206 and a spindle 208. The support member 206 and the spindle 208 are applicable to the motor unit 4 as a replacement for the intermediate member 174, the first clutch shoe 176, the second clutch shoe 178, and the clutch spring 180. Hereinafter, the intermediate member 174, the first clutch shoe 176, the second clutch shoe 178, and the clutch spring 180 may be collectively termed a first output member 212, the support member 206 and the spindle 208 may be collectively termed a second output member 214, and the first output member 212 and the second output member 214 may be collectively termed an output member 216. The motor unit 4 functions as a clutch-type unit when the first output member 212 is used therein, while the motor unit 4 functions as a spindle-type unit when the second output member 214 is used therein. In case where the motor unit 4 functions as a clutch-type unit, an applicable working unit 6 (see FIG. 1) is for example the slope mower unit 6*c*, the grass trimmer unit 6*d* in which the backpack type battery 280 (see FIG. 44) is used, the screed unit 6*e*, the trowel unit 6*f*, the rammer unit 6*g*, the plate compactor unit 6*h*, the handheld grass trimmer unit 6*i*, the edger unit 6*j*, or the multipurpose cultivator unit 6*k*. In case where the motor unit 4 functions as a spindle-type unit, an applicable working unit 6 (see FIG. 1) is for example the winch unit 6*a*. In the clutch-type unit, the output unit 116 comprises the mount base 172 and the first output member 212. In the spindle-type unit, the output unit 116 comprises the mount base 172 and the second output member 214. One of the first output member 212 and the second output member 214 is selected depending on the type of a working unit 6 (see FIG. 1).

Figure 36:
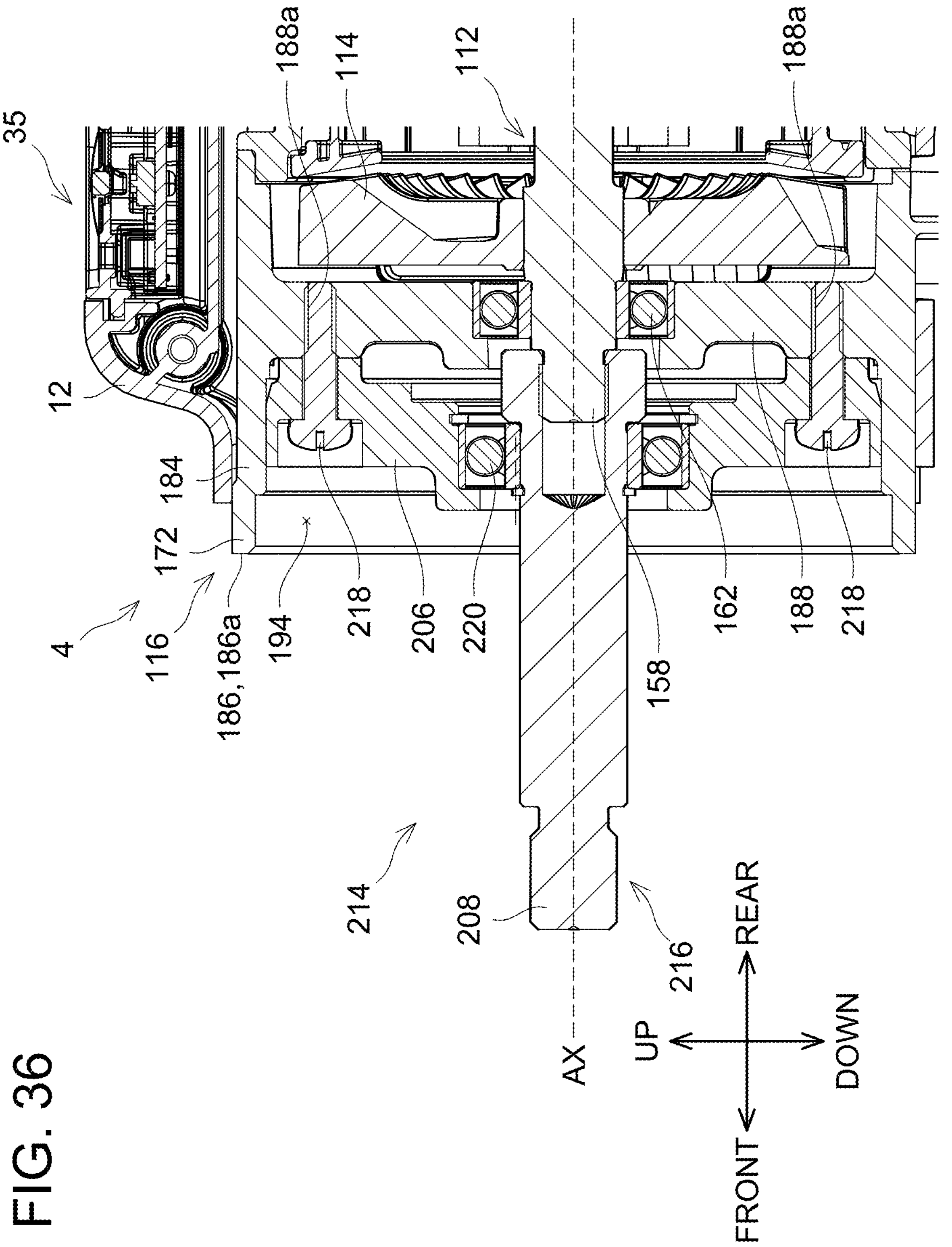
FIG. 36 shows a side cross-sectional view of the motor unit 4 in the vicinity of the spindle 208 according to the first embodiment.

As shown in FIG. 36, the support member 206 of the second output member 214 is fixed to the front surface of the partition wall 188 by screws 218 being screwed into the screw holes 188*a*. The support member 206 is positioned in the front space 192.

The spindle 208 extends in the front-rear direction. The spindle 208 extends through the support member 206 in the front-rear direction. The spindle 208 is rotatably supported by the support member 206 via a bearing 220. The rear end of the spindle 208 is fitted to the front end of the motor shaft 158. The spindle 208 rotates about the rotation axis AX integrally with the motor shaft 158. The spindle 208 drives a working unit 6 (see FIG. 1).

As shown in FIGS. 37 to 40, the motor unit 4 is applicable to various types of working units 6. Directions used in connection with FIGS. 37 to 49 are different from the directions used in the above description. Specifically, the direction perpendicular to the reference plane P is termed an up-down direction, a direction perpendicular to the up-down direction is termed a front-rear direction, and a direction perpendicular to the up-down direction and the front-rear direction is termed a left-right direction.

Figure 37:
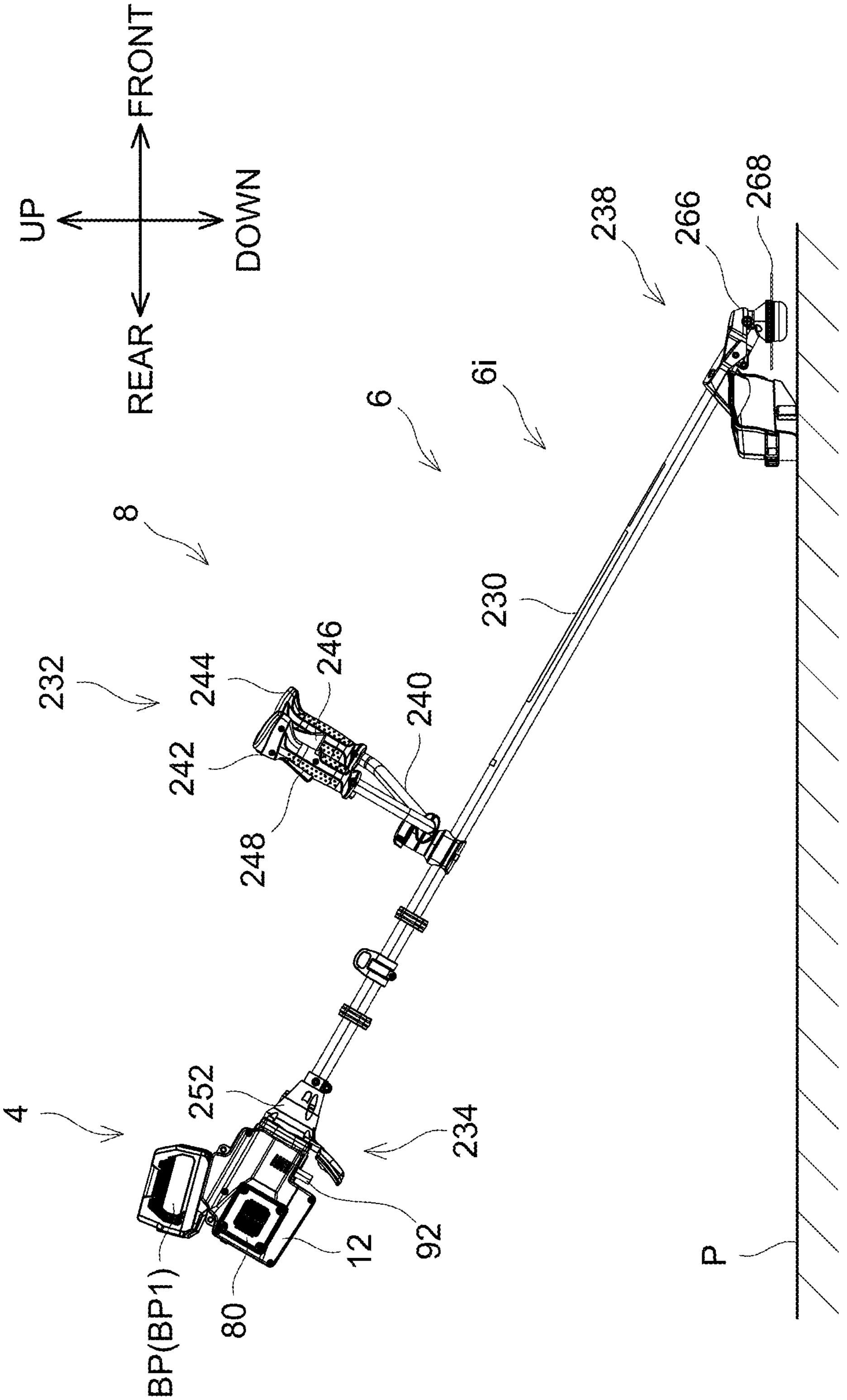
FIG. 37 shows a side view of the motor unit 4 and a handheld grass trimmer unit 6*i* according to the first embodiment.

As shown in FIG. 37, the motor unit 4 is applicable to the handheld grass trimmer unit 6*i*, which is an example of working units 6. The handheld grass trimmer unit 6*i* is configured to be hand held by a user. The handheld grass trimmer unit 6*i* comprises a pole 230, a handle unit 232, a fixing unit 234, a transmission shaft 236 (see FIG. 42), and a working part 238.

The pole 230 has an elongated pole shape. The pole 230 supports the transmission shaft 236 (see FIG. 42) therein such that the transmission shaft 236 is rotatable.

The handle unit 232 comprises a fixing frame 240, a right handle 242, a left handle 244, a trigger 246, and a shark fin 248.

The fixing frame 240 has a substantially U-shape. A center portion of the fixing frame 240 in its longitudinal direction is fixed to the pole 230.

The right handle 242 is attached to one longitudinal end of the fixing frame 240. The left handle 244 is attached to the other longitudinal end of the fixing frame 240. The user grips the right handle 242 with the right hand and grips the left handle 244 with the left hand to handle the handheld grass trimmer unit 6*i*.

The trigger 246 is pushable and positioned on a front portion of the right handle 242. The shark fin 248 is pushable and positioned on a rear portion of the right handle 242. The trigger 246 can be pushed in by the shark fin 248 being pushed in. When the shark fin 248 is pushed in by the palm of the user's hand gripping the right handle 242 and the trigger 246 is pushed in by a finger of the user's hand gripping the right handle 242, the motor 112 (see FIG. 28) of the motor unit 4 is thereby activated.

Figure 41:
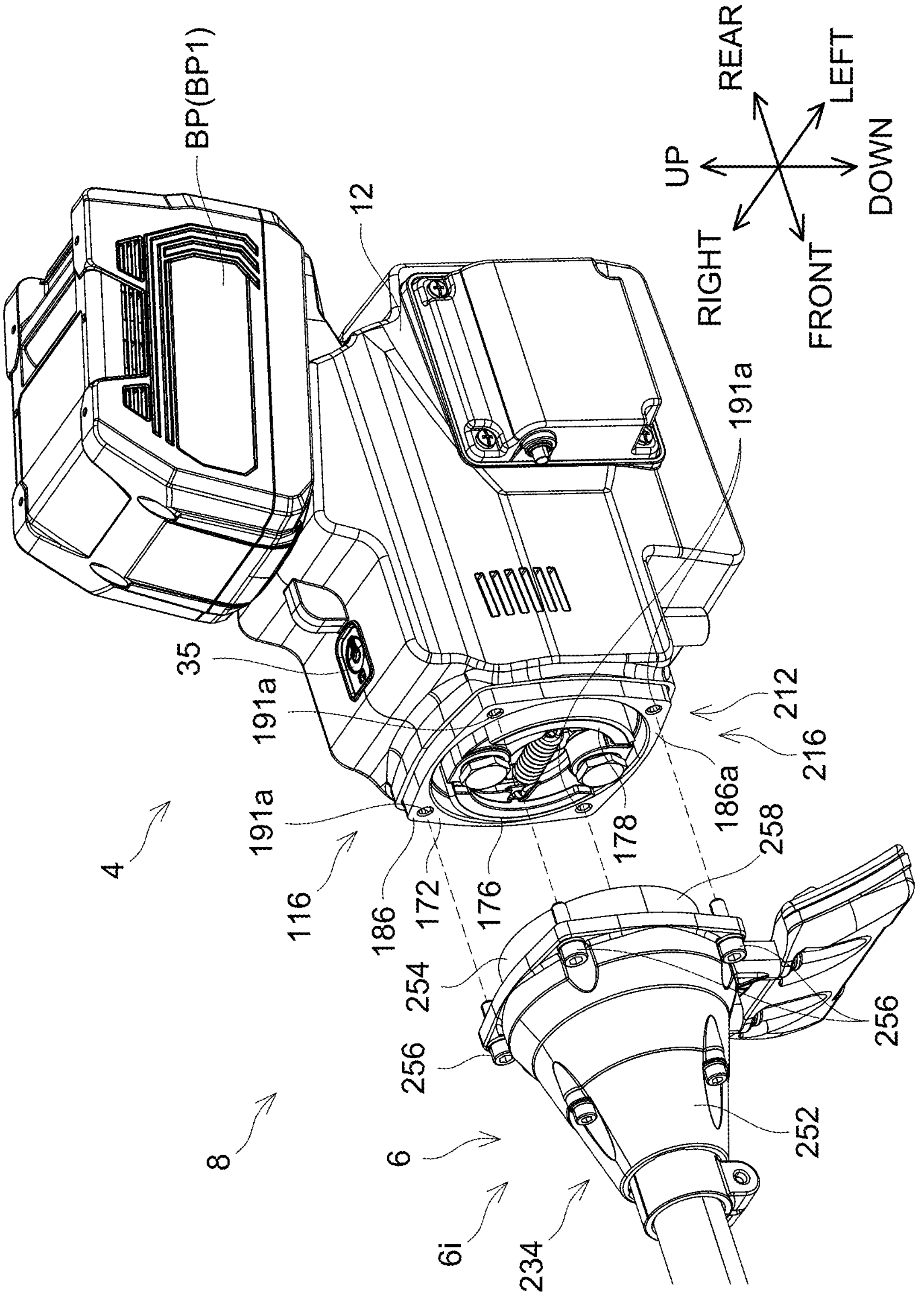
FIG. 41 shows an exploded perspective view of the motor unit 4 and the handheld grass trimmer unit 6*i* according to the first embodiment.

The fixing unit 234 is fixed to one end of the pole 230. As shown in FIG. 41, the fixing unit 234 comprises a fixing housing 252 and a drum 254.

The fixing housing 252 is fixed to the flange 186 of the motor unit 4 by screws 256 being screwed into the front screw holes 191*a*. The rear end surface of the fixing housing 252 is in surface contact with the front surface 186*a* of the flange 186.

Figure 42:
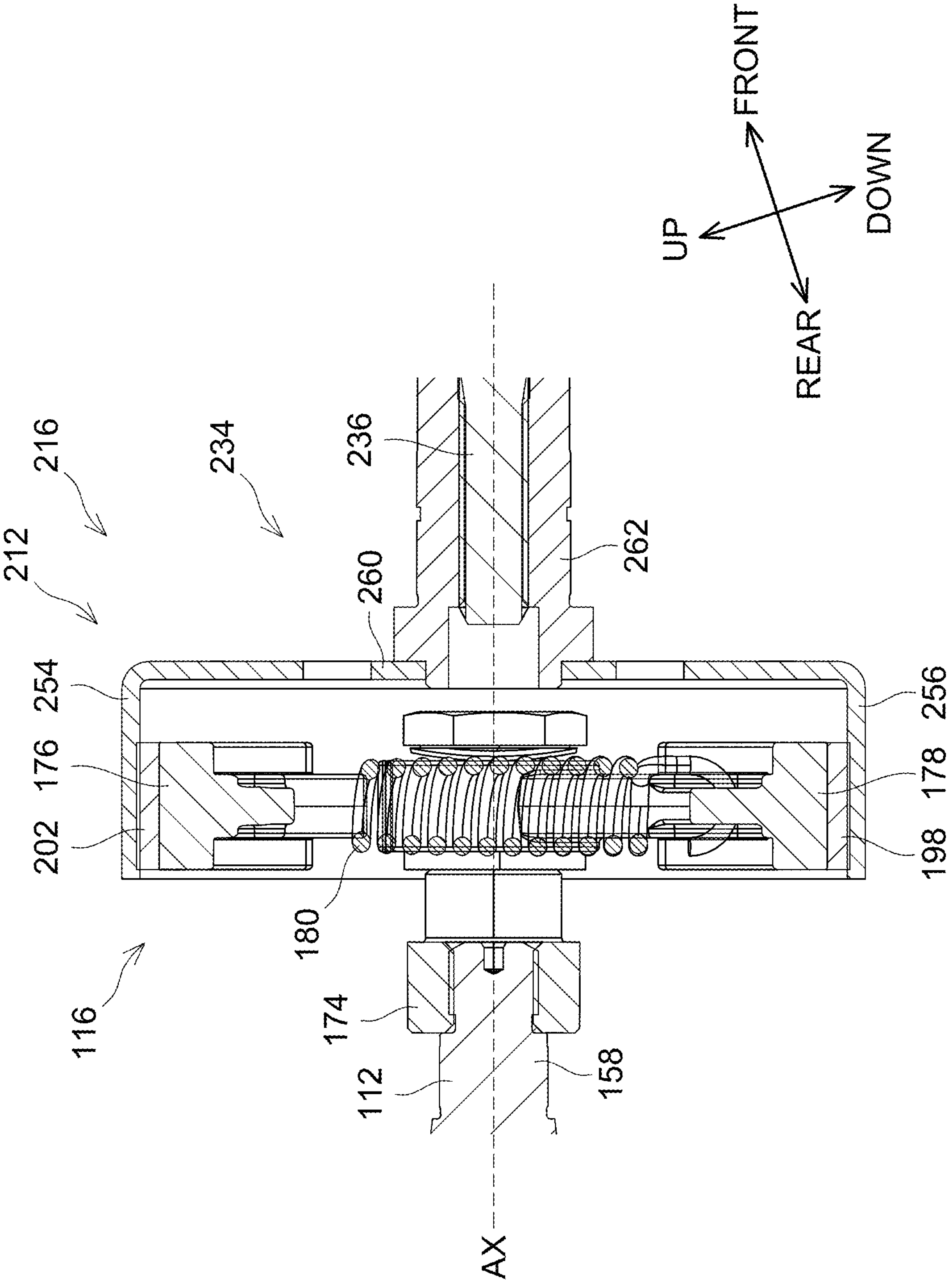
FIG. 42 shows a cross-sectional view of a first output member 212, a fixing unit 234, and a transmission shaft 236 according to the first embodiment.

The drum 254 is positioned within the fixing housing 252. The drum 254 is rotatably supported by the fixing housing 252. As shown in FIG. 42, the drum 254 comprises a cylindrical portion 258 and a bottom wall 260.

The cylindrical portion 258 has a substantially cylindrical shape. In the state where the fixing housing 252 is fixed to the flange 186 (see FIG. 41), the cylindrical portion 258 surrounds the first clutch shoe 176 and the second clutch shoe 178. The first clutch shoe 176 and the second clutch shoe 178 are positioned within the cylindrical portion 258.

The bottom wall 260 closes the hole of the cylindrical portion 258 at one end. The transmission shaft 236 is fixed to the bottom wall 260 via a coupler 262.

When the rotation speed of the motor shaft 158 rotating about the rotation axis AX reaches or exceeds the predetermined rotation speed, the other end of the first clutch shoe 176 and the other end of the second clutch shoe 178 move radially outward toward the inner surface of the tubular portion 184. Thereby, the friction member 198 on the first clutch shoe 176 and the friction member 202 on the second clutch shoe 178 are pressed against the inner circumferential surface of the cylindrical portion 258. The rotation of the motor shaft 158 is thereby transmitted to the drum 254, and the drum 254 rotates about the rotation axis AX integrally with the motor shaft 158. Thus, the transmission shaft 236 rotates integrally with the drum 254.

As shown in FIG. 37, the working part 238 is fixed to another end of the pole 230. The working part 238 comprises a housing 266 and a blade 268. The housing 266 supports the transmission shaft 236 (see FIG. 42) such that the transmission shaft 236 is rotatable.

The blade 268 is rotatably supported by the housing 266. The blade 268 is rotated by the rotation of the transmission shaft 236 (see FIG. 42). Thus, the blade 268 is driven by the motor 112 (see FIG. 28) of the motor unit 4. The blade 268 rotates to cut grass on the reference plane P (e.g., the ground).

Figure 43:
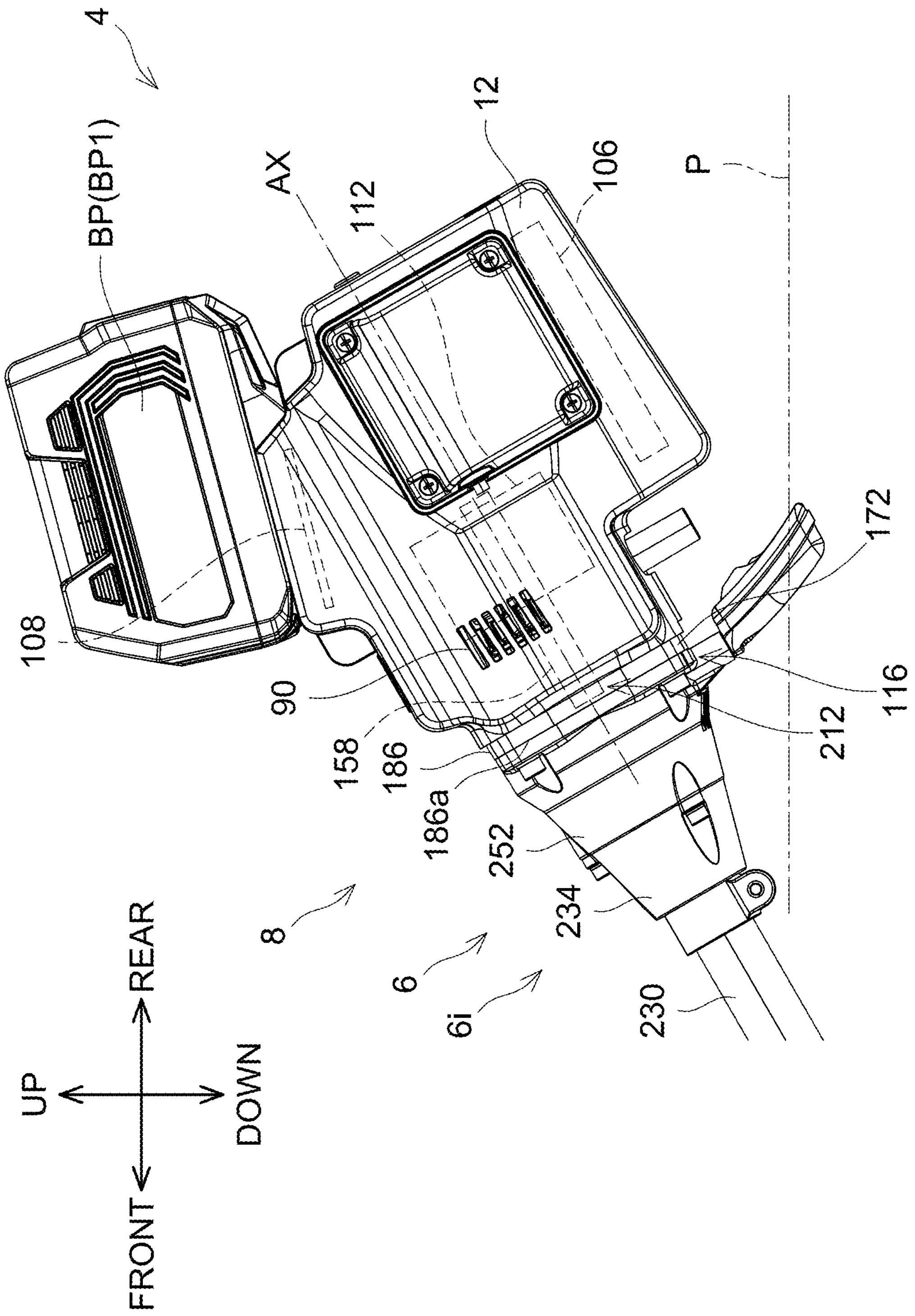
FIG. 43 shows a side view of the motor unit 4 and the handheld grass trimmer unit 6*i* in the vicinity of the motor unit 4 according to the first embodiment.

As shown in FIG. 43, when the working machine 8 comprising the motor unit 4 and the handheld grass trimmer unit 6*i* is in a working posture relative to the reference plane P, the front surface 186*a* of the flange 186 is oriented toward the reference plane P. In FIG. 43, a plane parallel to the reference plane P is indicated by a dash-double-dot line. The front surface 186*a* is oriented forward and downward. That is, when the working machine 8 is in the working posture relative to the reference plane P, the motor unit 4 is inclined relative to the reference plane P such that the distal end of the motor unit 4 is oriented forward and downward. The motor shaft 158 is inclined relative to the reference plane P. The inclination angle of the motor shaft 158 relative to the reference plane P is equal to or more than 30 degrees and equal to or less than 60 degrees. The battery terminal 108 and the battery pack BP are farther away from the reference plane P than the motor 112 is, that is, the battery terminal 108 and the battery pack BP are positioned above the motor 112. The control unit 106 is closer to the reference plane P than the motor 112 is, that is, the control unit 106 is positioned below the motor 112.

Figure 44:
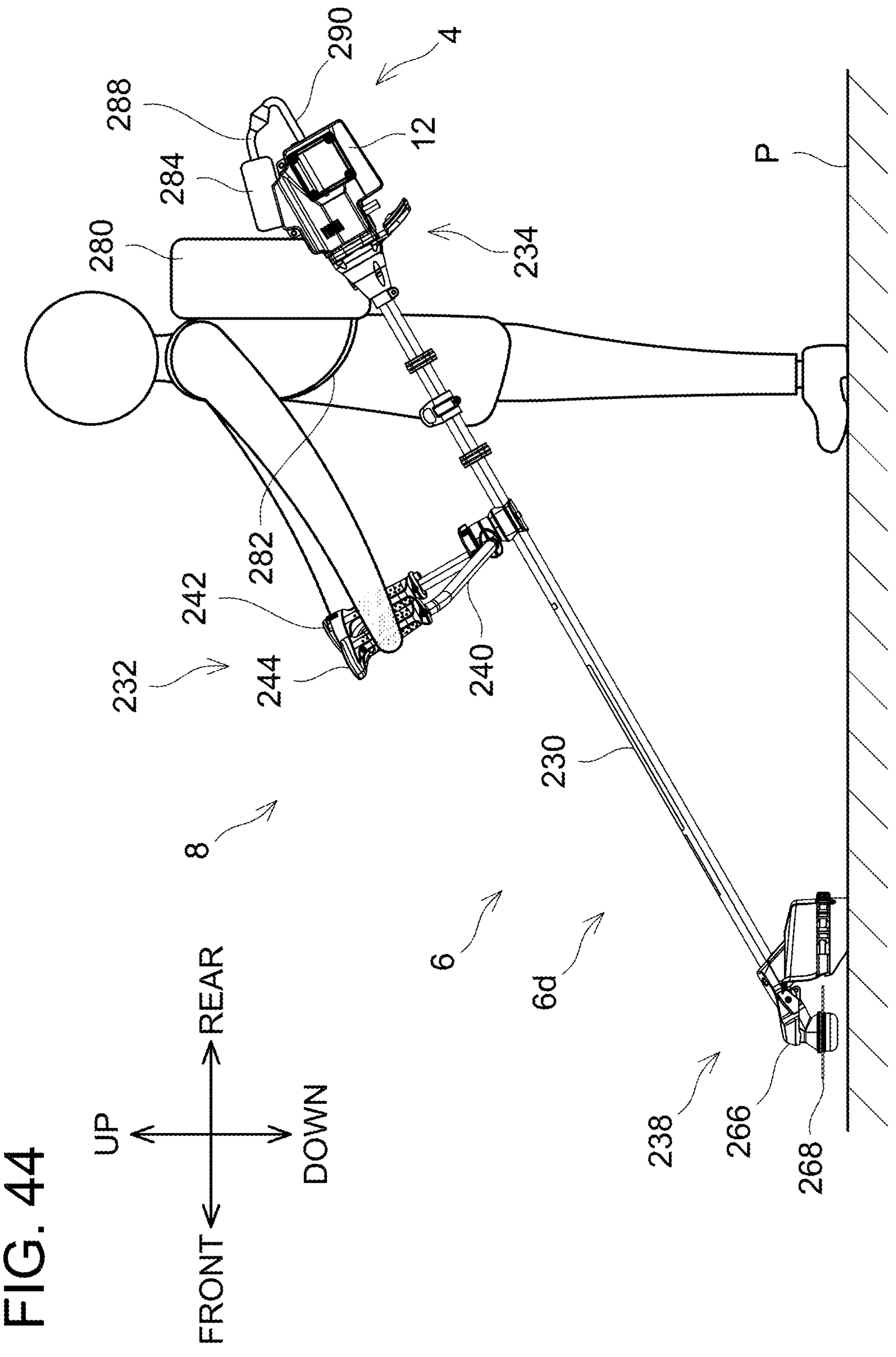
FIG. 44 shows a side view of the motor unit 4 for which a backpack type battery 280 is used and a grass trimmer unit 6*d* according to the first embodiment.

As shown in FIG. 44, the motor unit 4 may comprise the backpack type battery 280 as a replacement for the battery pack BP. In this case, the working unit 6 functions as the grass trimmer unit 6*d*. The backpack type battery 280 comprises a dischargeable and chargeable secondary battery such as a lithium ion battery. The backpack type battery 280 is worn on the user via a harness 282.

Figure 45:
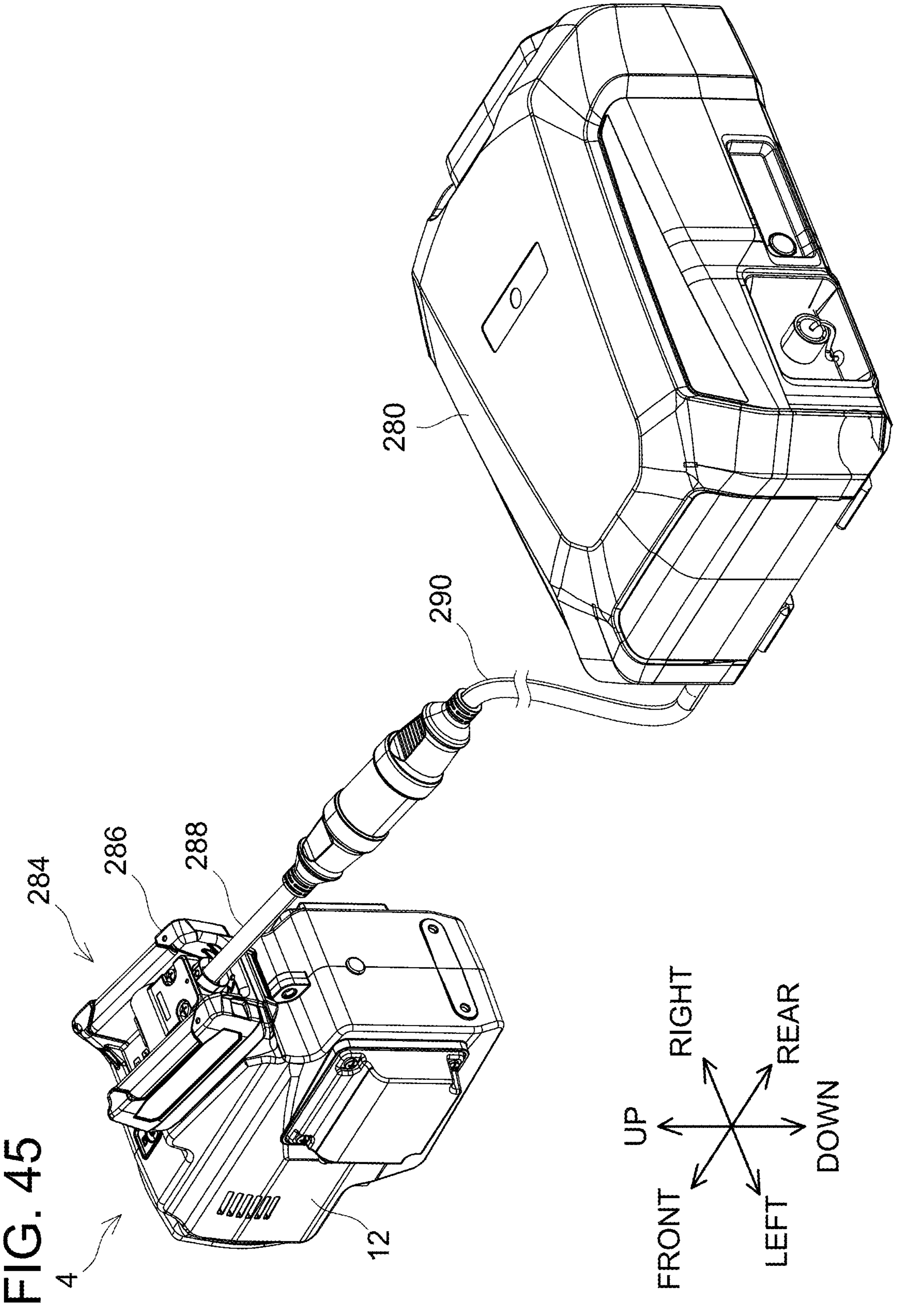
FIG. 45 shows a perspective view of the motor unit 4 for which the backpack type battery 280 is used according to the first embodiment.

As shown in FIG. 45, the motor unit 4 comprises an adaptor 284. The adaptor 284 comprises an adaptor body 286 and an adaptor cable 288. The adaptor body 286 is slidably attached to the body housing 12. An attachment structure for the adaptor body 286 to be attached to the body housing 12 is substantially the same as the attachment structure for the battery pack BP to be attached to the body housing 12, and thus detailed description for the structure is omitted. When the adaptor body 286 is attached to the body housing 12, the adaptor body 286 is electrically connected to the battery terminal 108 (see FIG. 11).

The adaptor cable 288 is attached to the adaptor body 286. The adaptor cable 288 is configured to be attached to a power cable 290 of the backpack type battery 280. Thus, power is supplied from the backpack type battery 280 to the motor unit 4 via the adaptor 284.

Figure 38:
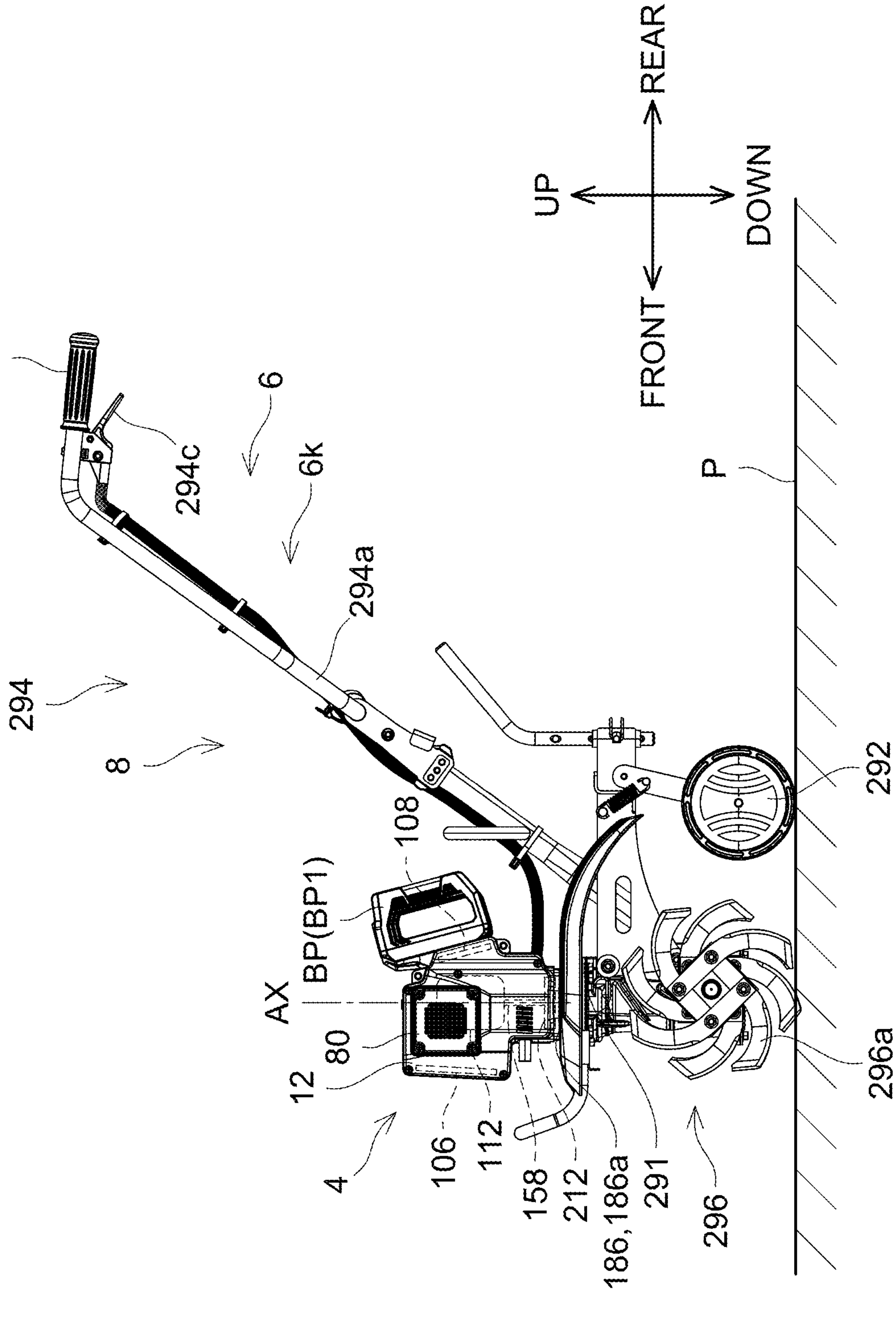
FIG. 38 shows a side view of the motor unit 4 and a multipurpose cultivator unit 6*k* according to the first embodiment.

As shown in FIG. 38, the motor unit 4 is applicable to the multipurpose cultivator unit 6*k*, which is an example of working units 6. The multipurpose cultivator unit 6*k* is a working unit configured to dig up the soil on the ground such as the reference plane P. The multipurpose cultivator unit 6*k* comprises a base 291, a wheel 292, a handle unit 294, and a working part 296.

The upper end of the base 291 is fixed to the flange 186 of the motor unit 4. The base 291 is in surface contact with the front surface 186*a* of the flange 186.

The wheel 292 is rotatably supported by the base 291. The multipurpose cultivator unit 6*k* is moved on the reference plane P by the rotation of the wheel 292.

The handle unit 294 comprises a fixing frame 294*a*, a handle 294*b*, and a trigger 294*c*. The fixing frame 294*a* extends upward and rearward from the base 291.

The handle 294*b* is attached to near the free end of the fixing frame 294*a*. The handle 294*b* is configured to be gripped by a user. The user grips the handle 294*b* and pushes it forward to move the multipurpose cultivator unit 6*k*.

The trigger 294*c* is pivotably attached to near the free end of the fixing frame 294*a*. The trigger 294*c* is manipulated to approach the handle 294*b* by the user's hand gripping the handle 294*b*. The motor 112 of the motor unit 4 is driven by the manipulation on the trigger 294*c*.

The working part 296 comprises a blade 296*a*. When the motor 112 is driven, the blade 296*a* rotates about an axis extending in the left-right direction, thereby digging up the soil on the ground such as the reference plane P.

Figure 46:
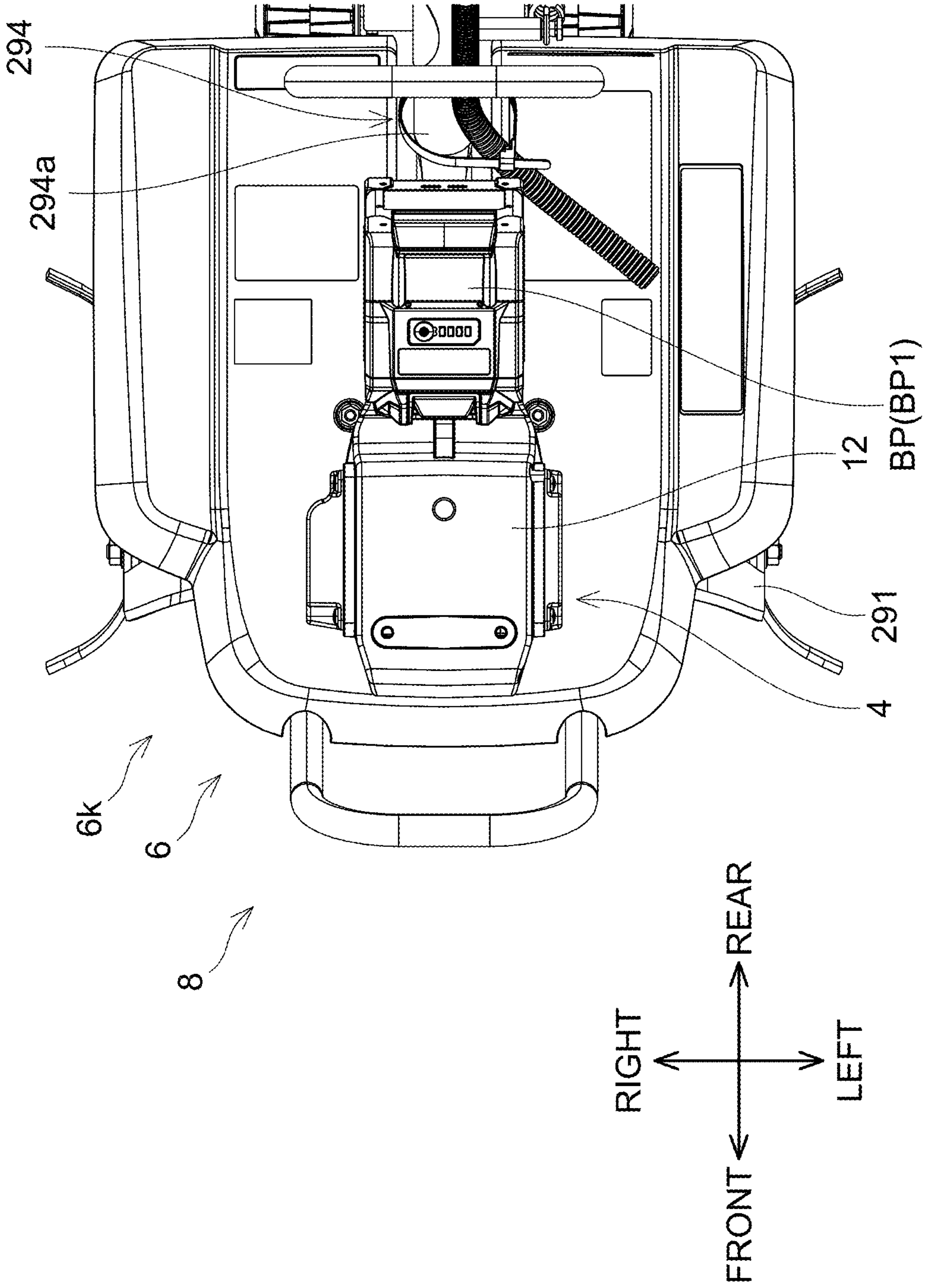
FIG. 46 shows a top view of the motor unit 4 and the multipurpose cultivator unit 6*k* according to the first embodiment.

As shown in FIG. 46, the width of the motor unit 4 in the left-right direction is less than the width of the multipurpose cultivator unit 6*k* in the left-right direction. Generally, the width of the motor unit 4 in the left-right direction is less than the widths of engine units in the left-right direction. Therefore, this configuration provides improved visibility as compared to a configuration using an engine unit.

As shown in FIG. 38, when the working machine 8 comprising the motor unit 4 and the multipurpose cultivator unit 6*k* is in a working posture relative to the reference plane P, the front surface 186*a* of the flange 186 is oriented toward the reference plane P. The front surface 186*a* is oriented downward. The motor shaft 158 extends in the up-down direction. The battery terminal 108 and the battery pack BP are positioned rearward of the motor 112. The control unit 106 is positioned forward of the motor 112. The motor 112, the battery terminal 108, the battery pack BP, and the control unit 106 are aligned along the reference plane P. The battery pack BP is attached to the body housing 12 by being slid relative to the body housing 12 in a direction toward the reference plane P. The battery pack BP is removed from the body housing 12 by being slid relative to the body housing 12 in a direction away from the reference plane P. This suppresses the battery pack BP from being removed from the body housing 12 due to its own weight. The battery terminal 108 is inclined relative to a plane perpendicular to the reference plane P. The inclination angle is equal to or less than 45 degrees. This allows the user to remove the battery pack BP from the body housing 12 without holding the body housing 12 with his/her hand.

Figure 47:
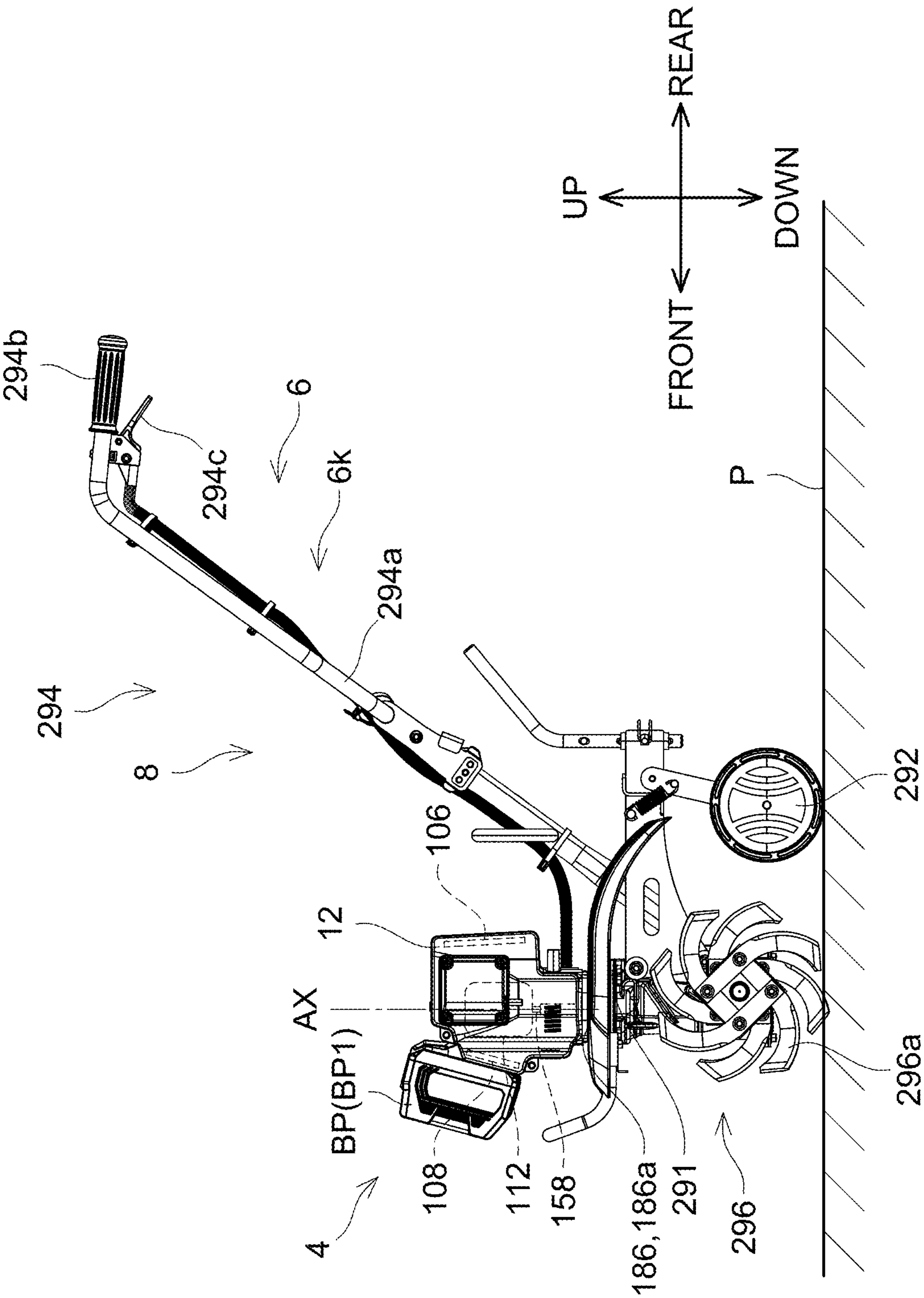
FIG. 47 shows a side view of the motor unit 4 and the multipurpose cultivator unit 6*k* according to the first embodiment.

As shown in FIG. 47, the motor unit 4 can be fixed to the multipurpose cultivator unit 6*k* in a different pose from the pose shown in FIG. 38. The battery terminal 108 and the battery pack BP are positioned forward of the motor 112. The control unit 106 is positioned rearward of the motor 112.

Figure 39:
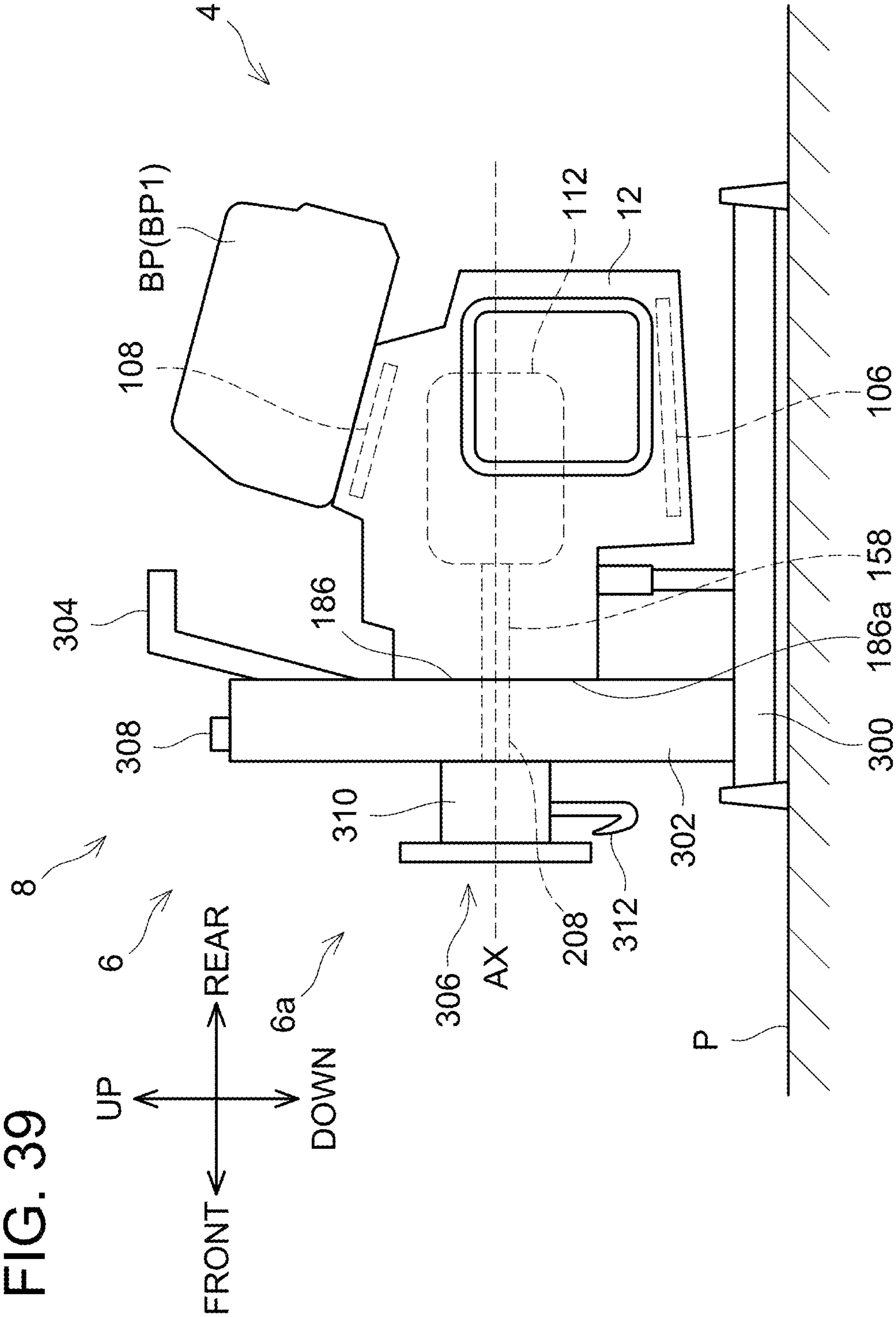
FIG. 39 shows a side view of the motor unit 4 and a winch unit 6*a* according to the first embodiment.

As shown in FIG. 39, the motor unit 4 is applicable to the winch unit 6*a*, which is an example of working units 6. The winch unit 6*a* is a working unit configured to for example lift and lower an object. The winch unit 6*a* comprises a base frame 300, a fixing frame 302, a handle 304, and a working part 306.

The base frame 300 lies on a plane along the front-rear direction and the left-right direction. When the winch unit 6*a* is on the reference plane P, the base frame 300 is in contact with the reference plane P.

The fixing frame 302 extends upward from the base frame 300. The fixing frame 302 extends substantially in the up-down direction. The fixing frame 302 is fixed to the flange 186 of the motor unit 4. The fixing frame 302 is in surface contact with the front surface 186*a* of the flange 186. The winch unit 6*a* further comprises a manipulation switch 308, and the manipulation switch 308 pushably attached to the fixing frame 302. The motor 112 of the motor unit 4 is driven by pushing on the manipulation switch 308.

The handle 304 is fixed to near the upper end of the fixing frame 302. The handle 304 is configured to be gripped by a user. For example, the user grips the handle 304 to carry the winch unit 6*a* around.

The working part 306 comprises a drum 310 and a hook 312. The drum 310 is fixed to the spindle 208 of the motor unit 4. The drum 310 is rotatably attached to the fixing frame 302. The drum 310 is on the opposite side of the fixing frame 302 to the motor unit 4.

The hook 312 is fixed to the drum 310 via a rope (not shown). The hook 312 is configured to engage with an object. When the motor shaft 158 rotates with an object engaged with the hook 312, the drum 310 rotates about the rotation axis AX extending in the front-rear direction integrally with the spindle 208. The rope is thereby reeled onto the drum 310 or pulled out from the drum 310. Thus, the object on the hook 312 is lifted or lowered.

When the working machine 8 comprising the motor unit 4 and the winch unit 6*a* is in a working posture relative to the reference plane P, the front surface 186*a* of the flange 186 is oriented forward along the reference plane P. That is, when the working machine 8 is in the working posture relative to the reference plane P, the motor unit 4 is oriented such that the front end of the motor unit 4 is oriented forward along the reference plane P. The motor shaft 158 extends in the front-rear direction along the reference plane P. The battery terminal 108 and the battery pack BP are positioned farther away from the reference plane P than the motor 112 is. The battery terminal 108 and the battery pack BP are positioned above the motor 112. The control unit 106 is positioned closer to the reference plane P than the motor 112 is. The control unit 106 is positioned below the motor 112.

Figure 40:
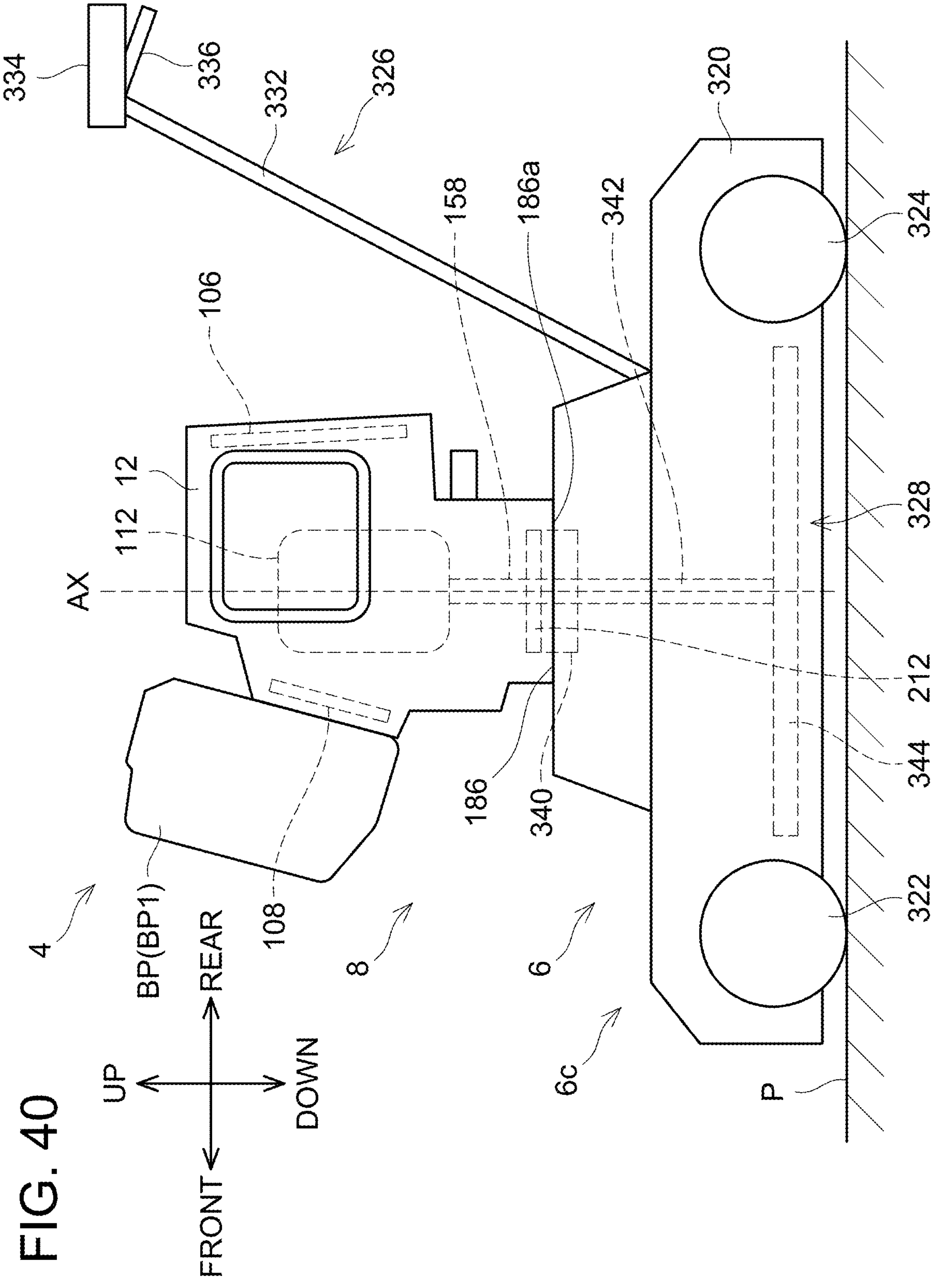
FIG. 40 shows a side view of the motor unit 4 and a slope mower unit 6*c* according to the first embodiment.

As shown in FIG. 40, the motor unit 4 is applicable to the slope mower unit 6*c*, which is an example of working units 6. The slope mower unit 6*c* is a working unit configured to cut a lawn on the reference plane P. The slope mower unit 6*c* comprises a housing 320, a pair of front wheels 322, a pair of rear wheels 324, a handle unit 326, and a working part 328.

The upper surface of the housing 320 is fixed to the flange 186 of the motor unit 4. The housing 320 is in surface contact with the front surface 186*a* of the flange 186.

The pair of front wheels 322 is rotatably supported by a front portion of the housing 320. The pair of rear wheels 324 is rotatably supported by a rear portion of the housing 320. The slope mower unit 6*c* moves on the reference plane P by the rotation of the pair of front wheels 322 and the pair of rear wheels 324.

The handle unit 326 comprises a fixing frame 332, a handle 334, and a trigger 336. The fixing frame 332 has a substantially U-shape. The longitudinal ends of the fixing frame 332 are fixed to the housing 320.

The handle 334 is attached to an upper portion of the fixing frame 332. The handle 334 is configured to be gripped by a user. The user grips the handle 334 and pushes it forward to move the slope mower unit 6*c*.

The trigger 336 is pivotably attached to the handle 334. The trigger 336 is manipulated to approach the handle 334 by the user's hand gripping the handle 334. The motor 112 of the motor unit 4 is driven by the manipulation on the trigger 336.

The working part 328 comprises a drum 340, a transmission shaft 342, and a blade 344. The drum 340 is rotatably supported by the housing 320. When the rotation speed of the motor shaft 158 reaches or exceeds a predetermined speed, the drum 340 is pressed against the friction member 198 (see FIG. 30) of the first clutch shoe 176 and the friction member 202 (see FIG. 30) of the second clutch shoe 178. Thereby, the rotation of the motor shaft 158 is transmitted to the drum 340 and the drum 340 rotates about the rotation axis AX extending in the up-down direction integrally with the motor shaft 158.

The transmission shaft 342 is fixed to the drum 340. The transmission shaft 342 extends in the up-down direction. The transmission shaft 342 rotates about the rotation axis AX integrally with the drum 340.

The blade 344 is fixed to the transmission shaft 342. The blade 344 rotates about the rotation axis AX integrally with the transmission shaft 342, thereby cutting the grass on the reference plane P.

When the working machine 8 comprising the motor unit 4 and the slope mower unit 6*c* is in a working posture relative to the reference plane P, the front surface 186*a* of the flange 186 is oriented toward the reference plane P. The front surface 186*a* is oriented downward. The motor shaft 158 extends in the up-down direction. The battery terminal 108 and the battery pack BP are positioned forward of the motor 112. The control unit 106 is positioned rearward of the motor 112. The motor 112, the battery terminal 108, the battery pack BP, and the control unit 106 are aligned along the reference plane P. The battery pack BP is attached to the body housing 12 by being slid relative to the body housing 12 in a direction toward the reference plane P. The battery pack BP is removed from the body housing 12 by being slid relative to the body housing 12 in a direction away from the reference plane P. This suppresses the battery pack BP from being removed from the body housing 12 due to its own weight. The battery terminal 108 is inclined relative to a plane perpendicular to the reference plane P. The inclination angle is equal to or less than 45 degrees. This allows the user to remove the battery pack BP from the body housing 12 without holding the body housing 12 with his/her hand.

Figure 48:
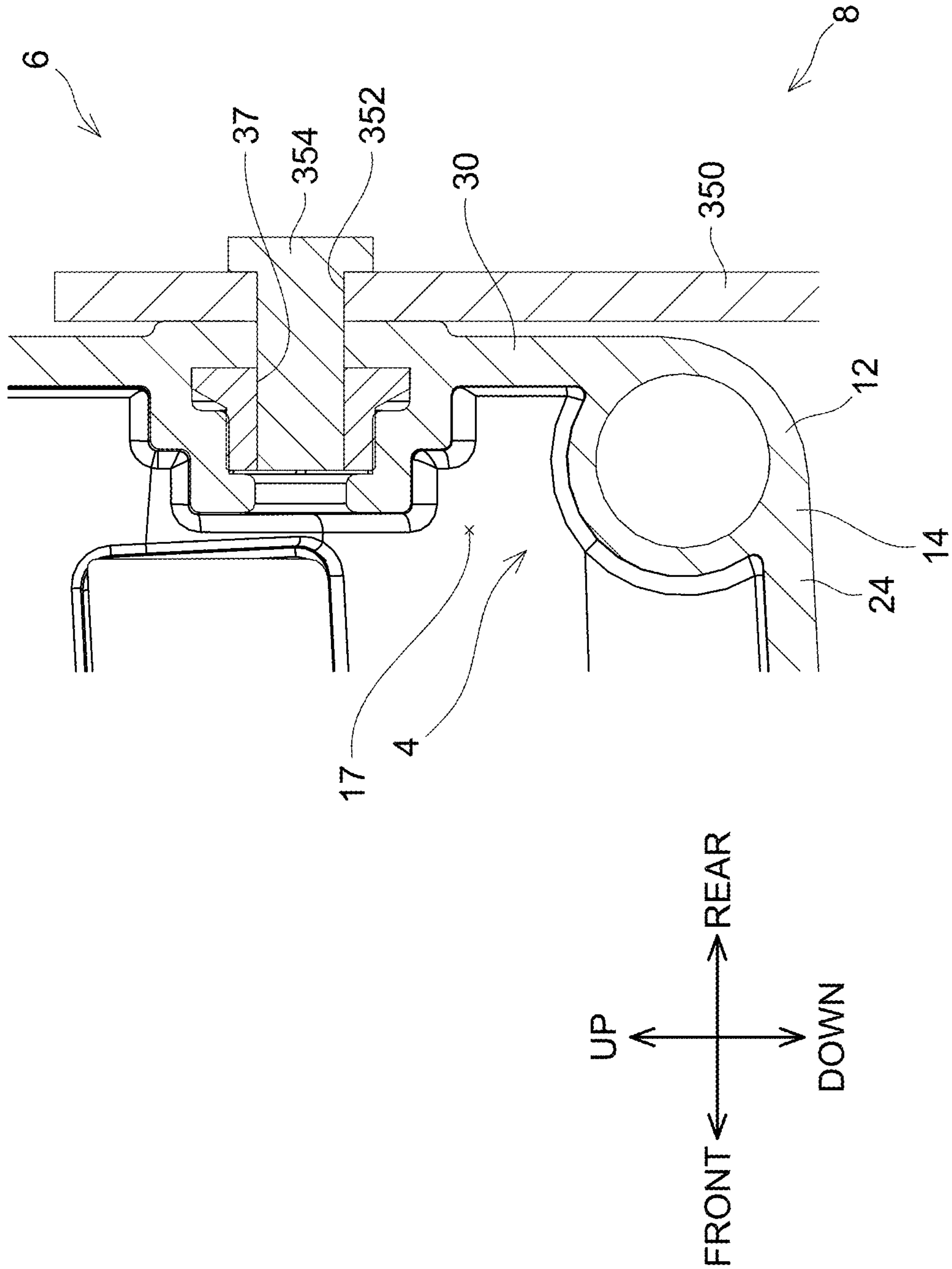
FIG. 48 shows a cross-sectional view of the motor unit 4 and a working unit 6 in the vicinity of a first coupler 350 according to the first embodiment.

In addition to the fixing of the flange 186 to a working unit 6, the motor unit 4 is also fixable to the working unit 6 via the screw holes 37 in the body housing 12, as shown in FIG. 48. The working unit 6 comprises a first coupler 350. The first coupler 350 contacts the rear wall 30 of the body housing 12. The first coupler 350 includes insertion holes 352. The insertion holes 352 extend through the first coupler 350 in the front-rear direction. The insertion holes 352 face the screw holes 37 in the front-rear direction. The motor unit 4 is fixed to the first coupler 350 by screws 354 being inserted in the insertion holes 352 and screwed into the screw holes 37. The motor unit 4 is thereby fixed to the working unit 6 more firmly. In a variant, the motor unit 4 may be fixed to the working unit 6 via the screw holes 37 and the screws 354, without using the first coupler 350.

Figure 49:
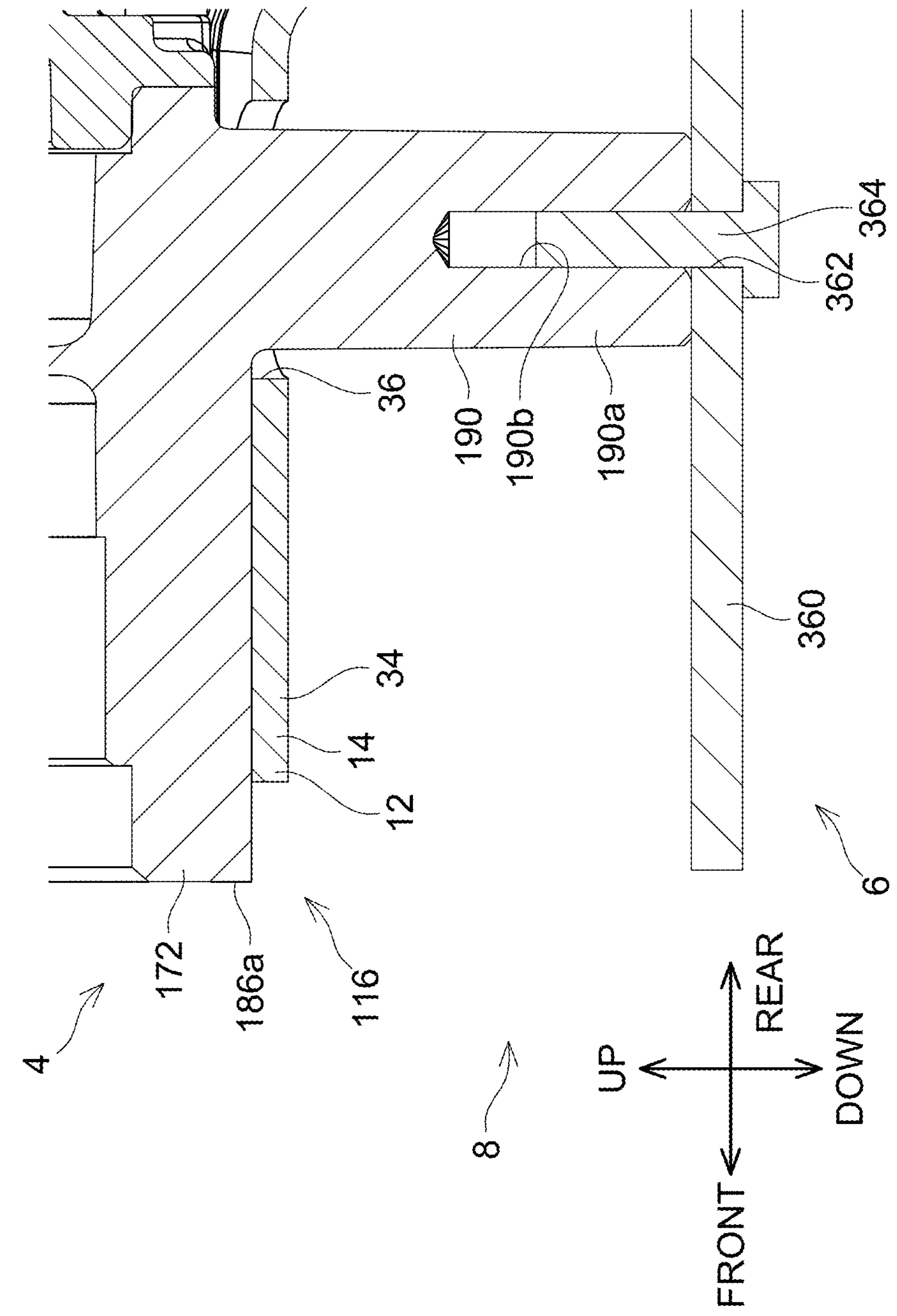
FIG. 49 shows a cross-sectional view of the motor unit 4 and the working unit 6 in the vicinity of a second coupler 360 according to the first embodiment.

In addition to the fixing of the flange 186 to a working unit 6, the motor unit 4 is also fixable to the working unit 6 via the first screw boss 190 of the mount base 172, as shown in FIG. 49. The working unit 6 comprises a second coupler 360. The second coupler 360 contacts the lower surfaces of the cylindrical portions 190*a* of the first screw boss 190. The second coupler 360 includes insertion holes 362. The insertion holes 362 extend through the second coupler 360 in the up-down direction. The insertion holes 362 face the screw holes 190*b* in the up-down direction. The motor unit 4 is fixed to the second coupler 360 by screws 364 being inserted in the insertion holes 362 and screwed into the screw holes 190*b*. The motor unit 4 is thereby fixed to the working unit 6 more firmly. In a variant, the motor unit 4 may be fixed to the working unit 6 via the screw holes 190*b* and the screws 364, without using the second coupler 360. In a variant, the motor unit 4 may be fixed to a working unit 6 using both the fixing via the screw holes 37 in the body housing 12 and the fixing via the first screw boss 190, in addition to the fixing of the flange 186 to the working unit 6.

Effects

The system 2 according to this embodiment comprises: the motor unit 4 comprising the motor 112, the output member 216 configured to be driven by the motor 112, and the front surface 186*a* (an example of fixing member) of the mount base 172; the winch unit 6*a* (an example of first working unit) configured to be selectively fixed to the front surface 186*a* of the motor unit 4 and be driven by the output member 216; and the slope mower unit 6*c* (an example of second working unit) configured to be selectively fixed to the front surface 186*a* of the motor unit 4 and be driven by the output member 216. The winch unit 6*a* differs from the slope mower unit 6*c*. In the case where the front surface 186*a* of the motor unit 4 is fixed to the winch unit 6*a*, the front surface 186*a* of the motor unit 4 is oriented forward (example of a first direction) relative to the reference plane P when the winch unit 6*a* and the motor unit 4 are in the working posture relative to the reference plane P. In the case where the front surface 186*a* is fixed to the slope mower unit 6*c*, the front surface 186*a* of the motor unit 4 is oriented downward (an example of a second direction), which is different from forward, relative to the reference plane P when the slope mower unit 6*c* and the motor unit 4 are in the working posture relative to the reference plane P. The winch unit 6*a* comprises the manipulation switch 308 (an example of first manipulation member) configured to be manipulated by a user to drive the motor 112. The slope mower unit 6*c* comprises the trigger 336 (an example of second manipulation member) configured to be manipulated by the user to drive the motor 112.

According to the configuration above, in the case where the motor unit 4 is fixed to the winch unit 6*a*, it is fixed with the front surface 186*a* oriented forward relative to the reference plane P, while in the case where the motor unit 4 is fixed to the slope mower unit 6*c*, it is fixed with the front surface 186*a* oriented downward relative to the reference plane P. Thus, the motor unit 4 is applicable to an increased variety of working unit types.

The winch unit 6*a* further comprises the handle 304 (an example of first handle) configured to be gripped by the user.

The configuration above allows the user to grip the handle 304 to move the winch unit 6*a*.

The maximum output of the motor 112 ranges from 0.5 kW to 1.5 kW.

In the configuration above, the motor 112 is a low-power motor. The low-power motor 112 can be used for a variety of low-power working units 6. The motor unit 4 can thus be used for the low-power working units 6. Thus, the motor unit 4 is applicable to an increased variety of working unit 6 types.

The diameter DAI of the motor 112 is equal to or less than 100 mm.

In general, decrease in the size of the motor 112 enables the motor unit 4 to be smaller. The smaller motor unit 4 can be used for a wider variety of working units 6. The configuration above allows the motor unit 4 to be applicable to an increased variety of working unit 6 types.

The weight of the motor unit 4 is equal to or less than 7.5 kg.

In general, decrease in the weight of the motor unit 4 enables the motor unit 4 to be used for a wider variety of working units 6 such as a handheld working unit. The configuration above allows the motor unit 4 to be applicable to an increased variety of working unit 6 types.

The motor unit 4 further comprises the body housing 12 accommodating the motor 112. The volume of the body housing 12 is equal to or less than 13000 $cm^3$.

In general, the decrease in the size of the motor unit 4 enables the motor unit 4 to be used for a wider variety of working units 6. The configuration above allows the motor unit 4 to be applicable to an increased variety of working unit 6 types.

The motor 112 comprises the motor shaft 158. In the case where the front surface 186*a* of the motor unit 4 is fixed to the winch unit 6*a*, the motor shaft 158 extend along the reference plane P when the winch unit 6*a* and the motor unit 4 are in the working posture relative to the reference plane P. In the case where the front surface 186*a* of the motor unit 4 is fixed to the slope mower unit 6*c*, the motor shaft 158 extends perpendicular to the reference plane P when the slope mower unit 6*c* and the motor unit 4 are in the working posture relative to the reference plane P.

The configuration above allows the motor unit 4 to be applicable to an increased variety of working unit 6 types by the variable orientation of the motor shaft 158 relative to the reference plane P.

Forward is a direction along the reference plane P. Downward is a direction perpendicular to the reference plane P.

The configuration above allows for easy adjustment of the motor shaft 158 orientation by adjusting the front surface 186*a* orientation.

The motor unit 4 further comprises: the body housing 12 accommodating the motor 112; and the battery terminal 108 exposed to the outside of the body housing 12 and configured to be connected to the battery pack BP (an example of battery) configured to supply power to the motor 112.

The configuration above allows for use of various types of battery packs BP depending on the working unit 6 types.

In the case where the front surface 186*a* of the motor unit 4 is fixed to the winch unit 6*a*, the battery terminal 108 is positioned above the motor 112 when the winch unit 6*a* and the motor unit 4 are in the working posture relative to the reference plane P. In the case where the front surface 186*a* of the motor unit 4 is fixed to the slope mower unit 6*c*, the battery terminal 108 is positioned lateral to the motor 112 when the slope mower unit 6*c* and the motor unit 4 are in the working posture relative to the reference plane P.

In the configuration above, the battery pack BP posture relative to the reference plane P is variable depending on the motor unit 4 posture.

The winch unit 6*a* is included in a group consisting of the winch unit 6*a*, the screed unit 6*e*, and the trowel unit 6*f*.

The configuration above allows the motor unit 4 to be used for the group consisting of the winch unit 6*a*, the screed unit 6*e*, and the trowel unit 6*f*, and a group of the other working units 6.

The handheld grass trimmer unit 6*i* is used as the second working unit. The handheld grass trimmer unit 6*i* is configured to be held by the hand(s) of the user.

The configuration above allows the motor unit 4 to be used for the handheld working unit and a group of working units 6 other than the handheld working unit.

The system 2 according to this embodiment comprises: the motor unit 4 comprising the motor 112 including the motor shaft 158, and the front surface 186*a* (an example of fixing member) of the mount base 172; the winch unit 6*a* (an example of first working unit) configured to be selectively fixed to the front surface 186*a* and be driven by the motor shaft 158, wherein the motor shaft 158 extends in the left-right direction when the winch unit 6*a* is operated by the user; and the slope mower unit 6*c* (an example of second working unit) configured to be selectively fixed to the front surface 186*a* and driven by the motor shaft 158, wherein the motor shaft 158 extends in the up-down direction when the slope mower unit 6*c* is operated by the user.

According to the configuration above, in the case where the motor unit 4 is fixed to the winch unit 6*a*, it is fixed with the motor shaft 158 extending in the left-right direction, while in the case where the motor unit 4 is fixed to the slope mower unit 6*c*, it is fixed with the motor shaft 158 extending in the up-down direction. Thus, the motor unit 4 is applicable to an increased variety of working unit 6 types.

The system 2 according to this embodiment comprises: the motor unit 4 comprising the motor 112, the output member 216 configured to driven by the motor 112, and the front surface 186*a* (an example of fixing member) of the mount base 172; the handheld grass trimmer unit 6*i* (an example of first working unit) configured to be selectively fixed to the front surface 186*a* of the motor unit 4 and be driven by the motor 112; and the winch unit 6*a* (an example of second working unit) configured to be selectively fixed to the front surface 186*a* of the motor unit 4 and be driven by the motor 112. The output member 216 comprises: the first output member 212 configured to be selectively fixed to the motor 112 and drive the handheld grass trimmer unit 6*i*; and the second output member 214 configured to be selectively fixed to the motor 112 and drive the winch unit 6*a*.

According to the configuration above, the motor unit 4 drives the handheld grass trimmer unit 6*i* by the first output member 212, while the motor unit 4 drives the winch unit 6*a* by the second output member 214. Thus, the motor unit 4 is applicable to an increased variety of working unit 6 types.

Second Embodiment

For a second embodiment, differences from the first embodiment are described. Hereinafter, a direction in which the motor shaft 158 extends is termed a front-rear direction, a direction perpendicular to the front-rear direction is termed a left-right direction, and the direction perpendicular to the front-rear direction and the left-right direction is termed an up-down direction.

Figure 50:
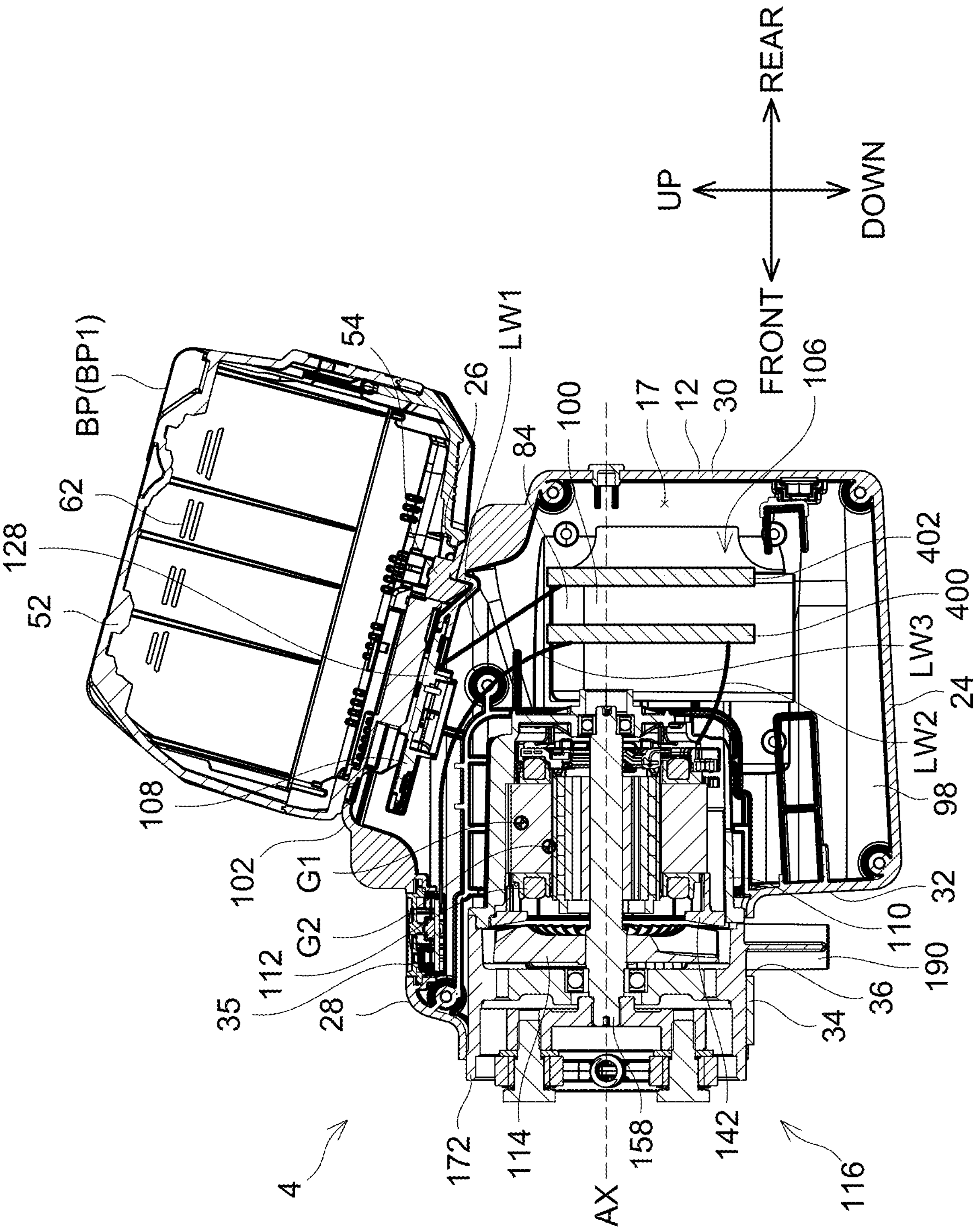
FIG. 50 shows a side cross-sectional view of a motor unit 4 and battery pack BP according to a second embodiment.

As shown in FIG. 50, in the second embodiment, the control unit 106 is positioned in the motor accommodating portion 100. The control unit 106 comprises a first control board 400 and a second control board 402. The first control board 400 and the second control board 402 each comprise a microcomputer and a plurality of switching elements. The first control board 400 and the second control board 402 extend in the up-down direction. The first control board 400 and the second control board 402 extend along the rear wall 30. The first control board 400 and the second control board 402 are aligned in the front-rear direction. The first control board 400 and the second control board 402 are positioned rearward of the motor housing 110. In the rear view of the motor unit 4, the first control board 400 at least partially overlaps each of the second control board 402 and the motor housing 110, and the second control board 402 at least partially overlaps the motor housing 110.

In the state where the battery pack BP is attached to the body housing 12, the center of gravity G1 of the motor unit 4 is positioned within the motor 112. The center of gravity G1 is positioned forward of the center position of the body housing 12 in the front-rear direction. The center of gravity G1 is positioned above the rotation axis AX of the motor shaft 158.

In the state where the battery pack BP is not attached to the body housing 12, the center of gravity G2 of the motor unit 4 is positioned within the motor 112. The center of gravity G2 is positioned forward of the center of gravity G1. The center of gravity G2 is positioned above the rotation axis AX of the motor shaft 158. The center of gravity G2 is positioned closer to the rotation axis AX than the center of gravity G1 is.

Third Embodiment

Figure 51:
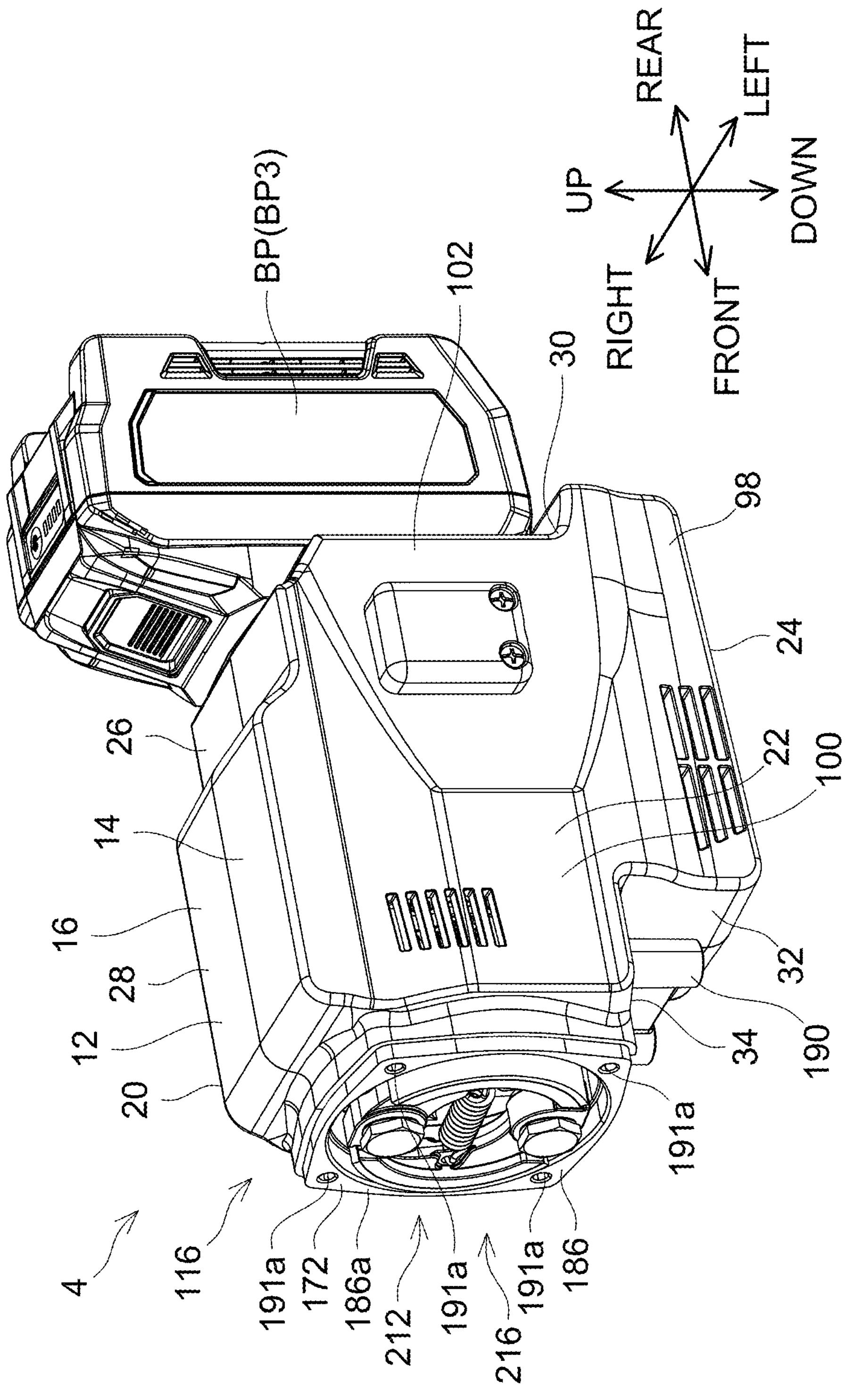
FIG. 51 shows a perspective view of a motor unit 4 and a battery pack BP according to a third embodiment.

For a third embodiment, differences from the first embodiment are described. As shown in FIG. 51, in the third embodiment, the battery pack BP is attached to the rear wall 30 of the body housing 12. Hereinafter, the battery pack BP shown in FIG. 51 may be termed a battery pack BP3. The battery pack BP3 has the maximum voltage of 40 V and the rated capacity of 5.0 Ah.

Figure 52:
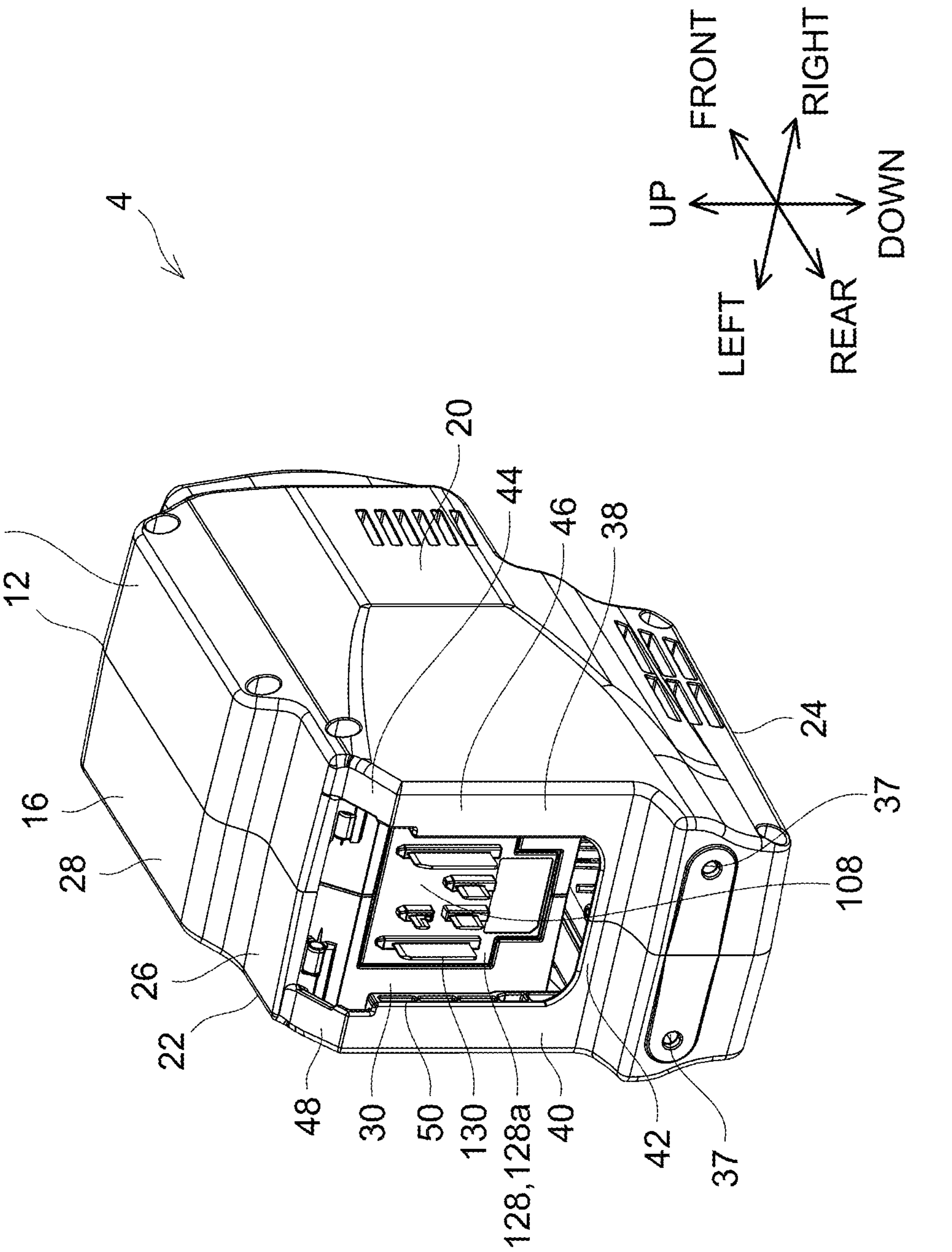
FIG. 52 shows a perspective view of the motor unit 4 according to the third embodiment.

As shown in FIG. 52, the right rail 38, the left rail 40, and the connection wall 42 are positioned at the rear wall 30. The right rail 38 extends substantially in the up-down direction along the right end of the rear wall 30. The left rail 40 extends substantially in the up-down direction along the left end of the rear wall 30. The connection wall 42 connects the lower end of the right rail 38 and the lower end of the left rail 40 to each other.

Figure 53:
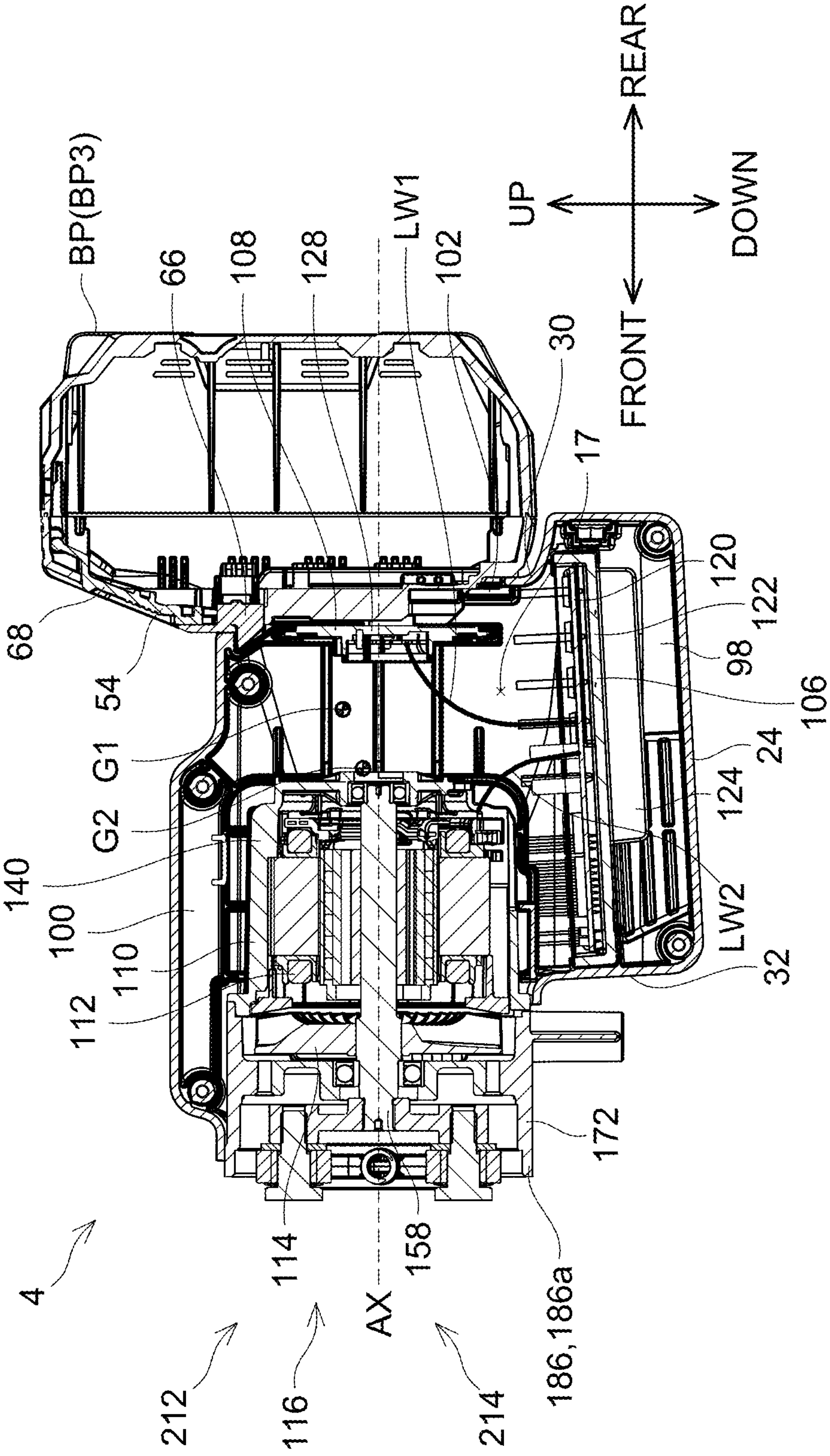
FIG. 53 shows a side cross-sectional view of the motor unit 4 and the battery pack BP according to the third embodiment.

The battery terminal 108 is positioned in the rear wall 30. The outer surface 128*a* of the terminal base 128 lies on a plane including the up-down direction and the left-right direction. The outer surface 128*a* corresponds to the rear surface of the terminal base 128. As shown in FIG. 53, the battery terminal 108 is positioned rearward of the motor housing 110. In the front view of the motor unit 4, the battery terminal 108 at least partially overlaps each of the motor housing 110 and the motor 112. The battery terminal 108 is positioned above the rotation axis AX of the motor shaft 158. The battery terminal 108 is positioned above the control unit 106. In the top view of the motor unit 4, the battery terminal 108 at least partially overlaps the control unit 106.

The battery pack BP is attached to the body housing 12 by being slid downward from above the body housing 12. The battery pack BP is removed from the body housing 12 by being slid upward by the user who is pushing in the manipulation portion 68 of the battery pack BP. This suppresses the battery pack BP from being removed from the body housing 12 due to its own weight.

In the state where the battery pack BP is attached to the body housing 12, the center of gravity G1 of the motor unit 4 is positioned rearward of the motor housing 110. The center of gravity G1 is positioned rearward of the center position of the body housing 12 in the front-rear direction and the center position of the control unit 106 in the front-rear direction. The center of gravity G1 is positioned above the rotation axis AX of the motor shaft 158. In the up-down direction, the center of gravity G1 is positioned between the upper and lower ends of the battery terminal 108.

In the state where the battery pack BP is not attached to the body housing 12, the center of gravity G2 of the motor unit 4 is positioned near the rear ed of the motor housing 110. The center of gravity G2 is positioned forward of the center of gravity G1. The center of gravity G2 is positioned above the rotation axis AX of the motor shaft 158. The center of gravity G2 is positioned closer to the rotation axis AX than the center of gravity G1 is.

Fourth Embodiment

Figure 54:
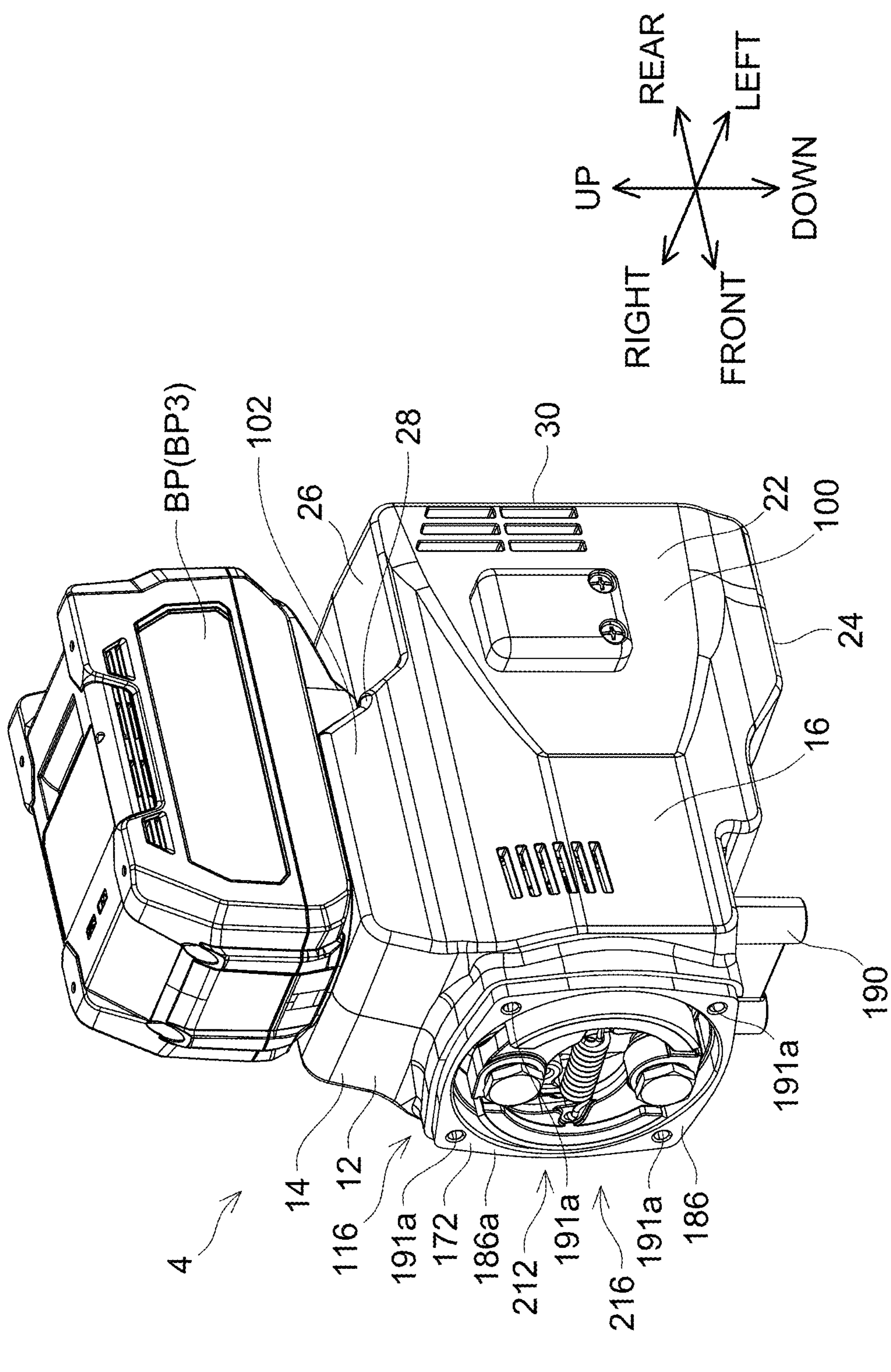
FIG. 54 shows a perspective view of a motor unit 4 and a battery pack BP according to a fourth embodiment.

For a fourth embodiment, differences from the first embodiment are described. As shown in FIG. 54, in the fourth embodiment, the battery pack BP is attached to the upper front wall 28 of the body housing 12. Hereinafter, the battery pack BP shown in FIG. 54 may be termed a battery pack BP3. The battery pack BP3 has the maximum voltage of 4.0 V and the rated capacity of 5.0 Ah.

Figure 55:
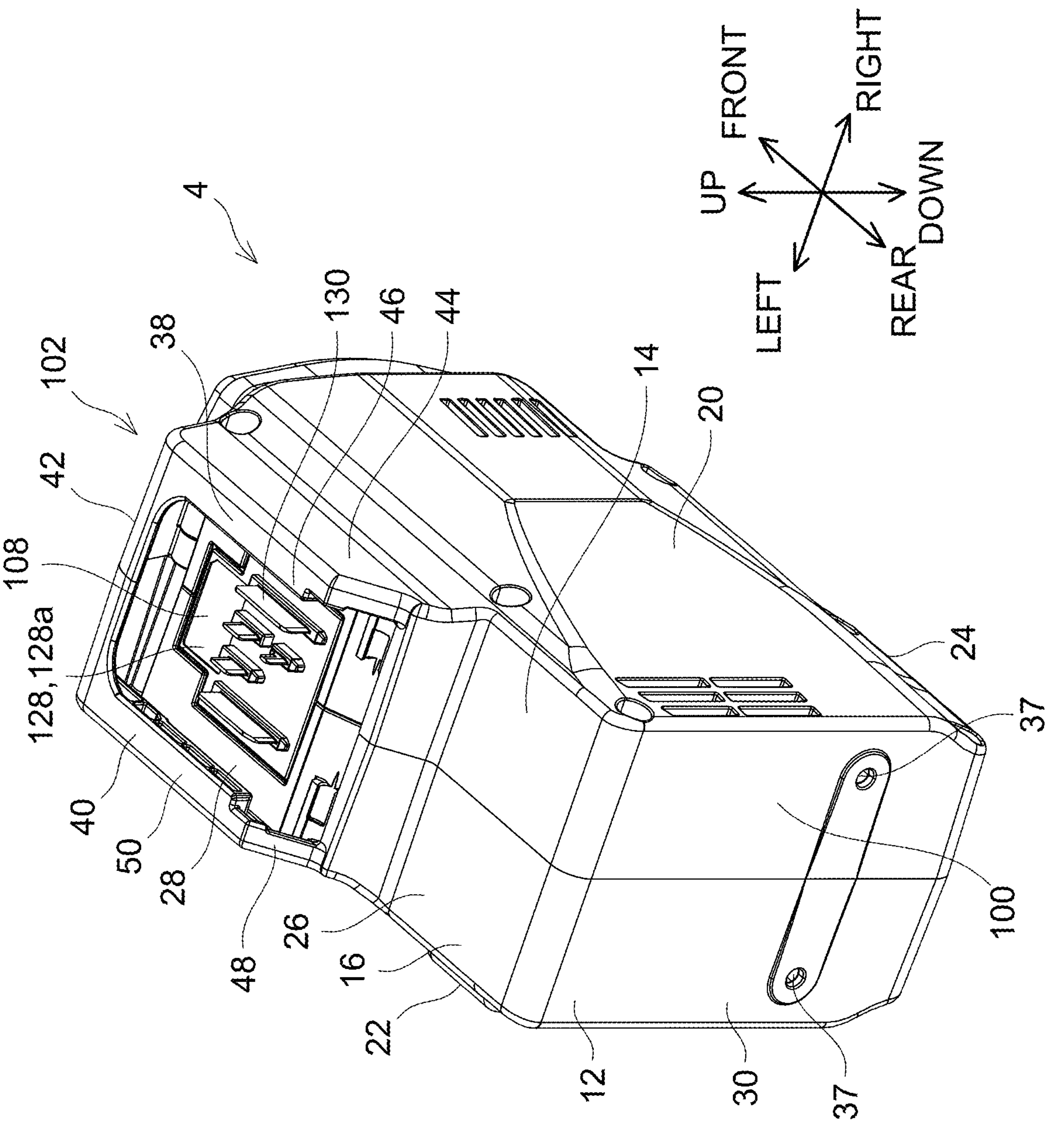
FIG. 55 shows a perspective view of the motor unit 4 according to the fourth embodiment.

As shown in FIG. 55, the right rail 38, the left rail 40, and the connection wall 42 are positioned at the upper front wall 28. The right rail 38 extends substantially in the front-rear direction along the right ed of the upper front wall 28. The left rail 40 extends substantially in the front-rear direction along the left end of the upper front wall 28. The connection wall 42 connects the front end of the right rail 38 and the front end of the left rail 40 to each other.

Figure 56:
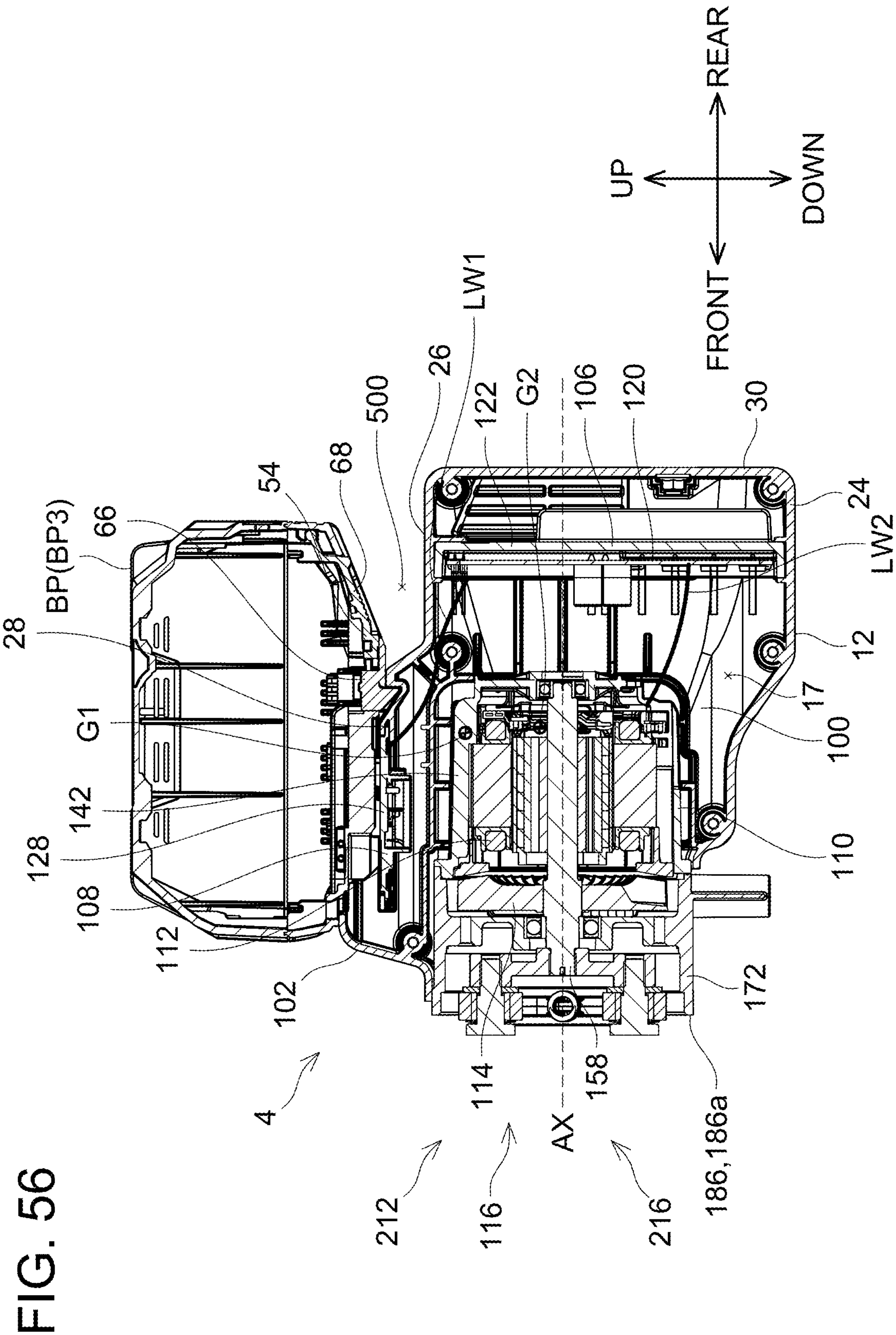
FIG. 56 shows a side cross-sectional view of the motor unit 4 and the battery pack BP according to the fourth embodiment.

The battery terminal 108 is positioned in the upper front wall 28. The outer surface 128*a* of the terminal base 128 lies on a plane including the front-rear direction and the left-right direction. The outer surface 128*a* corresponds to the upper surface of the terminal base 128. As shown in FIG. 56, the battery terminal 108 is positioned above the motor housing 110. The battery terminal 108 is positioned forward of the rear end of the motor housing 110 and the rear end of the motor 112. In the top view of the motor unit 4, the battery terminal 108 at least partially overlaps each of the motor housing 110 and the motor 112.

The battery pack BP is attached to the body housing 12 by being slid forward from behind the body housing 12. In the state where the battery pack BP is attached to the body housing 12, there is a space 500 between a lower rear portion of the battery pack BP and the upper rear wall 26. The battery pack BP is removed from the body housing 12 by the user gripping the battery pack BP with at least one of his/her fingers inserted in the space 500 to push the manipulation portion 68 and then sliding the battery pack BP rearward.

In the state where the battery pack BP is attached to the body housing 12, the center of gravity G1 of the motor unit 4 is positioned within the motor housing 110. The center of gravity G1 is positioned near the center position of the body housing 12 in the front-rear direction. The center of gravity G1 is positioned above the motor 112. The center of gravity G1 is positioned above the rotation axis AX of the motor shaft 158.

In the state where the battery pack BP is not attached to the body housing 12, the center of gravity G2 of the motor unit 4 is positioned within the motor 112. The center of gravity G2 is positioned near the center position of the body housing 12 in the front-rear direction. The center of gravity G2 is positioned above the rotation axis AX of the motor shaft 158. The center of gravity G2 is positioned closer to the rotation axis AX than the center of gravity G1 is.

Variants

In one embodiment, the motor unit 4 may comprise a built-in battery positioned in the accommodating space 17 as a replacement for the battery pack BP. In this case, this battery is charged via a power cable from an external power source.

In one embodiment, the motor unit 4 may not comprise the battery pack BP. In this case, electric power may be supplied to the motor unit 4 from an external power source via a power cable.

In one embodiment, the centers of gravity G1, G2 of the motor unit 4 may not be positioned within the motor 112.

In one embodiment, the body housing 12 may not comprise the board accommodating portion 98. In this case the control unit 106 is positioned in the motor accommodating portion 100.

In one embodiment, the motor unit 4 may be fixed to a working unit 6 at its portion other than the front surface 186*a* of the flange 186.

What is claimed is:

1. A system comprising:

a motor unit comprising a motor, an output member configured to be driven by the motor, and a fixing member;

a first working unit configured to be selectively fixed to the fixing member of the motor unit and be driven by the output member; and a second working unit configured to be selectively fixed to the fixing member of the motor unit and be driven by the output member, wherein the first working unit differs from the second working unit, in a case where the fixing member is fixed to the first working unit, the fixing member of the motor unit is oriented in a first direction relative to a reference plane when the first working unit and the motor unit are in a first working posture relative to the reference plane, in a case where the fixing member is fixed to the second working unit, the fixing member of the motor unit is oriented in a second direction relative to the reference plane when the second working unit and the motor unit are in a second working posture relative to the reference plane, wherein the second direction is different from the first direction, the first working unit comprises a first manipulation member configured to be manipulated by a user to drive the motor, and the second working unit comprises a second manipulation member configured to be manipulated by the user to drive the motor.

2. The system according to claim 1, wherein the first working unit further comprises a first handle configured to be gripped by the user.

3. The system according to claim 2, wherein a maximum output of the motor ranges from 0.5 kW to 1.5 kW, a diameter of the motor is equal to or less than 100 mm, a weight of the motor unit is equal to or less than 7.5 kg, the motor unit further comprises a body housing accommodating the motor, a volume of the body housing is equal to or less than 13000 $cm^3$, the motor comprises a motor shaft, in the case where the fixing member of the motor unit is fixed to the first working unit, the motor shaft extends along the reference plane when the first working unit and the motor unit are in the first working posture relative to the reference plane, in the case where the fixing member of the motor unit is fixed to the second working unit, the motor shaft extends perpendicular to the reference plane when the second working unit and the motor unit are in the second working posture relative to the reference plane, the first direction is a direction along the reference plane, the second direction is a direction perpendicular to the reference plane, the motor unit further comprises:

a body housing accommodating the motor; and a battery terminal exposed to outside of the body housing and configured to be connected to a battery configured to supply power to the motor, in the case where the fixing member of the motor unit is fixed to the first working unit, the battery terminal is positioned above the motor when the first working unit and the motor unit are in the first working posture relative to the reference plane, in the case where the fixing member of the motor unit is fixed to the second working unit, the battery terminal is positioned lateral to the motor when the second working unit and the motor unit are in the second working posture relative to the reference plane, the first working unit is selected from a group consisting of a winch unit, a screed unit, and a trowel unit, and the second working unit comprises a handheld working unit configured to be held by a hand of the user.

4. The system according to claim 1, wherein a maximum output of the motor ranges from 0.5 kW to 1.5 kW.

5. The system according to claim 1, wherein a diameter of the motor is equal to or less than 100 mm.

6. The system according to claim 1, wherein a weight of the motor unit is equal to or less than 7.5 kg.

7. The system according to claim 1, wherein the motor unit further comprises a body housing accommodating the motor, and a volume of the body housing is equal to or less than 13000 $cm^3$.

8. The system according to claim 1, wherein the motor comprises a motor shaft, in the case where the fixing member of the motor unit is fixed to the first working unit, the motor shaft extends along the reference plane when the first working unit and the motor unit are in the first working posture relative to the reference plane, and in the case where the fixing member of the motor unit is fixed to the second working unit, the motor shaft extends perpendicular to the reference plane when the second working unit and the motor unit are in the second working posture relative to the reference plane.

9. The system according to claim 8, wherein the first direction is a direction along the reference plane, and the second direction is a direction perpendicular to the reference plane.

10. The system according to claim 1, wherein the motor unit further comprises:

a body housing accommodating the motor; and a battery terminal exposed to outside of the body housing and configured to be connected to a battery configured to supply power to the motor.

11. The system according to claim 10, wherein in the case where the fixing member of the motor unit is fixed to the first working unit, the battery terminal is positioned above the motor when the first working unit and the motor unit are in the first working posture relative to the reference plane, and in the case where the fixing member of the motor unit is fixed to the second working unit, the battery terminal is positioned lateral to the motor when the second working unit and the motor unit are in the second working posture relative to the reference plane.

12. The system according to claim 1, wherein the first working unit is selected from a group consisting of: a winch unit, a screed unit, and a trowel unit.

13. The system according to claim 1, wherein the second working unit comprises a handheld working unit configured to be held by a hand of the user.

14. A system comprising:

a motor unit comprising a motor including a motor shaft, and a fixing member;

a first working unit configured to be selectively fixed to the fixing member and be driven by the motor shaft, wherein the motor shaft extends in a left-right direction when the first working unit is operated by a user; and a second working unit configured to be selectively fixed to the fixing member and driven by the motor shaft, wherein the motor shaft extends in an up-down direction when the second working unit is operated by the user, wherein:

the first working unit comprises a first manipulation member configured to be manipulated by a user to drive the motor, and the second working unit comprises a second manipulation member configured to be manipulated by the user to drive the motor.

15. A system comprising:

a motor unit comprising a motor, an output member configured to driven by the motor, and a fixing member;

a first working unit configured to be selectively fixed to the fixing member of the motor unit and be driven by the motor; and a second working unit configured to be selectively fixed to the fixing member of the motor unit and be driven by the motor, wherein the output member comprises:

a first output member configured to be selectively fixed to the motor and drive the first working unit; and a second output member configured to be selectively fixed to the motor and drive the second working unit, when a rotation speed of the motor exceeds a predetermined speed higher than zero, the first output member contacts an input member of the first working unit and drives the first working unit, and the second output member is fixed to an input member of the second working unit and drives the second working unit regardless of the rotation speed of the motor.

16. The system according to claim 15, wherein the first working unit comprises a first manipulation member configured to be manipulated by a user to drive the motor, and the second working unit comprises a second manipulation member configured to be manipulated by the user to drive the motor.

* * * * *